(12) United States Patent
Jacoby et al.

(10) Patent No.: US 11,561,415 B1
(45) Date of Patent: Jan. 24, 2023

(54) MOVING GUIDE ACTUATION OF FLUID LENSES

(71) Applicant: META PLATFORMS TECHNOLOGIES, LLC, Menlo Park, CA (US)

(72) Inventors: Thomas Norman Llyn Jacoby, Oxfordshire (GB); Andrew Alexander Herbert, Bedfordshire (GB); Robert Edward Stevens, Eynsham (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 286 days.

(21) Appl. No.: 15/931,068

(22) Filed: May 13, 2020

Related U.S. Application Data

(60) Provisional application No. 62/849,012, filed on May 16, 2019.

(51) Int. Cl.
*G02C 7/08* (2006.01)

(52) U.S. Cl.
CPC .................................... *G02C 7/085* (2013.01)

(58) Field of Classification Search
CPC ........ G02C 7/022; G02C 7/061; G02C 7/085; G02C 7/086; G02C 7/088; G02C 7/02; G02C 7/08
See application file for complete search history.

(56) References Cited

U.S. PATENT DOCUMENTS

| | | | |
|---|---|---|---|
| 5,138,494 | A | 8/1992 | Kurtin |
| 5,371,629 | A | 12/1994 | Kurtin et al. |
| 5,668,620 | A | 9/1997 | Kurtin et al. |
| 5,696,521 | A | 12/1997 | Robinson et al. |
| 5,956,183 | A | 9/1999 | Epstein et al. |
| 5,999,328 | A | 12/1999 | Kurtin et al. |
| 7,256,943 | B1 | 8/2007 | Kobrin et al. |
| 8,254,034 | B1 | 8/2012 | Shields et al. |
| 10,634,824 | B1 * | 4/2020 | Ouderkirk .......... G02B 27/0172 |
| 2003/0095336 | A1 | 5/2003 | Floyd |
| 2004/0156983 | A1 | 8/2004 | Moravec et al. |
| 2006/0077562 | A1 | 4/2006 | Silver |
| 2006/0163612 | A1 | 7/2006 | Kouvetakis et al. |

(Continued)

FOREIGN PATENT DOCUMENTS

| WO | 2013/143630 A1 | 10/2013 |
|---|---|---|
| WO | 2018/158347 A1 | 9/2018 |
| WO | 2019/186181 A1 | 10/2019 |

*Primary Examiner* — Mustak Choudhury
(74) *Attorney, Agent, or Firm* — Greenberg Traurig, LLP

(57) ABSTRACT

An example device may include a fluid lens having a membrane assembly including a membrane and one or more membrane attachments, a substrate, a fluid located within an enclosure formed at least in part by the membrane and the substrate, and a support structure, attached to the substrate, including an actuation guide. The device may include an actuator mechanically coupled to the actuation guide and configured to change an orientation of the actuation guide relative to another device component, such as a substrate or frame. An example actuation guide may engage with the membrane attachment, and the movement of the membrane attachment along the actuation guide in response to the change in the orientation of the actuation guide may adjust an optical property, such as a focal length, of the fluid lens.

19 Claims, 29 Drawing Sheets

(56) References Cited

U.S. PATENT DOCUMENTS

| | | |
|---|---|---|
| 2007/0279585 A1 | 12/2007 | Bartoli |
| 2008/0001169 A1 | 1/2008 | Lochtefeld |
| 2008/0207846 A1 | 8/2008 | Henze et al. |
| 2008/0239503 A1 | 10/2008 | Conradi et al. |
| 2008/0257409 A1 | 10/2008 | Li et al. |
| 2009/0147371 A1 | 6/2009 | Lee et al. |
| 2010/0068866 A1 | 3/2010 | Yu et al. |
| 2010/0118413 A1 | 5/2010 | Kim et al. |
| 2010/0176375 A1 | 7/2010 | Lochtefeld |
| 2010/0182703 A1* | 7/2010 | Bolis ............... G02B 3/14 359/666 |
| 2010/0252861 A1 | 10/2010 | Lochtefeld |
| 2011/0085131 A1 | 4/2011 | Gupta et al. |
| 2011/0085243 A1 | 4/2011 | Gupta et al. |
| 2012/0041553 A1 | 2/2012 | Gupta et al. |
| 2012/0287512 A1* | 11/2012 | Egan ............... G02C 7/085 359/666 |
| 2014/0077220 A1 | 3/2014 | Kryliouk et al. |
| 2014/0253873 A1 | 9/2014 | Crosby et al. |
| 2014/0261611 A1 | 9/2014 | King et al. |
| 2015/0055084 A1 | 2/2015 | Stevens et al. |
| 2015/0116656 A1 | 4/2015 | Stevens et al. |
| 2015/0185480 A1* | 7/2015 | Ouderkirk ......... G02B 27/283 359/581 |
| 2016/0049299 A1 | 2/2016 | Ko et al. |
| 2016/0223837 A1 | 8/2016 | Holland et al. |
| 2017/0269378 A1 | 9/2017 | Stevens et al. |
| 2019/0097080 A1 | 3/2019 | Ide |
| 2019/0258084 A1 | 8/2019 | Stevens et al. |

\* cited by examiner

FIG. 14A  FIG. 14B

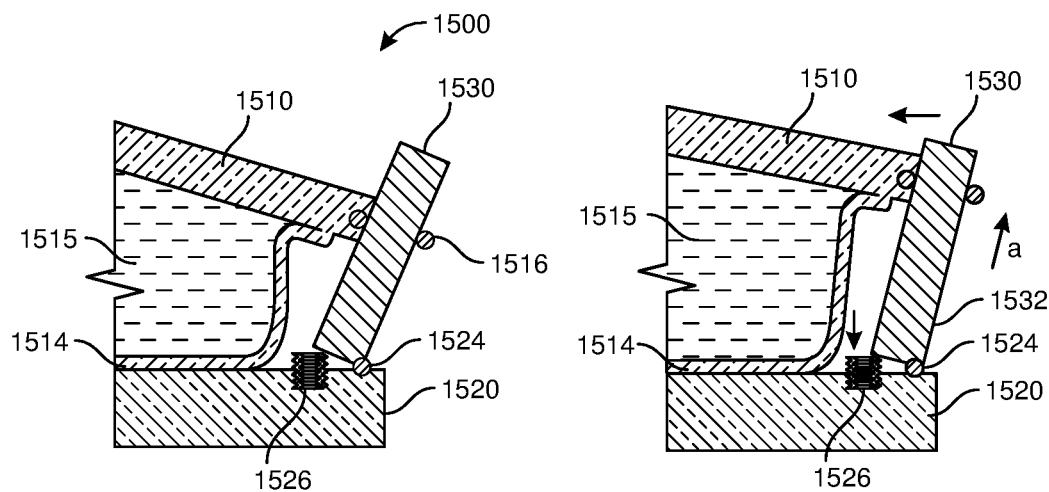
FIG. 15A
FIG. 15B
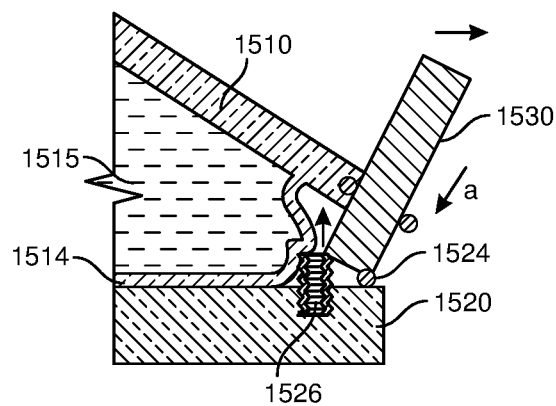
FIG. 15C

FIG. 21A  1. Stretch Membrane

FIG. 21B  2. Edge-Wire in Tools

FIG. 21C  3. Present Edge Wire to Membrane

FIG. 21D  4. Acoustic Welding

FIG. 21E  5. Laser Trimming

FIG. 21F  6. Membrane Edge-Wire Assy in Tool

FIG. 21G  7. Insert Membrane Assembly into Support

8. Close Support

MOVING GUIDE ACTUATION OF FLUID LENSES

CROSS REFERENCE TO RELATED APPLICATION

This application claims the benefit of U.S. Provisional Application No. 62/849,012, filed May 16, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 14A-14C illustrate an example configuration having a support structure including an actuation guide hingedly attached to a substrate, configured to provide a guide path for a control point on the membrane, according to some embodiments.

FIGS. 15A-15C shows an example configuration in which angular movement of an actuation guide is performed by a linear actuator that couples the bottom of the actuation guide to the substrate, according to some embodiments.

FIGS. 21A-21H show a schematic of an example manufacturing process for a membrane assembly.

FIGS. 21A-21H illustrate example approaches to assembling a device.

FIGS. 22A-22E illustrate example approaches to assembling a membrane assembly including a guide wire.

FIGS. 23A-23B illustrate formation of a sleeve on a guide wire.

FIG. 24 further illustrates formation of a sleeve on a guide wire.

Figure 1A:
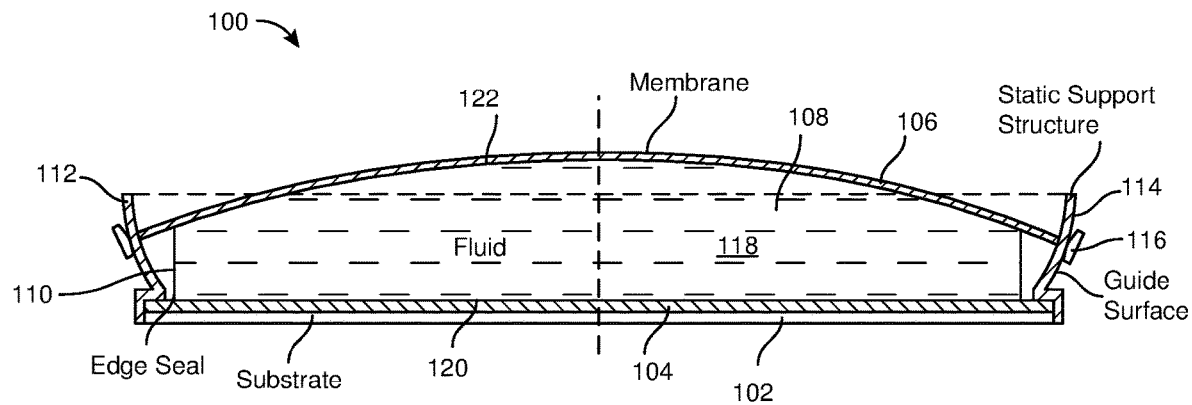
FIGS. 1A-1C illustrate example fluid lenses.

Throughout the drawings, identical reference characters and descriptions may indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. The present disclosure includes all modifications, equivalents, and alternatives falling within the scope of the appended claims.

DETAILED DESCRIPTION OF EXEMPLARY EMBODIMENTS

The present disclosure is generally directed to fluid lenses, such as adjustable fluid lenses. As is explained in greater detail below, embodiments of the present disclosure may include adjustable liquid lenses, membranes configured for use in fluid lenses, membrane assemblies that may include a peripheral guide wire, and improved devices using fluid lenses, such as ophthalmic devices. Fluid lenses may include lenses having an elastomeric or otherwise deformable element (such as a membrane), a substrate, and a fluid.

Figure 25:
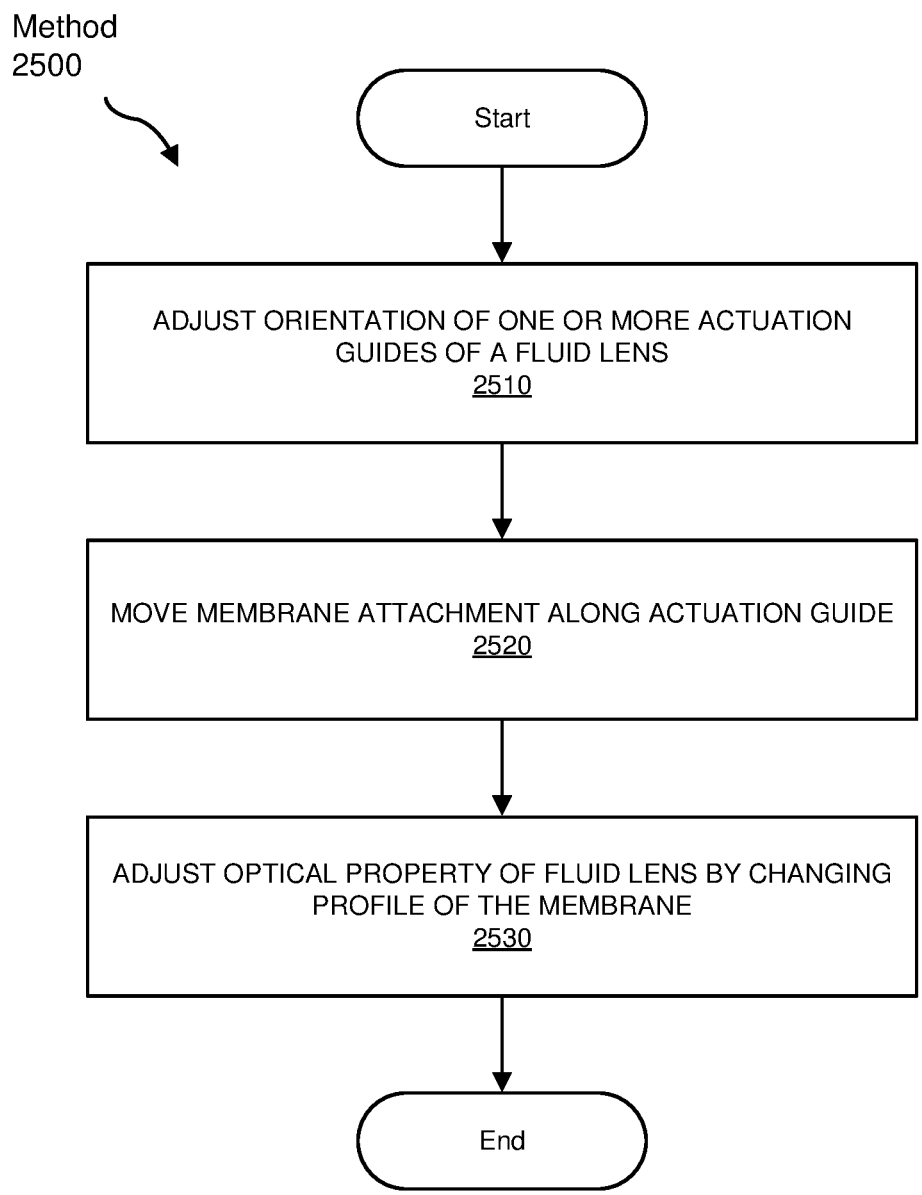
FIGS. 25 and 26 illustrate example methods.
Figure 26:
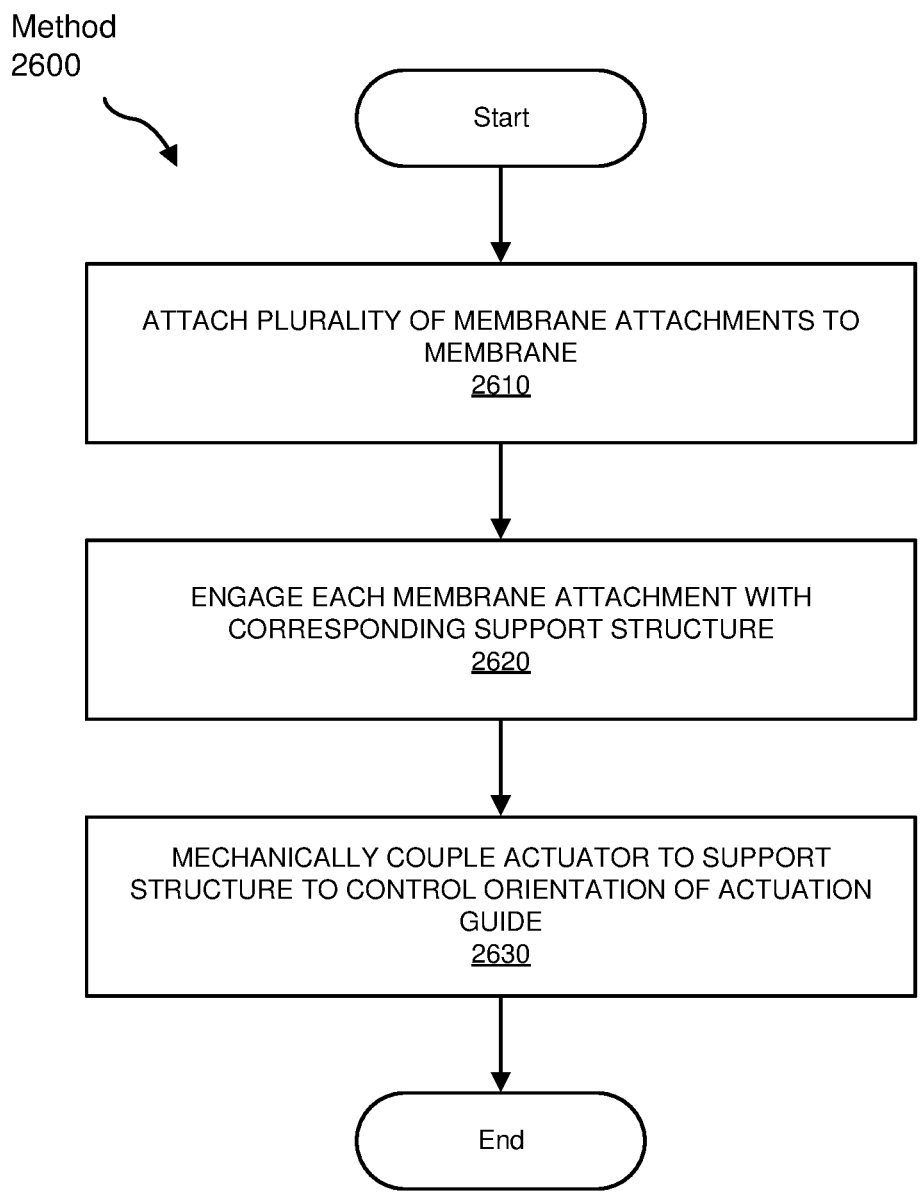
Figure 27:
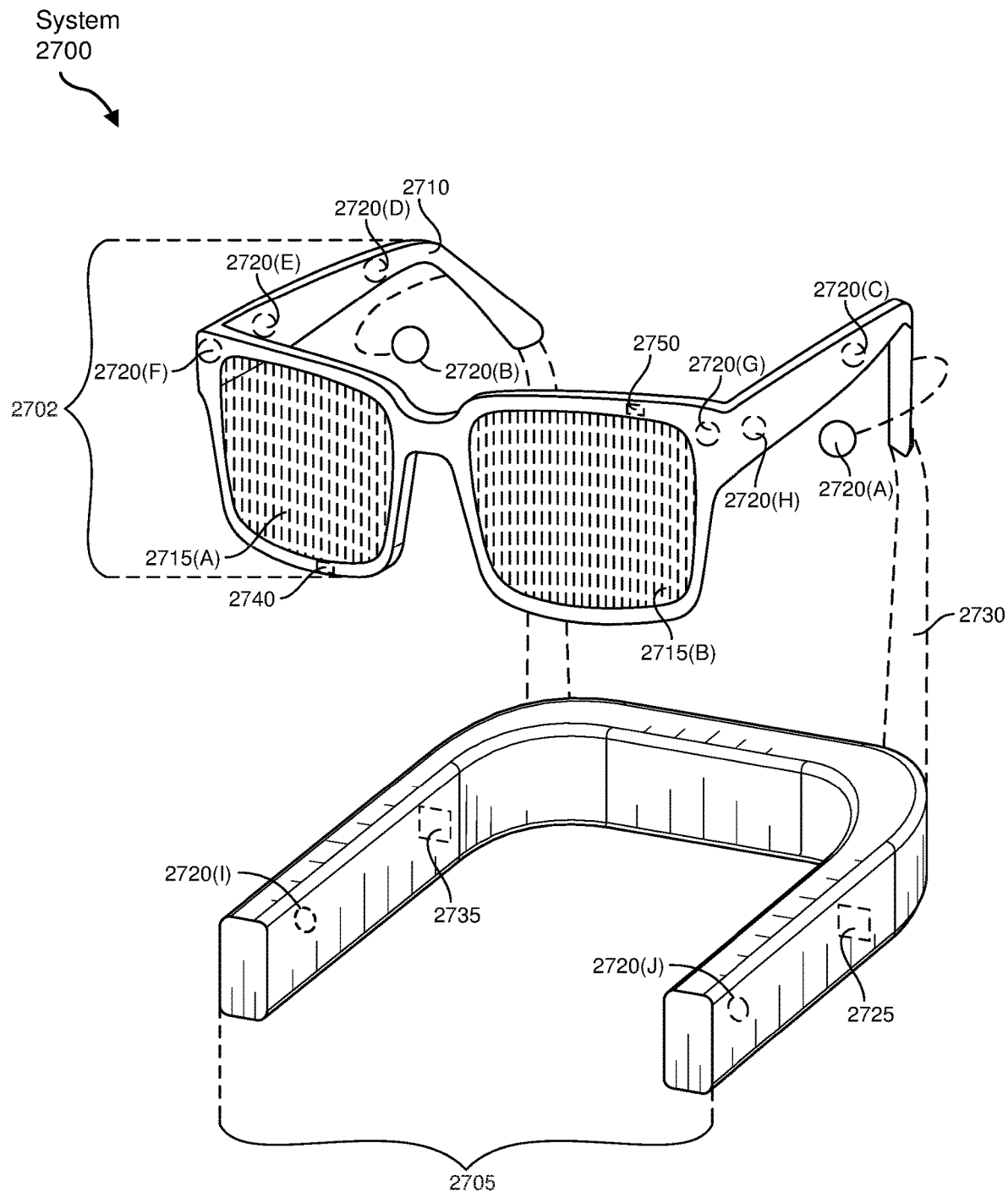
FIG. 27 is an illustration of exemplary augmented-reality glasses that may be used in connection with embodiments of this disclosure.
Figure 28:
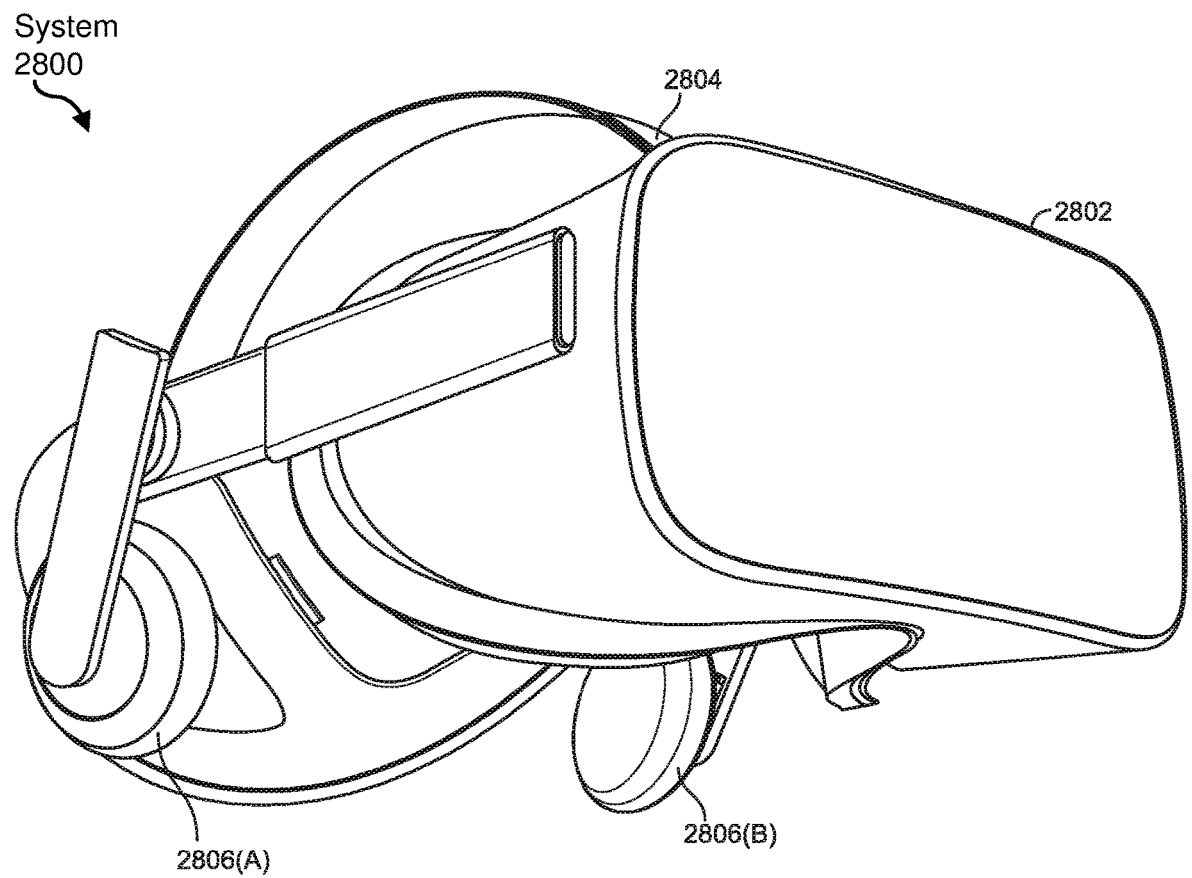
FIG. 28 is an illustration of an exemplary virtual-reality headset that may be used in connection with embodiments of this disclosure.

The following provides, with reference to FIGS. 1-32, detailed descriptions of various examples. FIGS. 1A-2G illustrate example fluid lenses. FIG. 3 illustrates an ophthalmic device that may include one or more fluid lenses. FIGS. 4-7 depict further example fluid lenses. FIGS. 8-9C illustrate interactions between support structures and membrane attachments. FIGS. 10-13 further illustrate example membrane attachments and support structures. FIGS. 14A-20 illustrate further example support structures, for example, including hingedly attached actuation guides, and control using an actuator. FIGS. 21A-24 illustrate example approaches to device fabrication. FIGS. 25 and 26 illustrate example methods. FIGS. 27 and 28 show example augmented reality and virtual reality devices.

An adjustable fluid lens may be configured so that adjustment of the membrane profile may result in no appreciable change in the elastic energy of the membrane. This configuration may be termed a "zero-strain" device configuration, as, in some examples, adjustment of at least one membrane edge portion, such as at least one control point, along a respective guide path does not appreciably change the strain energy of the membrane. In some examples, a "zero-strain" device configuration may reduce the actuation force required by an order of magnitude when compared with a conventional support beam type configuration. A conventional fluid lens may, for example, require an actuation force that is greater than 1N for an actuation distance of 1 mm. Using a "zero-strain" device configuration, actuation forces may be 0.1N or less for an actuation of 1 mm, for quasi-static actuation. This substantial reduction of actuation forces may enable the use of smaller, more speed-efficient actuators in fluid lenses, resulting in a more compact and efficient form factor. In such examples, in a "zero-strain" device configuration, the membrane may actually be under appreciable strain, but the total strain energy in the membrane may not change appreciably as the lens is adjusted. This may advantageously greatly reduce the force needed to adjust the fluid lens.

In some examples, an adjustable fluid lens (such as a liquid lens) includes a pre-strained flexible membrane that at least partially encloses a fluid volume, a fluid enclosed within the fluid volume, a flexible edge seal that defines a periphery of the fluid volume, and an actuation system configured to control the edge of the membrane such that the optical power of the lens can be modified. In some examples, movement of an edge portion of the membrane, such as a control point, along a guide path provided by a support structure may result in no appreciable change in the elastic energy of the membrane. The membrane profile may be adjusted by movement of a plurality of control points along respective guide paths, and this may result in no appreciable change in the elastic energy of the membrane. The membrane may be an elastic membrane, and the membrane profile may be a curved profile providing a refractive surface of the fluid lens.

FIG. 1A depicts a cross-section through a fluid lens, according to some embodiments. The fluid lens 100 illustrated in this example includes a substrate 102 (which in this example is a generally rigid, planar substrate), an optional substrate coating 104, a membrane 106, a fluid 108 (denoted by dashed horizontal lines), an edge seal 110, a support structure 112 providing a guide surface 114, and a membrane attachment 116. In this example, the substrate 102 has a lower (as illustrated) outer surface, and an interior surface on which the substrate coating 104 is supported. The interior surface 120 of the coating 104 is in contact with the fluid 108. The membrane 106 has an upper (as illustrated) outer surface and an interior surface 122 bounding the fluid 108.

The fluid 108 is enclosed within an enclosure 118, which is at least in part defined by the substrate 102 (along with the coating 104), the membrane 106, and the edge seal 110, which here cooperatively define the enclosure 118 in which the fluid 108 is located. The edge seal 110 may extend around the periphery of the enclosure 118, and retain (in cooperation with the substrate and the membrane) the fluid within the enclosed fluid volume of the enclosure 118. In some examples, an enclosure may be referred to a cavity or lens cavity.

In this example, the membrane 106 has a curved profile, so that the enclosure has a greater thickness in the center of the lens than at the periphery of the enclosure (e.g., adjacent the edge seal 110). In some examples, the fluid lens may be a plano-convex lens, with the planar surface being provided by the substrate 102 and the convex surface being provided by the membrane 106. A plano-convex lens may have a thicker layer of lens fluid around the center of the lens. In some examples, the exterior surface of a membrane may provide the convex surface, with the interior surface being substantially adjacent the lens fluid.

The support structure 112 (which in this example may include a guide slot through which the membrane attachment 116 may extend) may extend around the periphery (or within a peripheral region) of the substrate 102, and may attach the membrane to the substrate. The support structure may provide a guide path, in this example a guide surface 114 along which a membrane attachment 116 (e.g., located within an edge portion of the membrane) may slide. The membrane attachment may provide a control point for the membrane, so that the guide path for the membrane attachment may provide a corresponding guide path for a respective control point.

The lens 100 may include one or more actuators (not shown in FIG. 1A) that may be located around the periphery of the lens and may be part of or mechanically coupled to the support structure 112. The actuators may exert a controllable force on the membrane at one or more control points, such as provided by membrane attachment 116, that may be used to adjust the curvature of the membrane surface and hence at least one optical property of the lens, such as focal length, astigmatism correction, surface curvature, cylindricity, or any other controllable optical property. In some examples, the membrane attachment may be attached to an edge portion of the membrane, or to a peripheral structure extending around the periphery of the membrane (such as a peripheral guide wire, or a guide ring), and may be used to control the curvature of the membrane.

In some examples, FIG. 1A may represent a cross-section through a circular lens, though examples fluid lenses may also include non-circular lenses, as discussed further below.

Figure 1B:
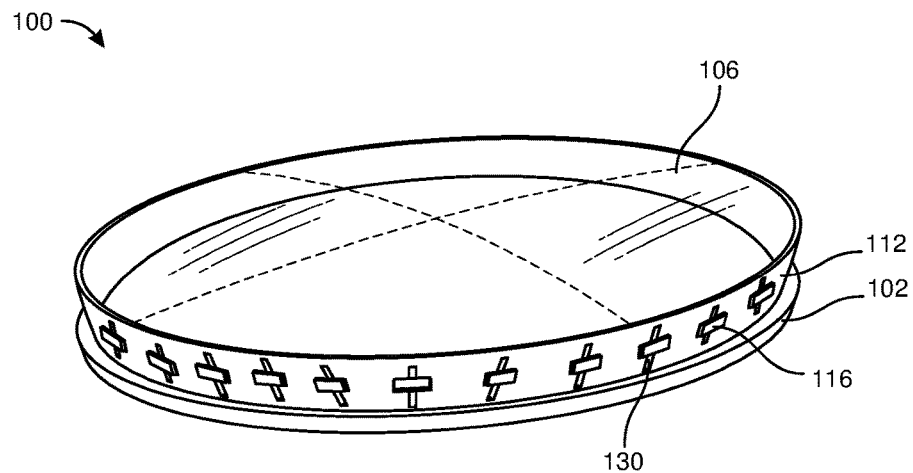

FIG. 1B shows a circular lens, of which FIG. 1A may be a cross-section. The figure shows the lens 100, including the substrate 102, the membrane 106, and the support structure 112. The figure shows the membrane attachment 116 as moveable along a guide path defined by the guide slot 130 and the profile of the guide surface 114 (shown in FIG. 1A). The dashed lines forming a cross are visual guides indicating a general exterior surface profile of the membrane 106. In this example, the membrane profile may correspond to a plano-convex lens.

Figure 1C:
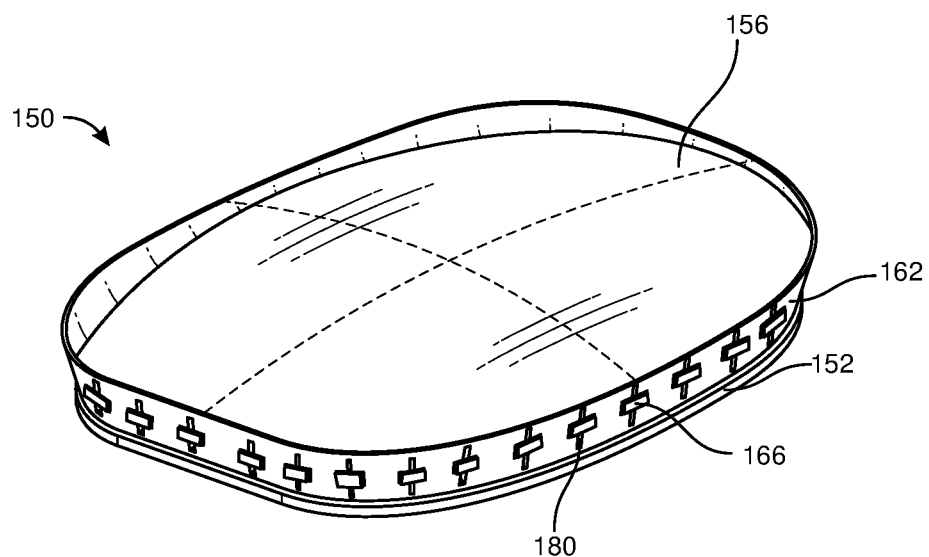

FIG. 1C shows a non-circular lens 150 that may otherwise be similar to the circular lens 100 of FIG. 1B and may have a similar configuration. The non-circular lens 150 includes substrate 152, membrane 156, and support structure 162. The lens has a similar configuration of the membrane attachment 166, movable along a guide path defined by the guide slot 180. The profile of a guide path may be defined by the surface profile of the support structure 162, through which the guide slot is formed. The cross-section of the lens may be analogous to that of FIG. 1A. The dashed lines forming a cross on the membrane 156 are visual guides indicating a general exterior surface profile of the membrane 156. In this example, the membrane profile may correspond to a plano-convex lens.

Figure 2A:
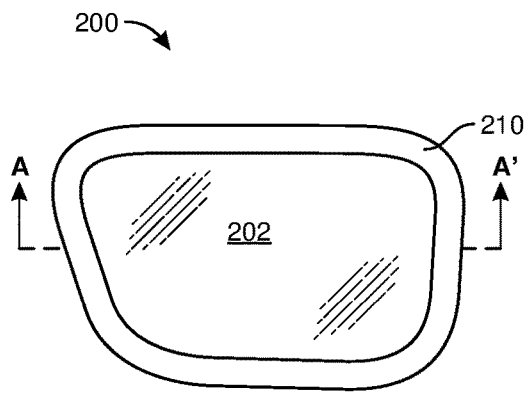
FIGS. 2A-2G illustrate example fluid lenses, and adjustment of the optical power of the fluid lenses.

FIGS. 2A-2D illustrate an ophthalmic device 200 including a fluid lens 202, according to some embodiments. FIG. 2A shows a portion of an ophthalmic device 200, which includes a portion of a peripheral structure 210 (that may include a guide wire or a support ring) supporting a fluid lens 202.

In some examples, the lens may be supported by a frame. An ophthalmic device (e.g., spectacles, goggles, eye protectors, visors, and the like) may include a pair of fluid lenses, and the frame may include components configured to support the ophthalmic device on the head of a user, for example, using components that interact with (e.g., rest on) the nose and/or ears of the user.

Figure 2B:
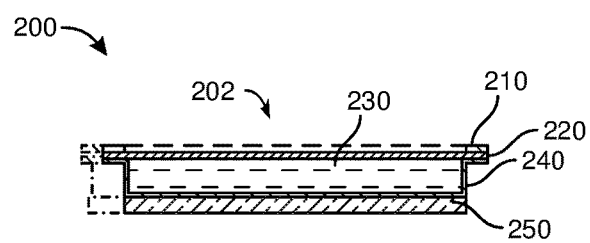
Figure 3:
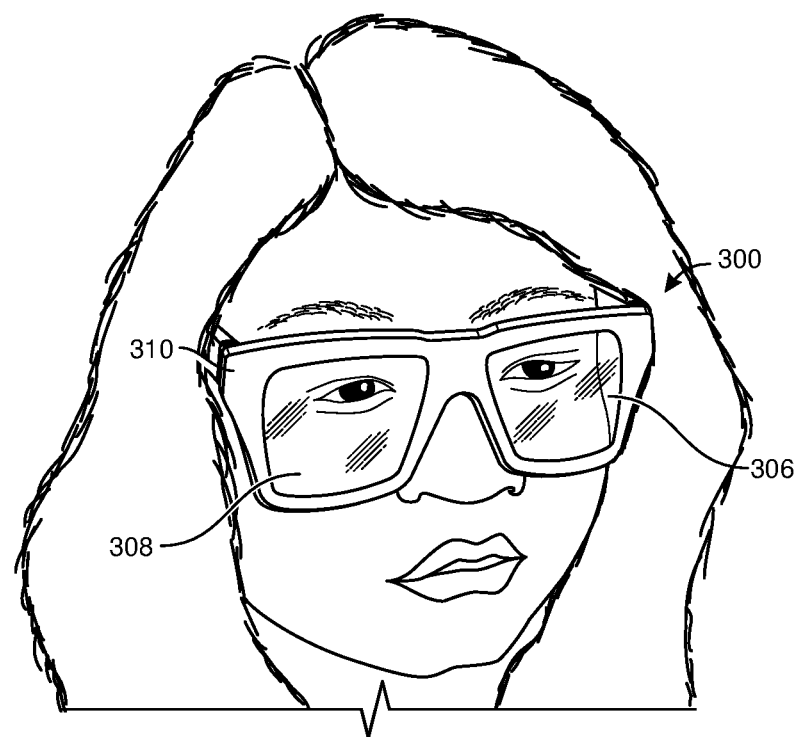
FIG. 3 illustrates an example ophthalmic device.

FIG. 2B shows a cross-section through the device 200, along A-A' as shown in FIG. 2A. The figure shows the peripheral structure 210 and the fluid lens 202. The fluid lens 202 includes a membrane 220, lens fluid 230, an edge seal 240, and a substrate 250. In this example, the substrate 250 includes a generally planar, rigid layer. The figure shows that the fluid lens may have a planar-planar configuration, which in some examples may be adjusted to a plano-concave and/or plano-convex lens configuration.

In some examples disclosed herein, one or both surfaces of the substrate may include a concave or convex surface, and in some examples the substrate may have a non-spherical surface such as a toroidal or freeform optical progressive or digressive surface. In various examples, the substrate may include a plano-concave, plano-convex, biconcave, or biconvex lens, or any other suitable optical element.

Figure 2C:
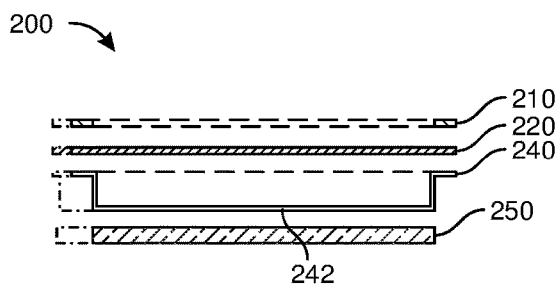

FIG. 2C shows an exploded schematic of the device shown in FIG. 2B, in which corresponding elements have the same numbering as discussed above in relation to FIG. 2A. In this example, the edge seal is joined with a central seal portion 242 extending over the substrate 250.

In some examples, the central seal portion 242 and the edge seal 240 may be a unitary element. In other examples, the edge seal may be a separate element, and the central seal portion 242 may be omitted or replaced by a coating formed on the substrate. In some examples, a coating may be deposited on the interior surface of the seal portion and/or edge seal. In some examples, the lens fluid may be enclosed in a flexible enclosure (sometimes referred to as a bag) that may include an edge seal, a membrane, and a central seal portion. In some examples, the central seal portion may be adhered to a rigid substrate component and may be considered as part of the substrate.

Figure 2D:
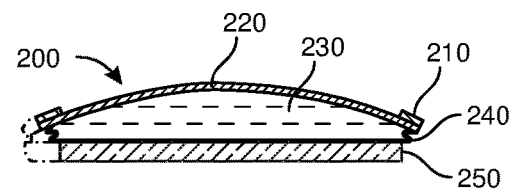

FIG. 2D shows adjustment of the device configuration, for example, by adjustment of forces on the membrane using actuators (not shown). As shown, the device may be configured in a planar-convex fluid lens configuration. In an example plano-convex lens configuration, the membrane 220 tends to extend away from the substrate 250 in a central portion.

In some examples, the lens may also be configured in a planar-concave configuration, in which the membrane tends to curve inwardly towards the substrate in a central portion.

Figure 2E:
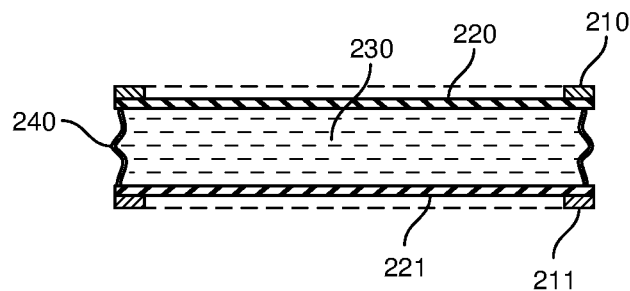

FIG. 2E illustrates a similar device to FIG. 2B, and element numbering is similar. However, in this example, the substrate 250 of the example of FIG. 2B is replaced by a second membrane 221, and there is a second peripheral structure (such as a second support ring) 211. In some examples disclosed herein, the membrane 220 and/or the second membrane 221 may be integrated with the edge seal 240.

Figure 2F:
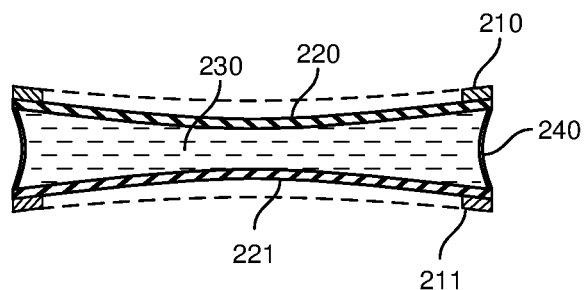

FIG. 2F shows the dual membrane fluid lens of FIG. 2E in a biconcave configuration. For example, application of negative pressure to the lens fluid 230 may be used to induce the biconcave configuration. In some examples, the membrane 220 and second membrane 221 may have similar properties, and the lens configuration may be generally symmetrical, for example, with the membrane and second membrane having similar radii of curvature (e.g., as a symmetric biconvex or biconcave lens). In some examples, the lens may have rotational symmetry about the optical axis of the lens, at least within a central portion of the membrane, or within a circular lens. In some examples, the properties of the two membranes may differ (e.g., in one or more of thickness, composition, membrane tension, or in any other relevant membrane parameter), and/or the radii of curvature may differ.

Figure 2G:
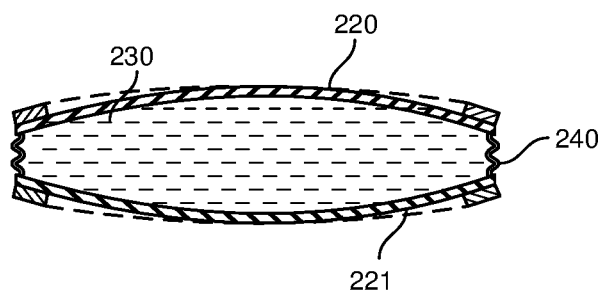

FIG. 2G shows the dual membrane fluid lens of FIG. 2E in a biconvex configuration, with corresponding element numbers.

In some examples, an ophthalmic device, such as an eyewear device, includes one or more fluid lenses. An example device includes at least one fluid lens supported by eyeglass frames. In some examples, an ophthalmic device may include an eyeglass frame, goggles, or any other frame or head-mounted structure to support one or more fluid lenses, such as a pair of fluid lenses.

FIG. 3 illustrates an ophthalmic device including a pair of fluid lenses, according to some embodiments. The example eyewear device 300 may include a pair of fluid lenses, 306 and 308, supported by an eyeglass frame 310 (that may also be referred to as a "frame" for conciseness). The pair of fluid lenses 306 and 308 may be referred to as left and right lenses, respectively (from the viewpoint of the user).

In some examples, an eyewear device (such as eyewear device 300 in FIG. 3) may include a pair of eyeglasses, a pair of smart glasses, an augmented reality device, a virtual reality headset, or the like.

In some examples, the frame 310 may include one or more of any of the following: a battery, a power supply or power supply connection, other refractive lenses (including additional fluid lenses), diffractive elements, displays, eye-tracking components and systems, motion tracking devices, gyroscopes, computing elements, health monitoring devices, cameras, and/or audio recording and/or playback devices (such as microphones and speakers).

Figure 4A:
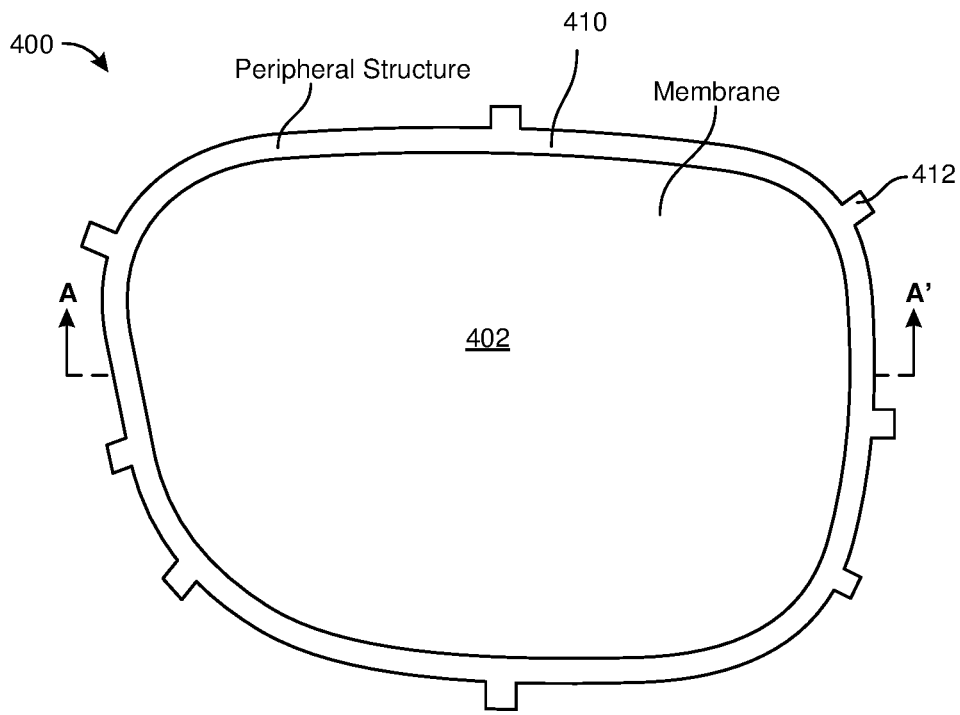
FIGS. 4A-4B illustrate a fluid lens having a membrane assembly including a peripheral structure.

FIG. 4A shows an example fluid lens 400 including a peripheral structure 410 that may generally surround a fluid lens 402. The peripheral structure 410 (in this example, a support ring) includes membrane attachments 412 that may correspond to the locations of control points for the membrane of the fluid lens 402. A membrane attachment may be an actuation point, where the lens may be actuated by displacement (e.g., by an actuator acting along the z-axis) or moved around a hinge point (e.g., where the position of the membrane attachment may be an approximately fixed distance "z" from the substrate). In some examples, the peripheral structure and hence the boundary of the membrane may flex freely between neighboring control points. Hinge points may be used in some embodiments to prevent bending of the peripheral structure (e.g., a support ring) into energetically favorable, but undesirable, shapes.

A rigid peripheral structure, such as a rigid support ring, may limit adjustment of the control points of the membrane. In some examples, such as a non-circular lens, a deformable or flexible peripheral structure, such as a guide wire or a flexible support ring, may be used.

Figure 4B:
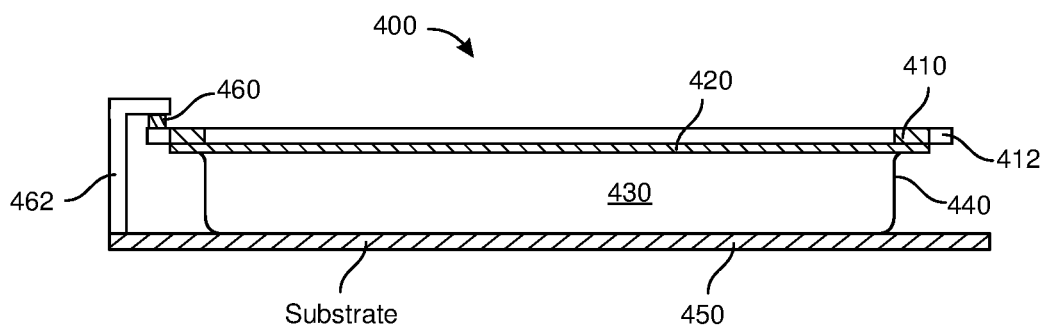

FIG. 4B shows a cross-section of the example fluid lens 400 (e.g., along A-A' as denoted in FIG. 4A). The fluid lens includes a membrane 420, fluid 430, edge seal 440, and substrate 450. In some examples, the peripheral structure 410 may surround and be attached to the membrane 420 of the fluid lens 402. The peripheral structure may include membrane attachments 412 that may provide the control points for the membrane. The position of the membrane attachments (e.g., relative to a frame, substrate, or each other) may be adjusted using one or more actuators, and used to adjust, for example, the optical power of the lens. A membrane attachment having a position adjusted by an actuator may also be referred to as an actuation point, or a control point.

In some examples, an actuator 460 may be attached to actuator support 462, and the actuator be used to vary the distance between the membrane attachment and the substrate, for example, by urging the membrane attachment along an associated guide path. In some examples, the actuator may be located on the opposite side of the membrane attachment from the substrate. In some examples, an actuator may be located so as to exert a generally radial force on the membrane attachment and/or support structure, for example, exerting a force to urge the membrane attachment towards or away from the center of the lens.

In some examples, one or more actuators may be attached to respective actuator supports. In some examples, an actuator support may be attached to one or more actuators. For example, an actuator support may include an arcuate, circular, or other shaped member along which actuators are located at intervals. Actuator supports may be attached to the substrate, or, in some examples, to another device component such as a frame. In some examples, the actuator may be located between the membrane attachment and the substrate, or may be located at another suitable location. In some examples, the force exerted by the actuator may be generally directed along a direction normal to the substrate, or along another direction, such as along a direction at a non-normal direction relative to the substrate. In some examples, at least a component of the force may be generally parallel to the substrate. The path of the membrane attachment may be based on the guide path, and in some examples the force applied by the actuator may have at least an appreciable component directed along the guide path.

Figure 5:
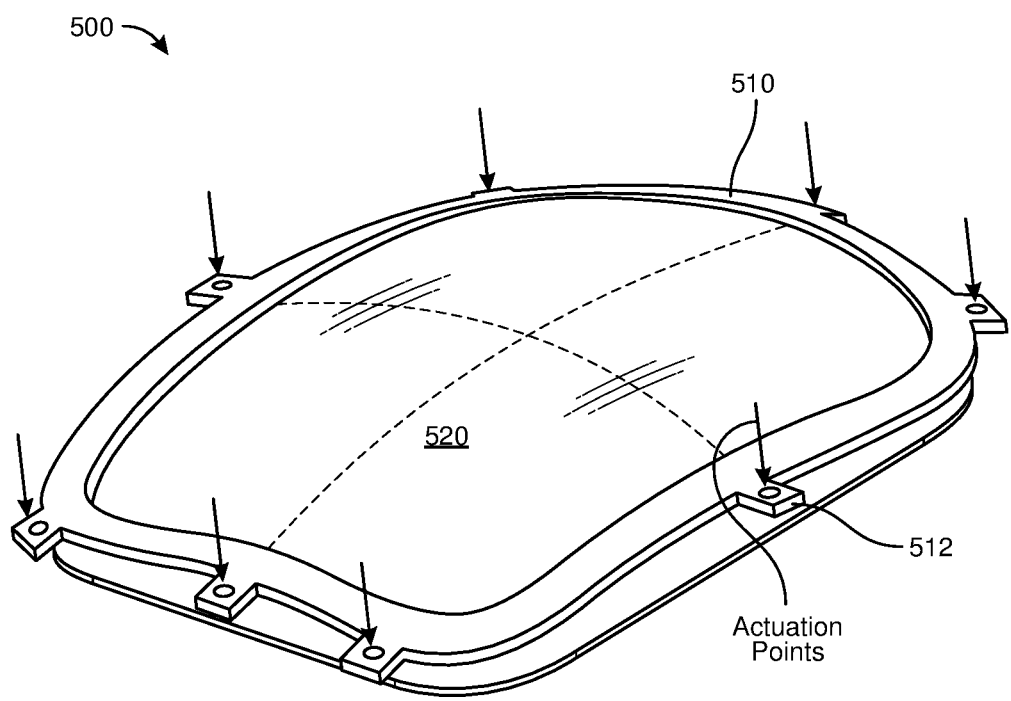
FIG. 5 illustrates deformation of a non-circular fluid lens.

FIG. 5 shows an example fluid lens 500 including a peripheral structure 510, here in the form of the support ring including a plurality of membrane attachments 512, and extending around the periphery of a membrane 520. The membrane attachments may include or interact with one or more support structures that each provide a guide path for an associated control point of the membrane 520. Actuation of the fluid lens may adjust the location of one or more control points of the membrane, for example, along the guide paths provided by the support structures. Actuation may be applied at discrete points on the peripheral structure, for example, the membrane attachments shown. In some examples, the peripheral structure may be flexible, for example, so that the peripheral structure may not be constrained to lie within a single plane.

In some examples, a fluid lens includes a membrane, a support structure, a substrate, and an edge seal. The support structure may be configured to provide a guide path for an edge portion of the membrane (such as a control point provided by a membrane attachment). An example membrane attachment may function as an interface device, configured to mechanically interconnect the membrane and the support structure, and may allow the membrane to exert an elastic force on the support structure. A membrane attachment may be configured to allow the control point of the membrane (that may be located in an edge portion of the membrane) to move freely along the guide path.

In some examples, a fluid lens may be configured to have one or both of the following features: in some examples, the strain energy in the membrane is approximately equal for all actuation states; and in some examples, the force reaction at membrane edge is normal to the guide path. Hence, in some examples, the strain energy of the membrane may be approximately independent of the optical power of the lens. In some examples, the force reaction at the membrane edge is normal to the guide path, for some or all locations on the guide path.

In some examples, movement of the edge portion of the membrane along the guide path may not result in an appreciable change in the elastic energy of the membrane. This configuration may be termed a "zero-strain" guide path, as, in some examples, adjustment of the membrane edge portion along the guide path does not appreciably change the strain energy of the membrane.

Example embodiments described in the present disclosure include apparatuses, systems, and methods related to fluid lenses (such as adjustable fluid-filled lenses), including fluid lenses configured to reduce or effectively eliminate the energy required to actuate a fluid lens with a pre-strained flexible membrane.

The boundary conditions of the membrane may be configured such that the change in strain energy in the membrane between all optical powers of the lens is zero or close to zero. Also, the boundary conditions of the membrane may be configured such that the reaction force is parallel or approximately parallel to the slope of the membrane at the periphery of the membrane, in some examples for all optical powers of the lens.

Example lenses may be configured so that the membrane is in a stable equilibrium state for all optical powers of the lens. Actuation may be required to change the lens configuration, but a lens may be configured so that no external force is required to hold the lens in a selected configuration (such as a selected optical power). In some examples, a lens may be configured so that relatively little or effectively zero energy is required to overcome strain energy in the membrane. In some examples, the energy required to adjust the lens may include that required to overcome friction, hysteresis, viscosity, and dynamic effects, so that greatly reduced or relatively negligible energy is required to adjust the lens from one optical power to another.

The boundary conditions may be configured to create a force bias such that the lens tends to move towards a specific configuration; for example, towards a predetermined optical power within a range of optical powers. This may be used to counteract friction forces or membrane support structure stiffness.

For some applications of adjustable fluid lenses, it may be advantageous to reduce both the energy required for actuation, and the packaging dimensions of the actuation system. Controlling the edge of the membrane may require energy to deform the membrane and/or energy to deform the membrane peripheral structure (such as a flexible support ring or guide wire, e.g., in the example of a non-round lens). These energy requirements may limit the technology choices for actuation and the extent to which the energy supply and the actuator packaging can be reduced. It would be advantageous to reduce or substantially eliminate these energy requirements. Advantages of the approaches described in the present disclosure may include one or more of the following: reduced size actuators, inconspicuous actuators, reduced weight, reduced power requirements, increased battery life, reducing or eliminating the need for external power supplies, and the like. Many of these aspects are particularly advantageous in the case of ophthalmic applications such as glasses or goggles, or for any application related to human use, such as augmented reality or virtual reality systems.

In some examples, a fluid lens configuration may be configured to reduce the energy required to change the power of the lens to an arbitrarily low value. This may enable the use of low-power actuation technologies that would not be otherwise feasible for use with a conventional fluid lens of similar optical properties and/or enable a reduction in size of the actuator and any energy storage device used.

In some examples, a device includes a membrane, a support structure configured to provide a guide path for an edge portion of the membrane, and a membrane attachment which allows a mechanical interaction between the membrane and an actuator and/or a support structure. A device may also include a peripheral structure disposed around the periphery of the membrane, and at least one membrane attachment may be configured to allow a mechanical connection between the membrane and the support structure, that may allow the membrane to move freely along the guide path. A device may also include a substrate and an edge seal. In some examples, the support structure may be rigid, or semi-rigid, and may be attached to the substrate.

In some examples, an adjustable fluid-filled lens includes a membrane assembly. A membrane assembly may include a membrane (e.g., having a line tension) and a peripheral structure (such as a guide wire, support ring, or any other suitable structure extending around the membrane). A fluid lens may include a membrane assembly, a substrate, and an edge seal. The membrane line tension (an elastic force) may be supported, at least in part, by a peripheral structure such as a guide wire or a support ring. The retention of the elastic force by a peripheral structure, and support structures, may be augmented by at least one static restraint and/or hinge point, for example, at one or more locations on the peripheral structure.

In some examples, a fluid lens includes a membrane, a support structure configured to provide a guide path for an edge portion of the membrane, and a substrate. An example fluid lens may further include a membrane attachment (that may also be termed an interface device) configured to connect the membrane to the support structure and to allow the edge portion of the membrane, such as a control point of the membrane, to move freely along the guide path. A device may include a substrate and an edge seal. In some examples, a fluid lens may include an elastomeric or otherwise deformable element (such as an elastic membrane), a substrate, and a fluid. In some examples, movement of a control point of the membrane (as determined, for example, by the movement of a membrane attachment along a guide path) may be used to adjust the optical properties of a fluid lens.

In some examples, a fluid lens, such as an adjustable fluid-filled lens, includes a pre-strained flexible membrane that at least partially encloses a fluid volume, a fluid enclosed within the fluid volume, a flexible edge seal that may define a periphery of the fluid volume, and an actuation system configured to control the location of an edge of the membrane (e.g., a control point provided by a membrane attachment) such that the optical power of the lens may be modified. The fluid volume may be retained in an enclosure formed at least in part by the membrane, substrate, and the edge seal.

Controlling the edge of the membrane may require energy to deform the membrane and/or energy to deform a peripheral structure such as a support ring or a peripheral guide wire (e.g., in the case of a non-round lens). In some examples, a fluid lens configuration may be configured to reduce the energy required to change the power of the lens to a low value, for example, such that the change in elastic energy stored in the membrane as the lens properties change may be less than the energy required to overcome, for example, frictional forces.

In some examples, an adjustable focus fluid lens includes a substrate and a membrane (e.g., an elastic membrane), where a lens fluid is retained between the membrane and the substrate. The membrane may be under tension, and a mechanical system for applying or retaining the tension in the membrane at sections may be provided along the membrane edge or at portions thereof. The mechanical system may allow the position of the sections to be controllably changed in both height and radial distance. In this context, height may refer to a distance from the substrate, along a direction normal to the local substrate surface. In some examples, height may refer to the distance from a plane extending through the optical center of the lens and perpendicular to the optic axis. Radial distance may refer to a distance from a center of the lens, in some examples, a distance from the optical axis along a direction normal to the optical axis. In some examples, changing the height of at least one of the sections restraining the membrane may cause a change in the membrane's curvature, and the radial distance of the restraint may be changed to reduce increases in the membrane tension.

In some examples, a mechanical system may include a sliding mechanism, a rolling mechanism, a flexure mechanism, an active mechanical system, or a combination thereof. In some examples, a mechanical system may include one or more actuators, and the one or more actuators may be configured to control both (or either of) the height and/or radial distance of one or more of the sections.

An adjustable focus fluid lens may include a substrate, a membrane that is in tension, a fluid, and a peripheral structure restraining the membrane tension, where the peripheral structure extends around a periphery of the membrane, and where, in some examples, the length of the peripheral structure and/or the spatial configuration of the peripheral structure may be controlled. In some examples, the peripheral structure may include an elastic element, allowing the perimeter distance (e.g., circumference) of the membrane to be adjusted, for example, using the membrane attachments. Controlling the circumference of the membrane may controllably maintain the membrane tension when the optical power of the fluid lens is changed.

Changing the optical power of the lens from a first power to a second power may cause a change in membrane tension if the membrane perimeter distance (e.g., circumference) is not changed. However, allowing the membrane perimeter distance (e.g., the distance around the periphery of the membrane) to change may allow the membrane tension to remain substantially unchanged, or be changed by a substantially reduced amount, such as less than a relative magnitude change of 1%, 2%, 5%, or 10%. In some examples, a load offset or a negative spring force may be applied to the actuator. In some examples, changes in the membrane tension may remain within at least one of these percentage limits as the fluid lens is adjusted.

A fluid lens may include strain energy, for example, within the elastic membrane. For example, an elastic membrane may have elastic energy (such as strain energy) when the membrane is stretched. In some configurations, work done by an external force, such as provided by an actuator when adjusting the membrane, may increase the strain energy stored within the membrane. However, in some examples, one or more membrane attachments, that may be located within edge portions of the membrane, may be adjusted along a guide path such that the elastic strain energy stored within the membrane may not appreciably change.

A force, such as a force provided by an actuator, may perform work when there is a displacement of the point of application in the direction of the force. In some examples, a fluid lens is configured so that there is no appreciable elastic force in the direction of the guide path. In such configurations, a displacement of the edge portion of the membrane along the guide path does not require work in relation to the elastic force. There may, however, be work required to overcome friction and other relatively minor effects.

In some examples, a fluid lens includes a peripheral structure. A peripheral structure may include a member, such as a support ring or guide wire, affixed to a perimeter of an elastic membrane of a fluid-filled lens. The peripheral structure may be approximately the same shape as the lens. For a circular lens, the peripheral structure may be generally circular. For non-circular lenses, the peripheral structure may bend normally to the plane defined by the membrane for spherical optics. However, a rigid peripheral structure may impose restrictions on the positional adjustment of control points, and in some examples a flexible peripheral structure such as a guide wire may be positioned around the periphery of the membrane, and locations of control points on the flexible peripheral structure may be controlled. Membrane attachments may be attached to the peripheral structure, such as attached to a support ring or guide wire, and movement of the membrane attachments along a guide path may be used to adjust the membrane profile and at least one optical property of the lens, such as focal length. In some examples, one or more actuators may be used to control the surface profile of the membrane, for example, by adjusting a line tension within the membrane, or by moving one or more membrane attachments along a guide path. The membrane may be a distensible membrane, such as an elastic membrane.

In some examples, a membrane may have one or more control points, that may include locations within an edge portion of a membrane (arranged, for example, around a periphery of a membrane) that may be moved. For example, a fluid lens may include a membrane and one or more membrane attachments, that may provide actuation points for the membrane. In some examples, a membrane attachment may move along a guide path in response to elastic forces, and not be an actuation point, and in some examples one or more membrane attachments may be hingedly or pivotally attached to a support structure. In some examples, an actuator may be configured to move at least one control point along a respective guide path to adjust the optical properties of the fluid lens. Control points may be provided by membrane attachments, that may be mechanical components attached to the membrane on which an actuator may exert an actuation force. The actuation force may be used to move the membrane attachment along a guide path, where the guide path is determined by the configuration of a support structure. An example support structure may be attached to the substrate and provide, for example, a surface, slot, groove, or any other suitable mechanical configuration that restricts motion of the membrane attachment to a predetermined guide path.

Figure 6A:
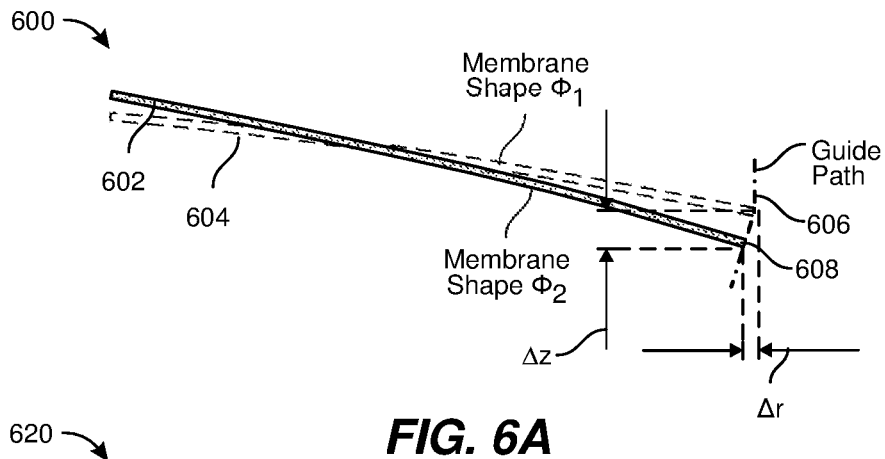
FIGS. 6A-6B illustrates changes in a membrane profile of an example fluid lens, for example, using support structures that provide guide paths.

FIG. 6A shows a simplified schematic of an example fluid lens 600, including at least one support structure (not shown) that provides a guide path 606 (in this example, a sliding guide path). FIG. 6A shows a membrane having first and second shapes 602 (denoted by solid lines) and 604 (dashed lines), respectively. The membrane shape may also be referred to as a membrane profile. The membrane may be adjusted between the first and second profiles by moving an edge portion of the membrane 608 along the guide path 606. The guide path may be configured so that, as the edge portion of the membrane 608 is moved downwards (e.g., towards the substrate) a distance $\Delta z$, the edge portion of the membrane moves inwards, towards the optical center of the lens, by a distance $\Delta r$. In some examples, the guide path may have a generally curved form in which the edge portion of the membrane may move inwardly towards the optical center, as the edge portion moves towards the substrate (or, as the curvature of the membrane increases).

Figure 6B:
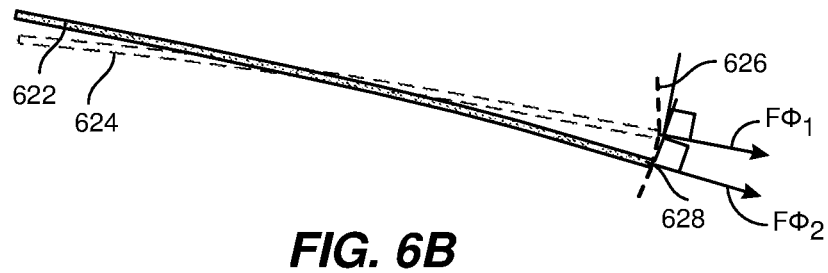

FIG. 6B shows a simplified schematic of an example fluid lens 620, including at least one support structure (not show) that provides a guide path 626. FIG. 6A shows a membrane having first and second shapes 622 (solid lines) and 624 (dashed lines), respectively. The membrane may be adjusted between the first and second shapes by moving an edge portion of the membrane 628 along the guide path 606. The guide path may be configured so the elastic force exerted by the edge portion of the membrane remains normal to the guide path as the edge portion moves along the guide path. In both FIGS. 6A and 6B, the edge portion may correspond to a membrane attachment that is attached to a periphery of the membrane.

The example guide path shown in FIGS. 6A and 6B (and also shown in FIG. 7 below) may be configured so that the strain energy in the membrane is approximately equal for all or most actuation states (e.g., for all or most locations of the membrane attachment along the guide path). Example guide paths may also (or alternatively) be configured so that the force reaction at the membrane edge is normal to the guide path at the location of the control points along the guide path. The elastic force exerted by the membrane on the membrane attachment may be directed in a direction approximately normal to the guide path, at the respective location of the membrane attachment along the guide path.

The figure illustrates guide paths in terms of a parameter $\Delta z$, or "z-displacement" (corresponding to what may be termed a vertical displacement, axial displacement, or height above the substrate) and a parameter $\Delta r$, or "r-displacement", corresponding to what may be termed a radial displacement from the optic axis (that may be determined in a direction normal to the optic axis). The figure illustrates a curved guide path that may be provided by the support structure, that may be used as a guiding device. The radial displacement may be normal to the axial displacement, and the axial displacement may be parallel to the optical axis, in a fluid lens application.

The z-displacement (axial displacement) may be dependent on the frame shape and/or on the edge seal conditions. The r-displacement (radial displacement) may be determined such that the strain energy in the system is at least approximately equal, such as effectively identical, for all states. In this context, a "state" may correspond to an optical property of a fluid lens, such as a focal length, that may be obtained using locations of the membrane control points along a respective guide path.

The fluid lens, in particular the guide path, may be configured so that the angle between the reaction force F between the edge of the membrane and the guiding surface, and the local normal to the guide path provided by the guiding surface, may be approximately zero degrees or a low angle (e.g., less than 5 degrees, and in some examples less than 1 degree).

Typical values of z and r for an approximately one-inch radius round lens are shown below in Table 1.

TABLE 1

| Φ Diopters | Δr mm | Δz mm |
|---|---|---|
| 0.5 | −0.0016 | −0.0224 |
| 2 | −0.0251 | −0.4491 |
| 3.5 | −0.0770 | −0.8746 |

A similar approach may be used for a non-circular lens. The guide path, that may define a trajectory for a control point of the membrane during lens adjustment, may be calculated for every point on the membrane perimeter in a plane which passes through the optical center of the lens.

Figure 7:
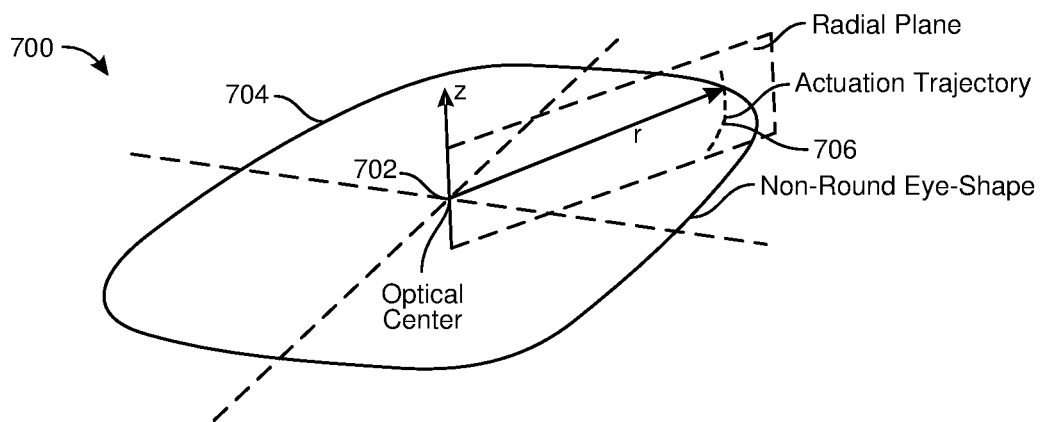
FIG. 7 illustrates an example non-circular fluid lens, including an example guide path.
Figure 8:
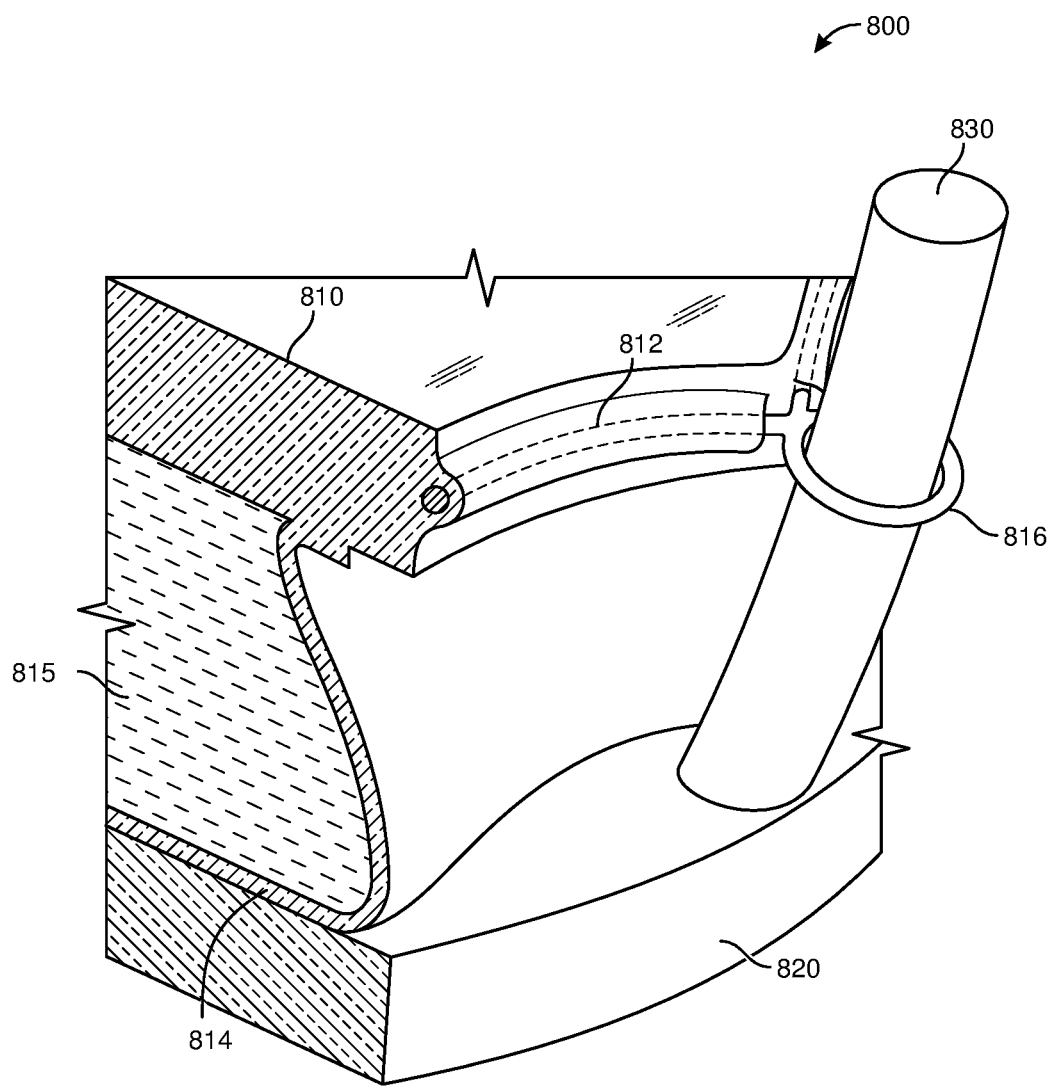
FIG. 8 shows an example fluid lens including a guide post.

FIG. 7 illustrates an example non-circular fluid lens 700, having an optical center 702, non-circular periphery 704, and an example guide path 706. The guide path may describe the actuation trajectory, for example, of a membrane attachment. The illustrated lens has an optical center 702 through which an optical axis passes, that may be used as the z-axis and may be referred to as the vertical direction or axial direction. The term "vertical" used here is arbitrary and not intended to place any limitation on the lens orientation.

An example of "zero-strain" guide path for a control point (e.g., a trajectory allowing appreciable reduction or substantial elimination of elastic energy change in the membrane during lens adjustment), for a non-round lens, is shown below in Table 2.

TABLE 2

| Φ Diopters | Δr mm | Δz mm |
|---|---|---|
| 0.5 | −0.0031 | −0.2443 |
| 2 | −0.0499 | −0.9802 |
| 3.5 | −0.1558 | −1.7278 |

The guide path may be configured so that the elastic energy within the membrane is approximately unchanged as the membrane attachments are moved along the respective guide paths. Using this approach, the actuation force may be very low, and may be approximately zero, as related to changes in the strain energy of the membrane. In some examples, a relatively low actuation force may be used to overcome frictional forces and the like. The actuation force may be positive or negative at any of the control point locations.

In some examples, a guide path may be provided by a support structure including one or more of the following: a pivot, a flexure, a slide, a guide slot, a guide surface, a guide channel, or any other suitable mechanism. A support structure may be entirely outside the fluid volume, entirely inside the fluid volume, or partially within the fluid volume.

In some examples, an advantage of the "zero actuation force" approach (where the actuation force is greatly reduced and may be mostly force required to overcome friction) is that a lens may be actuated into a particular configuration (such as a particular optical power) and the membrane may then tend to remain in that particular configuration, that may be neutrally stable. This may greatly reduce actuation power requirements, as no appreciable force may be needed to hold the lens in any particular configuration.

In some examples, a fluid lens (that may also be termed a fluid-filled lens) may include a relatively rigid substrate and a flexible polymer membrane. The control points may be provided by membrane attachments, that may be attached to the membrane or a peripheral structure (such as a guide wire) and may interact with a corresponding support structure that provides a guide path. For example, the membrane may be attached to at least one support structure at control points disposed around the membrane periphery. A flexible edge seal may be used to enclose the fluid. The lens power can be adjusted by moving the location of control points along guide paths, for example, using one more actuators. Guide paths (that may correspond to reduced work trajectories of the control points) may be determined that maintain a constant elastic deformation energy of the membrane as the control point location is moved along the guide path.

Guide devices may be attached to (or formed as part of) the substrate. Sources of elastic energy include hoop stress (tension in azimuth) and line strain, and elastic energy may be exchanged between these as the membrane is adjusted. Example "zero-strain" guide paths may greatly reduce or substantially eliminate the energy required for lens adjustment. In some examples, the force direction used to adjust the control point location may be normal to the elastic force on the support structure from the membrane. There are great possible advantages to this approach, including much reduced actuator size and power requirements and a faster lens response that may be restricted only by viscous and friction effects.

In the analysis used to determine the guide path, the fluid may be assumed to be incompressible so that the fluid volume does not change. A "zero-strain" guide path may be readily determined for a circular lens. The analysis for non-circular lenses may be slightly different, and in some cases the work required for adjustment may be reduced but not entirely eliminated. An example simplified approach determines a guide path for which there is no elastic force component in the guide direction, so that the force direction used to adjust the control point location is normal to the elastic force on the support structure from the membrane.

In some examples, a liquid lens may be adjusted by moving each control point of an elastic membrane along a guide path, that may be determined so that the elastic deformation energy of the membrane is substantially unchanged by the adjustment. This may allow for greatly reduced actuation power and a faster response. An example approach uses a guide wire, such as a steel wire with an optional thermoplastic polyurethane (TPU) coating, positioned along the perimeter of the membrane. If the perimeter distance is reduced, the control points of the membrane may move along the guide path towards the substrate.

In some examples, at least one optical parameter of a fluid lens may be determined at least in part by a physical profile of a membrane. In some examples, a fluid lens may be configured so that at least one optical parameter of the lens may be adjusted without changing the elastic strain energy in the membrane. In some examples, at least one optical parameter of the lens may be adjusted using an adjustment force, for example, a force applied by an actuator, that is normal to a direction of an elastic strain force in the membrane (e.g., at the periphery of the membrane). In some examples, a guide path may be configured so that the adjustment force is always at least approximately normal to the elastic strain force during adjustment of the fluid lens. For example, the angle between the adjustment force and the elastic strain force may be within 5 degrees of normal, for example, within 3 degrees of normal.

Example applications of the principles described herein include a device including a deformable element such as a membrane (where the deformable element may be in elastic tension), a substrate, a fluid at least partially enclosed between the membrane and the substrate, and a support structure configured to provide a guide path for an edge portion of the deformable element. The guide path may be configured such that adjustment of the device changes a profile of the deformable element without changing an elastic strain energy within the deformable element. The guide path may be configured such that adjustment of the device changes a profile of the deformable element by applying an actuation force normal to an elastic strain force in the deformable element.

In some examples, a device, such as an adjustable fluid lens, includes a membrane in elastic tension, a substrate, a fluid at least partially enclosed between the membrane and the substrate, and a support structure configured to provide a guide path for an edge portion of the membrane. The guide path may be configured so that there is approximately no change in the total strain energy in the membrane as the edge portion of the membrane moves along the guide path.

In some examples, the optical power of the fluid lens may be adjustable by moving a location of the edge portion of the membrane along the guide path. The device may further include at least one actuator configured to adjust the location of respective one or more edge portions of the membrane. The elastic energy may be substantially independent of the location of the edge portion along the guide path. In some examples, the guide path may be configured so that the elastic tension is directed normal to the local direction of the guide path for each location on the guide path.

In some examples, the device includes a fluid lens having an optical center, where locations on the guide path have a radial distance from the optical center and an axial displacement from the substrate. The guide path may be configured such that the radial distance decreases as the axial displacement (or vertical distance) decreases. The guide path may be configured such that the guide path curves inwardly towards the optical center as the axial displacement decreases. In some examples, the elastic tension may have no appreciable component directed tangentially along the guide path. A device may further include a membrane attachment (that may also be termed an interface device) that connects the membrane to the support structure and may allow the membrane to move freely along the guide path. A support structure may include at least one of a pivot, a flexure, a slide, a guide slot, a guide channel, or a guide surface.

In some examples, a device may further include an edge seal configured to help retain the fluid between the substrate and the membrane. The edge seal may be connected to the substrate and the membrane, and may be flexible to allow movement of the peripheral region of the membrane. A device may include a plurality of support structures, with each support structure mechanically interacting with a respective membrane attachment.

In some examples, a device includes a fluid lens having a deformable element such as a membrane (where the deformable element may be in elastic tension), a substrate, a fluid at least partially enclosed between the membrane and the substrate, and a support structure configured to provide a guide path for an edge portion of the deformable element, such as a membrane attachment attached to a periphery of a membrane. The guide path may be configured such that adjustment of the device changes a profile of the deformable element without appreciably changing an elastic strain energy within the deformable element. The guide path may be configured such that adjustment of the device changes a profile of the deformable element by applying an actuation force normal to an elastic force exerted by the deformable element.

In some examples, a method of adjusting a fluid lens (e.g., including a membrane such as an elastomer polymer membrane) includes adjusting a respective position of one or more control points such that the optical power of the fluid lens changes while the elastic strain energy in the elastomer polymer membrane does not change appreciably. An example method may further include applying an actuation force to the membrane to change the optical power of the fluid lens, where the actuation force is applied in a direction normal to an elastic strain force within the membrane. The actuation force may move a control point of the membrane along a guide path, and the control point may be located within an edge portion of the membrane. A control point may be provided by a membrane attachment that mechanically interacts with a support structure attached to the substrate. In some examples, the control point may be taken to be a location of a membrane attachment, for example, where it is attached to an edge portion of the membrane.

In some examples, a fluid lens may include a membrane attachment (that may also be referred to as an interface device) that interconnects the support structure and the membrane. The membrane attachment may be configured to provide one or more of the following aspects: to mechanically connect the membrane control points to the support structure, to react the loads from the guide wire into the support structure, to move freely along the guides, and/or to provide an interface for the actuation system.

In some examples, the actuation guide may include a post, a slotted structure, or other suitable mechanical configuration. The configuration of the actuation guide (such as an angle between the actuation guide and the substrate) may be adjusted as the lens is adjusted to provide a desired guide path. For example, the angle between a post and the substrate may be dynamically adjusted as the lens power is adjusted by moving one or more control points.

In some examples, the membrane assembly may include one or more control points. A control point may be a point on the periphery of a tensioned optical membrane, where the location of the control point relative to other fluid lens components (e.g., the distance between the control point and a substrate) may be controlled, for example, using an actuation guide and an actuator. A control point may also be referred to as an actuation point, for example, if the location is controlled by an actuator.

In some examples, the control point may be a hinge point, which may be considered a static control point, and which may allow some rotation and/or twist of the membrane boundary while, in some examples, maintaining a fixed distance between the control point and the substrate.

Dynamic effects relating, for example, to the instantaneous angle between the membrane and the actuation guide, may result in the ideal actuation trajectory being a function of both the direction and of the speed of actuation. Actuation may be less than expected, for example, if the actuation force is significantly larger than for quasi-static actuation (e.g., greater than 0.1N for quasi-static actuation of some fluid lenses). Hence, in some angles, the configuration (such as the orientation) of an actuation guide relative to the substrate may be adjusted to modify the guide path based on the direction and/or the speed of the actuation. An electronic control unit may be used to both control the actuation of the lens and dynamically adjust the configuration of the actuation guide (such as the angle between the actuation guide, such as a post, slot, or other element) and the substrate.

In some examples, a fluid lens may be configured such that the actuation force may be reduced, and the actuation stroke may be correspondingly increased. In some examples, a fluid lens be configured such that the actuation force may be increased, and the actuation stroke may be correspondingly decreased. This may, for example, allow use of relatively high-force, low-stroke linear piezoelectric actuators.

In some examples, the guide path for a control point (that may be termed an actuation trajectory) may be dynamically changed before and/or during actuation. The guide path may be controlled so that the strain energy of the membrane is (at least approximately) unchanged. Strain energy may be related to the work done by external forces in causing a deformation of the membrane, which is stored within the membrane in the form of strain energy. If the strain energy does not change during the adjustment of the fluid lens, the work needed for the adjustment may be greatly reduced and, in some cases, substantially eliminated. The strain energy may be related to the line tension, that may be the tensile force per unit length of a distensible membrane. A guide path may be referred to as a zero-strain trajectory if the guide path leaves the line tension in the membrane substantially unchanged during adjustment of the lens (e.g., during adjustment of the optical power of the lens).

FIG. 8 shows an example adjustable fluid lens 800, including membrane 810, peripheral structure 812 (which, in this case, may include a guide wire), substrate 820, and support structure 830, in this example including a curved guide post (which may also be referred to a guide pin) as the actuation guide. The portion of the peripheral structure 812 denoted by dashed lines may have a polymer coating, and the polymer coating may, at least in part, be provided by or attached to the membrane. A membrane attachment 816 is connected to peripheral structure 821 that may define a membrane control point at the periphery of the membrane. Membrane attachment 816 includes a ring-shaped form that may encircle and engage with the support structure 830. The membrane 810 and substrate 820 together help define an enclosure for the lens fluid 815. A combined edge seal/substrate coating 814 helps retain the fluid within the enclosure. In this example, the edge seal is integrated with a substrate coating, but in some examples the substrate coating may be omitted and the edge seal may be connected to an edge portion of the substrate. In some examples, edge seal/substrate coating 814 and membrane 810 may cooperatively form the enclosure for the fluid, and the combination may be termed a "bag."

An actuator may be configured to move the membrane attachment 816 along the support structure 830, but this is omitted from the figure for the sake of clarity. In some examples, the actuator may be supported by the substrate.

A fluid lens may be configured with a zero-strain membrane configuration. In this context, a zero-strain membrane configuration is one in which adjustment of, for example, the focal length of the lens does not require large changes in the elastic energy stored in the membrane. A membrane (e.g., a tensioned distensible membrane) may form part of an enclosure in which the lens fluid is located. The enclosure may also include a side wall and/or a substrate. In some examples, the fluid may be enclosed, at least in part, by a collapsible side wall or bag, and/or a hard substrate or lens. The enclosure may be filled with incompressible refractive fluid. The line tension of the membrane may be supported by a peripheral structure, such as a one or more guide wires, that may be connected to a membrane attachment including an actuation support that engages with a support structure including an actuation guide, such as a straight or curved guide post. Actuation of the lens may be accomplished by moving the actuation support along a respective actuation guide, for example, either towards or away from the substrate, thereby changing the membrane profile (e.g., changing the curvature of the membrane).

In some examples, a fluid lens may be termed a zero-strain lens. A zero-force actuation trajectory for each of one or more membrane attachments, or guide path, may be defined by support structure (such as the curvature or outside surface profile of a curved pin), where the shape of the trajectory, which may be termed the guide path, may be configured such that the reaction force (F) of the membrane attachment support on the support structure is generally normal to the trajectory for quasi-static actuation, along some or all of the guide path. Since there is no component of this force in the direction of travel of the membrane attachment, in the limit of low friction between the membrane attachment and the support structure, the force needed to actuate the lens tends to zero. The lens configuration may be termed "zero-strain", since no net work is needed to move the membrane attachment along the guide path. There may be strain redistribution within the membrane, but there may be no change in the total strain energy of the membrane.

Figure 9A:
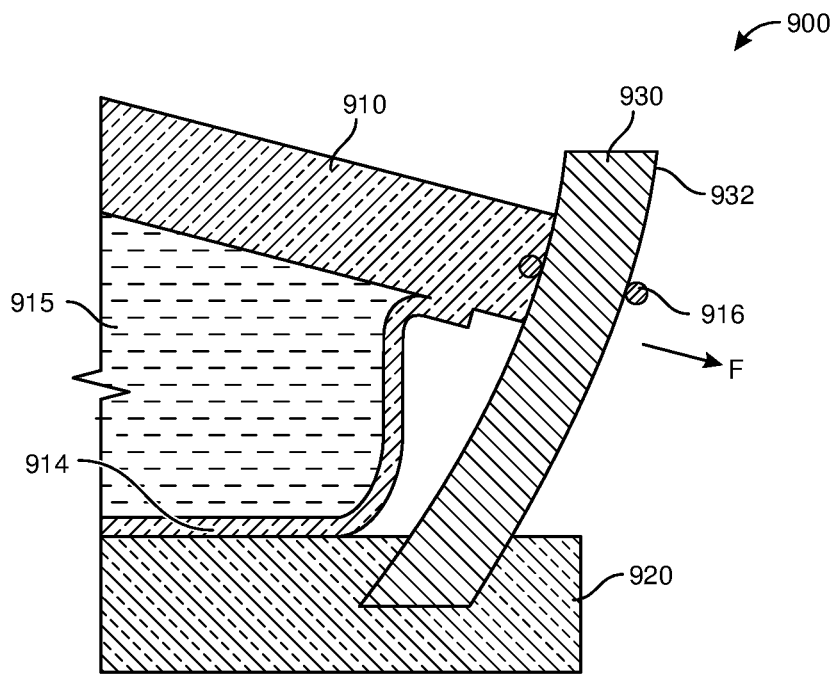
FIGS. 9A-9C further illustrate example fluid lenses including a guide post.

FIG. 9A shows a section view of a portion of a fluid lens 900, which may have a zero-strain lens configuration, as discussed above, and which may be similar to the lens described above in relation to FIG. 8. FIG. 9A shows fluid lens 900 including membrane 910, substrate 920, and support structure 930, in this example including a curved guide post as an actuation guide. A membrane attachment 916 may be connected to membrane 910, in some examples through a peripheral structure (not shown), that may define a membrane control point. The membrane attachment 916 may include a ring-shaped form that encircles and engages with the support structure 930. The membrane 910 and substrate 920 together help define an enclosure for the lens fluid 915. A combined edge seal/substrate coating 914 helps retain the fluid 915 within the enclosure. In this example, the edge seal may be integrated with a substrate coating, but the substrate coating may be optional.

Figure 9B:
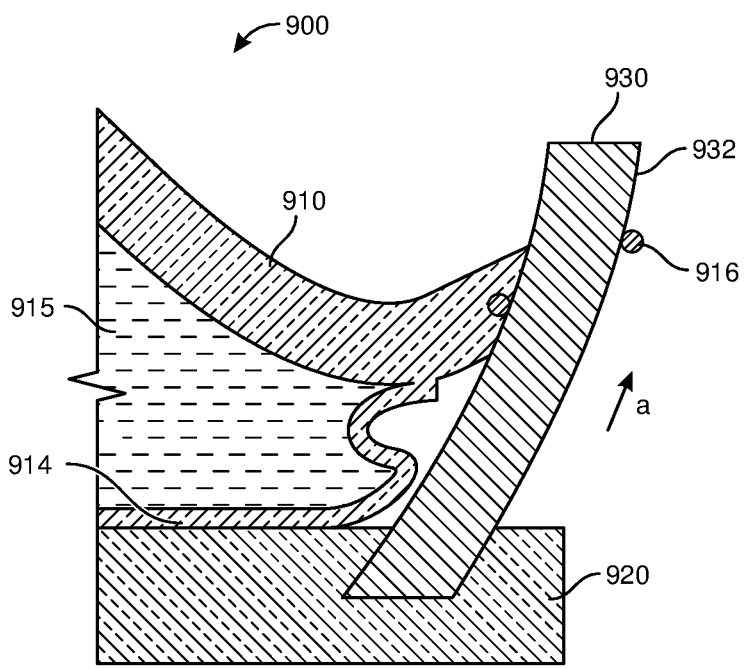
Figure 9C:
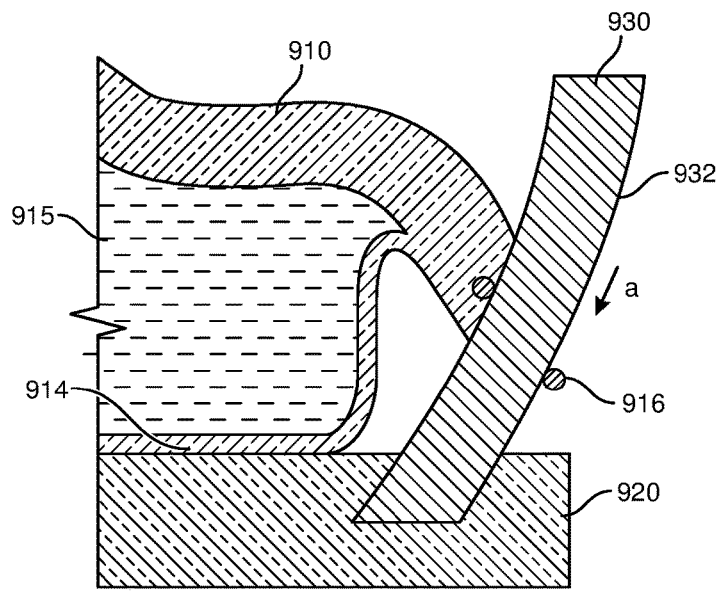

FIGS. 9B and 9C shows the lens 900 in different states during dynamic actuation. Relatively fast acceleration of membrane attachment 916 along support structure 930 may cause the angle between the membrane 910 and the guide path (as defined by the outer surface 930 of the support structure) to differ from the value observed during slow (e.g., quasi-static) actuation. FIG. 9B shows the membrane attachment being moved up the support structure, away from the substrate, and FIG. 9C shows the membrane attachment being moved down the support structure, towards the substrate. These movements of the support structure may correspond to adjustments of the focal length of the fluid lens. In FIGS. 9A-9C, the membrane thickness may be exaggerated for illustrative clarity. In some examples, the membrane may be attached to the membrane attachment, the membrane attachment may engage with the actuation guide, and the edge of the membrane may not contact the actuation guide (e.g., as shown in FIG. 8). For example, the membrane attachment may slide (or otherwise move) along the support structure, in this example including a guide post, without the membrane edge contacting the guide post.

In some examples of dynamic actuation, the reaction force of the membrane attachment on the support structure may not remain normal to the guide path, and instantaneous actuation forces larger than those due to friction may have to be overcome. The angle between the membrane and the support structure shown in FIGS. 9B and 9C may be exaggerated to more clearly illustrate this effect. Finite element models have shown the difference between the guide-normal and the membrane may be up to about 3 degrees.

FIGS. 10-13 illustrate further examples of fluid lens configurations, including fluid lenses that may have zero-strain membrane adjustment configurations.

Figure 10:
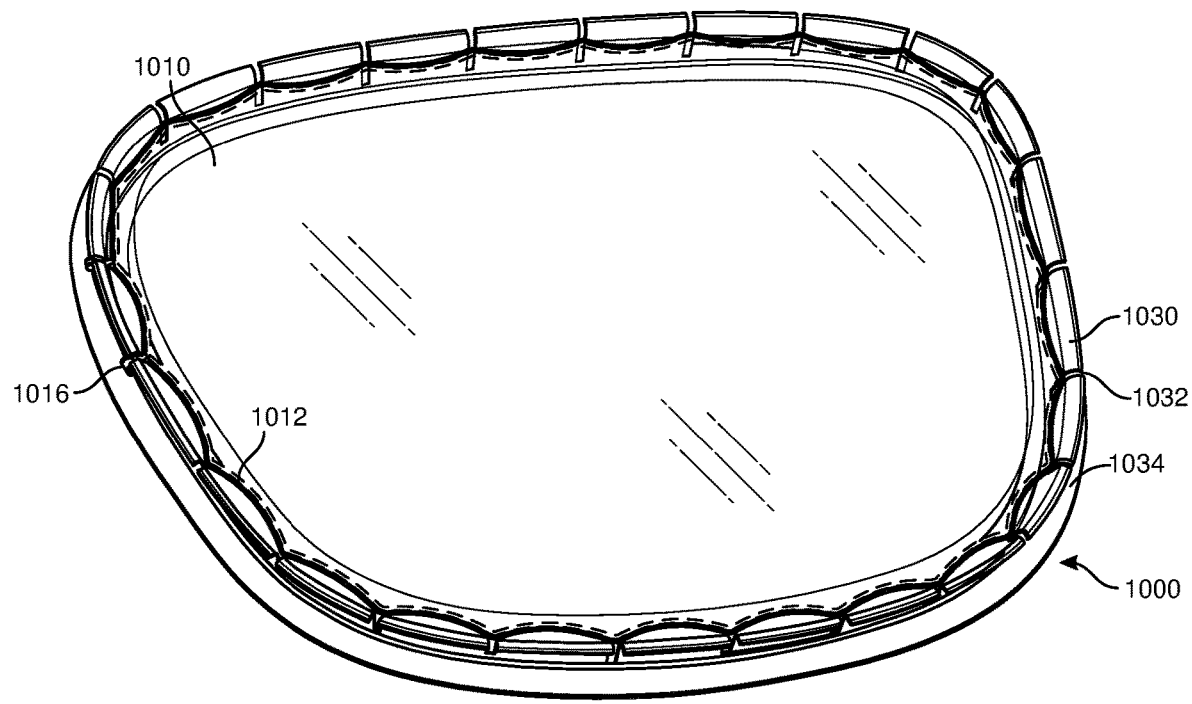
FIG. 10 illustrates an example membrane assembly.

FIG. 10 shows a device including a membrane assembly 1000 located within a support structure 1030. The membrane assembly 1000 includes a membrane 1010, with a peripheral structure 1012 (in this example, including a guide wire), membrane attachments 1016, and support structure 1030, which may include slots 1032 through which a portion of the membrane attachments may extend (which may not all be shown in this figure for illustrative clarity). In this example, the membrane attachment 1016 may couple the peripheral structure 1012 to the colander-like support structure 1030. The support structure 1030 may have an outside surface profile that may define zero-force actuation trajectories, or guide paths, for the control points of the membrane. The support structure may include a base 1034, which may provide one or more of mechanical stability, attachment to another device component such as a frame, support for one or more actuators, or other suitable purpose.

Figure 11:
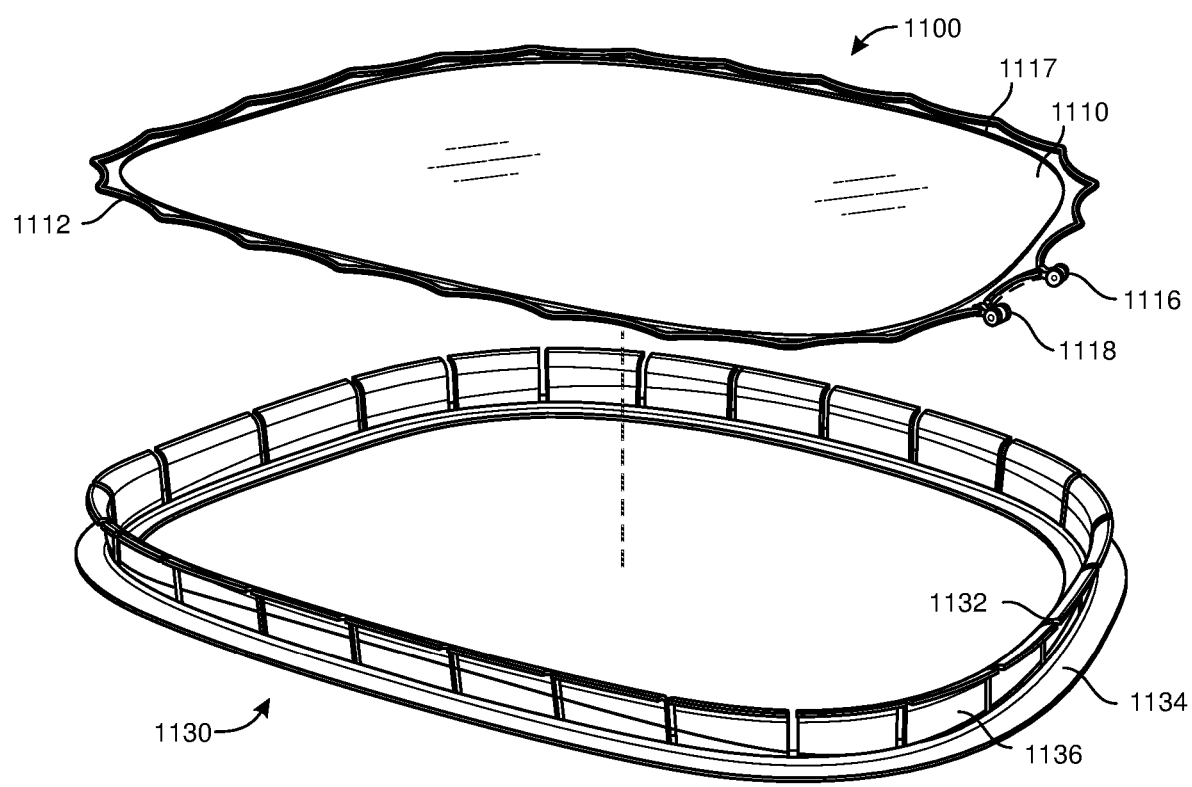
FIG. 11 illustrates an example membrane assembly.

FIG. 11 shows a view of an example membrane assembly 1100 including membrane 1110, peripheral structure 1112, and membrane attachments 1116 including a roller 1118. The membrane assembly may be similar to the membrane assembly shown in FIG. 10. The form of the lens shape (e.g., which may correspond to the interior periphery of a lens-surrounding frame, and/or support structure base, or other aperture-defining element) may be generally indicated by lines 1117. The figure also shows a support structure at 1130, having a colander-like form, including slots 1132 and base 1134. The support structure 1130 may be configured to receive the membrane assembly 1100. For example, slots 1132 may be defined within support structure 1130 and configured to receive a portion of respective membrane attachments 1116. For example, each membrane attachment 1116 may include one or more rollers 1118, and the rollers may be configured to travel along an outer surface 1136 of support structure 1130, with a portion of membrane attachment 1116 passing through a corresponding slot 1132. The base 1134 may support one or more actuators, as discussed further below. The outer surface may help define the guide path for the membrane attachments and hence the control points of the membrane.

Figure 12A:
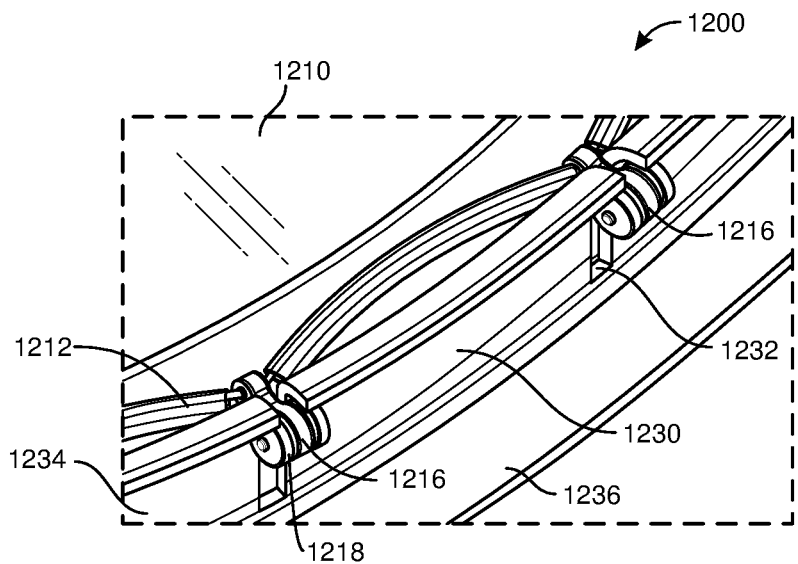
FIGS. 12A-12B further illustrate interactions of membrane attachments with corresponding support structures.
Figure 12B:
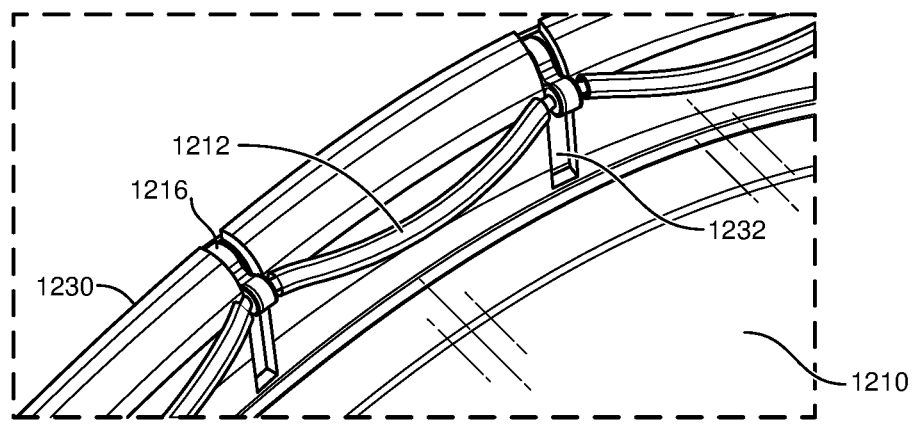

FIGS. 12A and 12B show an example engagement of a membrane attachment (including a roller) with a support structure including a slot, within a portion of an example fluid lens 1200. FIG. 12A shows a portion of fluid lens 1200 including membrane 1210, peripheral structure 1212, membrane attachment 1216, and support structure 1230 including slots 1232, and having an outer wall 1234 and base 1236. Each membrane attachment may include at least one roller 1218, which may be configured to engage with, and move along, the outer wall 1234 of the support structure 1230. The shape of the outer wall 1234 may help define a guide path for the roller, and hence effectively for a control point of the membrane. An actuator (not shown) may be used to control the movement of at least one roller along the guide path. In other examples, a membrane attachment may slidably engage with the outer wall 1234, or otherwise engage with the support structure 1230.

Each membrane attachment may engage with a respective slot in the support structure. The support structure may help retain the tension in an elastic membrane, and the outer surface of the support structure may help define a guide path for the membrane attachments. In some examples, the base of a support structure may be part of, or rigidly attached to, a lens substrate.

FIG. 12B shows another view of the portion of fluid lens 1200, also showing membrane 1210, peripheral structure 1212, and support structure 1230 including slots 1232. The membrane attachment 1216 may be bonded to the peripheral structure 1212 (that may include, e.g., a wire), and a portion of the membrane attachment may extend through a corresponding slot 1232.

Figure 13:
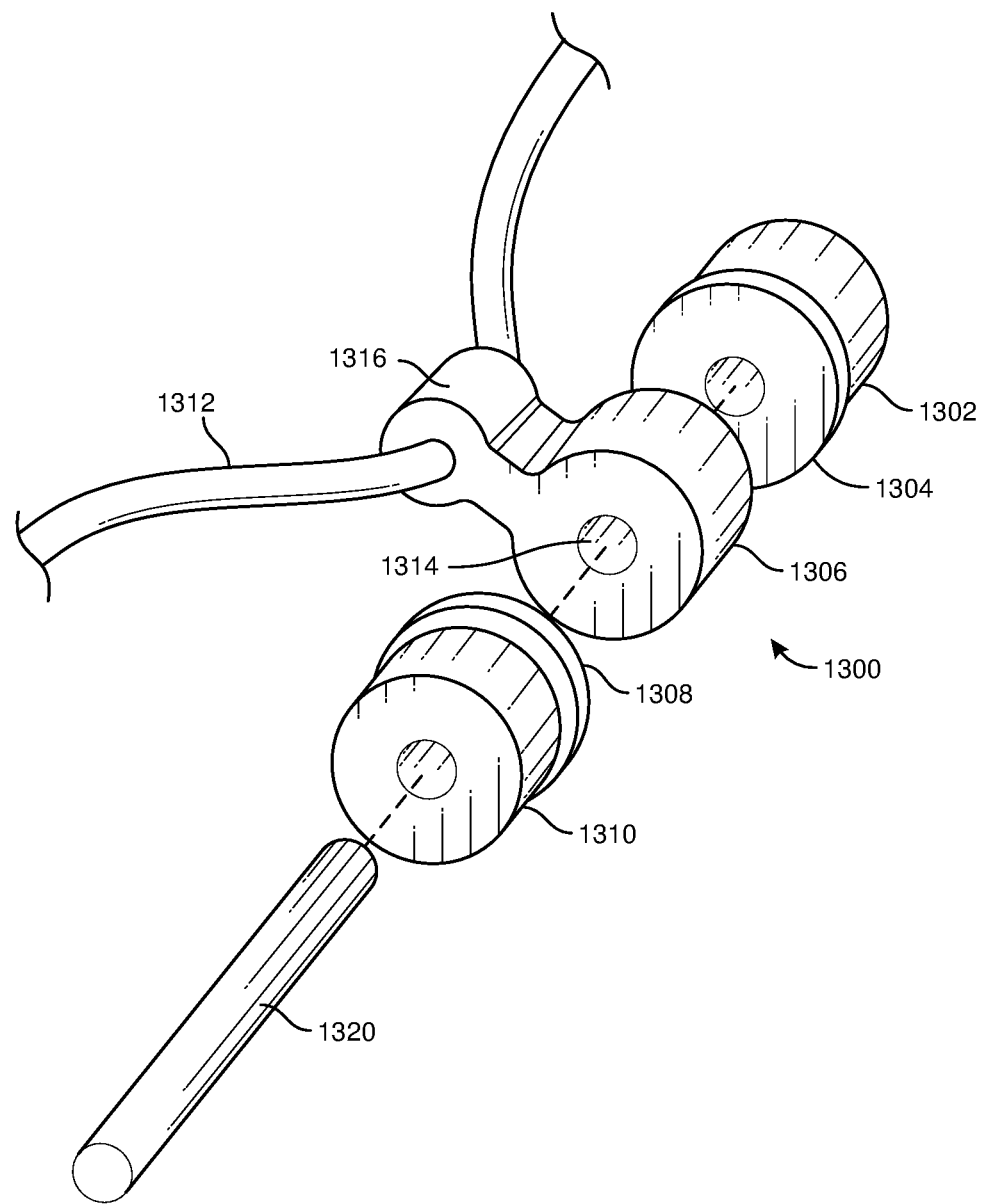
FIG. 13 further illustrates a membrane attachment including rollers.

FIG. 13 shows an exploded view of an example membrane attachment, including one or more rollers, that may form a portion of an example membrane assembly. Membrane assembly portion 1300 includes peripheral structure 1312, which may surround a membrane (not shown), and membrane attachment 1316 that may be attached to the peripheral structure. Membrane attachment 1316 includes a body portion 1306, which may have an approximately figure-of-eight shape. In this example, peripheral structure 1312 passes through an aperture in the body portion 1306, which helps attach the membrane attachment 1316 to the peripheral structure 1312. The body portion 1306 further includes an axle aperture 1314 through which shaft 1320 may pass. For illustrative clarity, shaft 1320 is shown removed from the membrane attachment. Shaft 1320 may function as an axle for one or more rollers (e.g., including jewel bearings), such as rollers 1302 and 1310. Rollers 1302 and 1310 may have lip features 1304 and 1308, respectively, that may be dimensioned to fit within a slot of a support structure (not shown in this figure for clarity).

In some examples, a shaft of a membrane attachment (such as an axle of a roller, or any other surface of the membrane attachment and/or actuation guide) may have a low-friction friction coating that may include one or more of tungsten disulfide, aluminum magnesium boride ceramic (BAM), other ceramic or glass, molybdenum disulfide, graphitic carbon, a fluoropolymer, or other suitable coating. In some examples, the axle aperture 1314, or portions of the roller, may have a low-friction coating, for example, on a surface that rotates around the shaft, or engages with a support structure. In some examples, one or more surfaces of a support structure may have a low-friction coating.

Figure 14C:
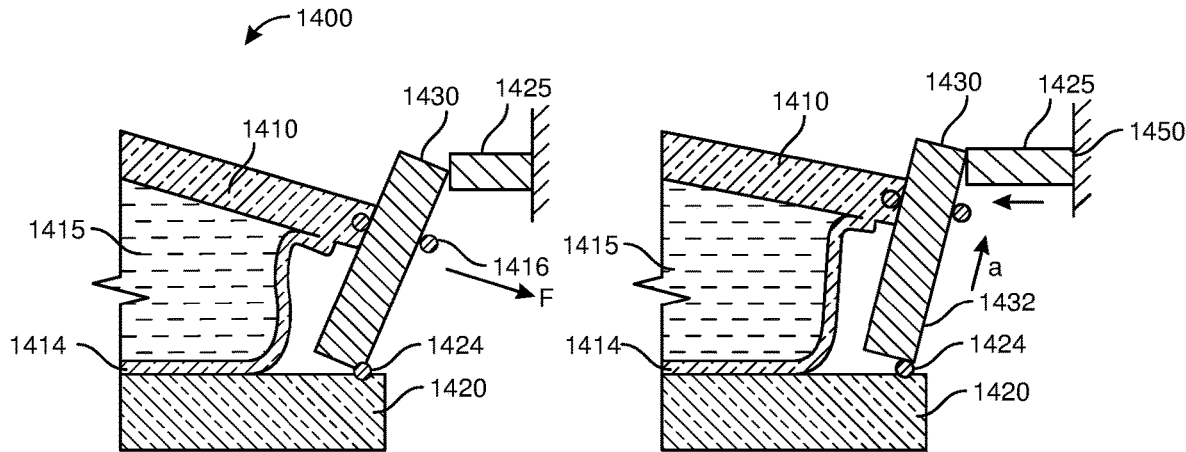
Figure 14C:
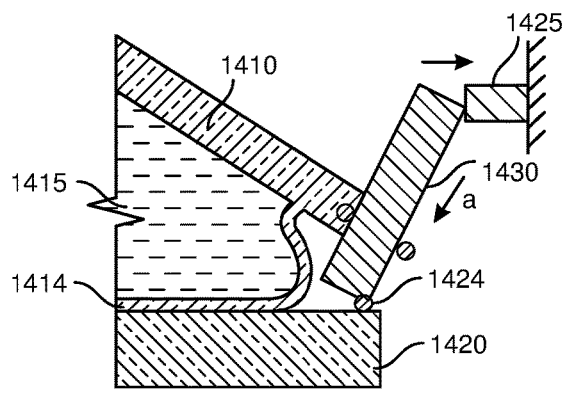

FIGS. 14A-14C show an embodiment of a portion of an adjustable fluid lens (that may be more concisely referred to as a lens) in section view. The figures show the lens 1400 in an intermediate optical power actuation state (FIG. 14A), a low optical power state (FIG. 14B), and a high optical power state (FIG. 14C).

FIG. 14A shows a portion of an example fluid lens 1400 including membrane 1410, edge seal 1414 (which may include a collapsible side wall and a substrate coating and may be part of a fluid lens enclosure, such as a bag), lens fluid 1415, membrane attachment 1416, and substrate 1420. In some examples, actuation may be accomplished by moving the membrane boundary (e.g., one or more membrane attachments) towards or away from the substrate 1420. The support structure may include an actuation guide (in this example a guide post 1430) hingedly attached to substrate 1420 by hinge 1424. In some examples, a pivot may be used in place of a hinge. Linear actuator 1425 may be anchored to an actuator support 1450 that may include or be provided by a chassis structure (not shown in detail), a frame of an eyewear device, or other device component, such as an actuator support mechanically attached to a substrate and/or support structure base. In some examples, the location of the actuator support 1450 may be fixed relative to the substrate 1420, for example, through a relatively rigid mechanical attachment. The action of linear actuator 1425 on guide post 1430 (indicated by unlabeled horizontal arrows in FIGS. 14B and 14C) may cause the guide post to tip so that the reaction force F (indicated by the arrow labeled "F" in FIG. 14A) exerted by the membrane attachment 1416 on the guide post 1430, or vice versa, may be no longer normal to the local direction of guide post elongation, such that the membrane tension tends to pull the membrane attachment along the guide post 1430 (indicated by arrow labeled "a" in FIGS. 14B and 14C), either away from or towards the substrate. Movement of the membrane attachment along the guide post may modify an optical property of the fluid lens. Hence, the actuator may be configured to modify the orientation of the guide post 1430 relative to the substrate, and thereby may also modify at least one optical property of the fluid lens.

FIG. 14B shows the guide post 1430 angled closer to being normal to the substrate 1420. A movement of the membrane attachment 1416 away from the substrate 1420, which may be induced by changing the angle of the guide post relative to the substrate, may correspond to reducing the optical power of the fluid lens, though this is not limiting. In some examples, the actuator 1425 may urge the guide post 1430 towards a normal orientation of the direction of elongation of the guide post relative to the substrate. The actuator 1425 may be attached to actuator support 1450, which may be a support structure connected to the substrate or other device element, such as a frame. The force on the guide post may be exerted relative to to the actuator support.

FIG. 14C shows the guide post 1430 angled closer to parallel to the substrate 1420. The movement of the membrane attachment 1416 towards the substrate 1420 may correspond to obtaining a higher optical power, though this is not limiting. In some examples, the actuator 1425 may exert a force on the distal end of the guide post (relative to the substrate) that urges the post towards (or in some examples, away from) a parallel orientation relative to the substrate.

In FIGS. 14A-14C, relative to some examples, the membrane thickness may be exaggerated for illustrative clarity. In some examples, the membrane may be attached to the membrane attachment, the membrane attachment may engage with the actuation guide, and the edge of the membrane may not contact the actuation guide (e.g., as shown in FIG. 8). For example, the membrane attachment may slide (or otherwise move) along the support structure, in this example including a guide post, without the membrane edge contacting the guide post. The direction that a membrane attachment may move along an actuation guide, such as a guide post, may be determined by the configuration of how the membrane attachment engages with the actuation guide, and the configuration of the actuation guide.

In some examples, the optical power of an adjustable fluid lens may be adjusted by changing the orientation of the support structure, or a component thereof (such as an actuation guide, such as guide post) relative to the substrate (or other device component, such as a frame). In some examples, the support structure, or component thereof, may be hingedly or pivotally attached to the substrate, or to an element attached to the substrate.

In some examples, adjusting an example fluid lens from an optical power of 0.5 D to an optical power 3.5 D lens may require an angular change of approximately 7.5° in the membrane alignment close to the guide post. A "friction" angle of 5° may be required to overcome the reaction force acting on a surface having a coefficient of friction of approximately 0.1. In some examples, a dynamic angle of up to about 3° may be used. In some examples, the angular change in the orientation of a guide post, relative to the substrate, may be approximately 15.5°. If, for example, the trajectory travel of a membrane attachment along the guide post is on the order of 1 mm, and the reaction friction force is on the order of 0.1N, then the actuator may have to move a distance of approximately 0.25 mm, and may require an approximately 1N force to adjust the lens.

FIGS. 15A-15C show a portion of example fluid lens 1500, including membrane 1510, edge seal 1514 (that may include a collapsible side wall, and may be part of a fluid lens enclosure such as a bag), fluid 1515, membrane attachment 1516, substrate 1520, pivot connection 1524, actuator 1526 (e.g., a linear actuator), and guide post 1530. In this example, the support structure includes guide post 1530 as the actuation guide. Angular movement of the support structure, in this case guide post 1530, is obtained by the action of actuator 1526, that is located, at least in part, between the substrate 1520 and an off-center portion (such as an edge portion of the base) of the guide post 1530.

FIG. 15A shows the actuator 1526 extended outwards from the substrate 1520, tipping guide post 1530 away from an orientation normal to the substrate. The force exerted by actuator 1526 may induce rotation (e.g., a pivot) of the guide post around the pivot connection 1524 between the guide post 1530 and the substrate 1520. The orientation (e.g., angle between direction of elongation of the guide post and the substrate) may be adjusted by the actuator 1526.

FIG. 15B shows an orientation in which the guide post 1530 is closer to normal to the substrate. The actuator 1526 may retract closer to the substrate (indicated by the downwards arrow), allowing the guide post to rotate to a near-vertical configuration. The leftward arrow shows the distal end of the guide post 1530 (distal relative to the pivoted or hinged attachment at 1524) moving towards the optical center of the lens as the actuator retracts. The membrane attachment may move up the guide post away from the substrate, as indicated by the arrow labeled "a". The combination of the variable angle of the guide post relative to the substrate, and the shape of the outer surface of the guide post (1532, here straight) help define the guide path for the membrane attachment 1516.

FIG. 15C illustrates that, as the actuator 1526 extends away from the substrate, indicated by a vertical arrow, the distal end of the guide post may tip away from the optical center of the lens, indicated by a horizontal arrow. In some examples, an extended actuator 1526 may contact the edge seal 1514, though this may not be a problem as the edge seal 1514 may be flexible. The membrane attachment may move down the guide post towards the substrate, as indicated by the arrow labeled "a". The direction of movement shown is exemplary, and in other examples a membrane attachment may move away from the substrate.

In FIGS. 15A-15C, the membrane thickness may be exaggerated for illustrative clarity. In some examples, the membrane may be attached to the membrane attachment, the membrane attachment may engage with the actuation guide, and the edge of the membrane may not contact the actuation guide (e.g., as shown in FIG. 8). For example, the membrane attachment may slide (or otherwise move) along the support structure, in this example including a guide post, without the membrane edge contacting the guide post.

In some examples, the leverage exerted by the actuator in the configuration of FIG. 15A may be up to five times greater than for the configuration shown in FIG. 13A, such that approximately 50 microns of movement may result from the application of approximately 5N of actuation force.

In some examples (such as the configurations shown in FIGS. 14 and 15), the guide post (or similar component of the support structure) may be generally straight. However, in some examples, other support structure configurations may be used, such as curved guide posts. In some examples, the shape of the guide post may be configured to approximate a zero-force guide path (e.g., an inwardly curving guide post) that may modify the angular change of the guide post between the actuation states used in the calculation. In some examples, use of a curved guide post may appreciably reduce the angular change in the orientation of the guide post relative to the substrate. In some examples, an angular change of 5-10 degrees may be used, such as approximately 8 degrees, instead of a larger angular change used with a straight guide post (such as approximately 15.5 degrees).

FIGS. 16-19 show further embodiments that may be similar to examples discussed above in relation to FIGS. 10-13, aspects of which may be combined in different ways in various examples. For example, the membrane, peripheral structure (e.g., a wire), and actuation structures may be similar to those discussed above in relation to FIGS. 10-13.

Figure 16:
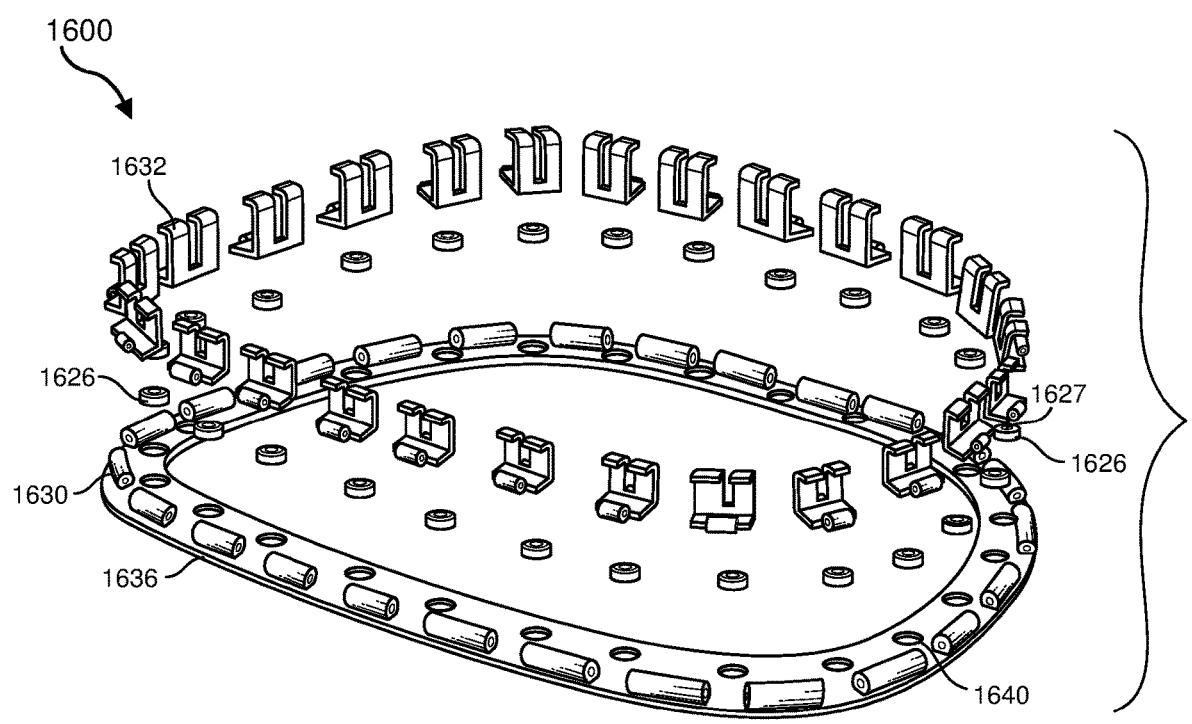
FIG. 16 shows an exploded view of various components of a colander-style support structure, according to some embodiments.

FIG. 16 shows an exploded view of various components of a support structure assembly 1600. In this example, the support structure assembly may be referred to as a "colander" configuration. Support structure assembly 1600 may include hinge supports 1630 and hole features 1640, located on base 1636. Linear actuators 1626 may fit into hole features 1640. Support structures 1632, in this example including U-bracket guides, may engage with hinge supports 1630. The support structures 1632 may include a slot through which a portion of a membrane attachment (from a membrane assembly, not shown) may extend. Linear actuators 1626 may have a hard ball-type upper contact surface 1627, through which a force may be exerted on the respective support structure. Pins may be included in the hinge-type connections, but are omitted from this figure for clarity. Membrane, wire(s), and actuator structures, along with the fluid, substrate, and any other fluid enclosure components, may also be included but are also omitted from this figure for illustrative clarity.

In some examples, each support structure may have an associated actuator. In some examples, one or more of a plurality of support structures may include an associated actuator, and other support structures may not have an associated actuator, and may act as passive guides for an associated membrane attachment.

In some examples, the support structure (which in some examples may be referred to as a "colander" structure) may include a base unit with one or more U-bracket type guide structures hingedly attached to the base structure. Actuators may be located underneath the guide structures (as illustrated), and may be configured to act on the guides structures to vary the angle of the guide structures relative to the substrate. For example, the actuators may tip the guide structures and actuate the lens.

Figure 17:
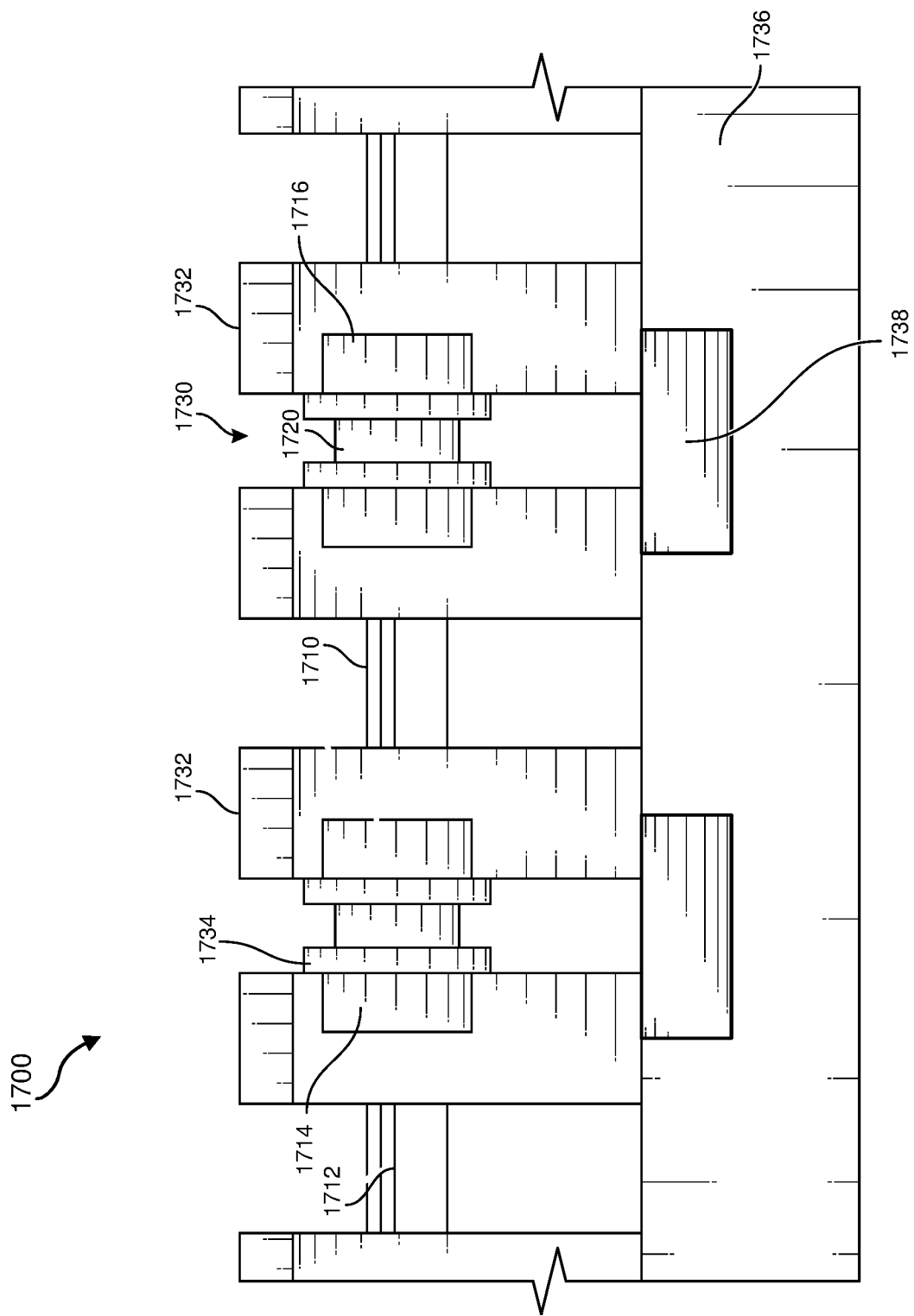
FIG. 17 shows a side view of an example fluid lens, including a support structure providing actuation guides having slots, for example, to provide a guide path for a membrane attachment including one or more rollers, according to some embodiments.

FIG. 17 shows a side view of a portion of an example fluid lens 1700. The side view may be a simplified representation of a portion of the side of a generally disk-shaped structure. Support structures 1732 (in this example, including U-bracket guides) may include slots 1730 to engage with rollers 1720, which may include jewel bearings 1714 and 1716. Rollers may have lip features 1734 configured to engage with the slots 1730 in the support structures 1732. The lens may include membrane 1710, peripheral structure 1712, hinge supports 1738 and base 1736. Membrane attachment and support structure components may, in some examples, be similar to other examples described herein.

The support structures 1732 may be hingedly (or pivotally) connected to the base 1736 (e.g., of a support structure assembly that may further include one or more actuators), though this is not shown in detail for illustrative simplicity.

In some examples, the base of a support structure assembly may be provided by a lens substrate, or a lens substrate may be supported by the base.

Figure 18A:
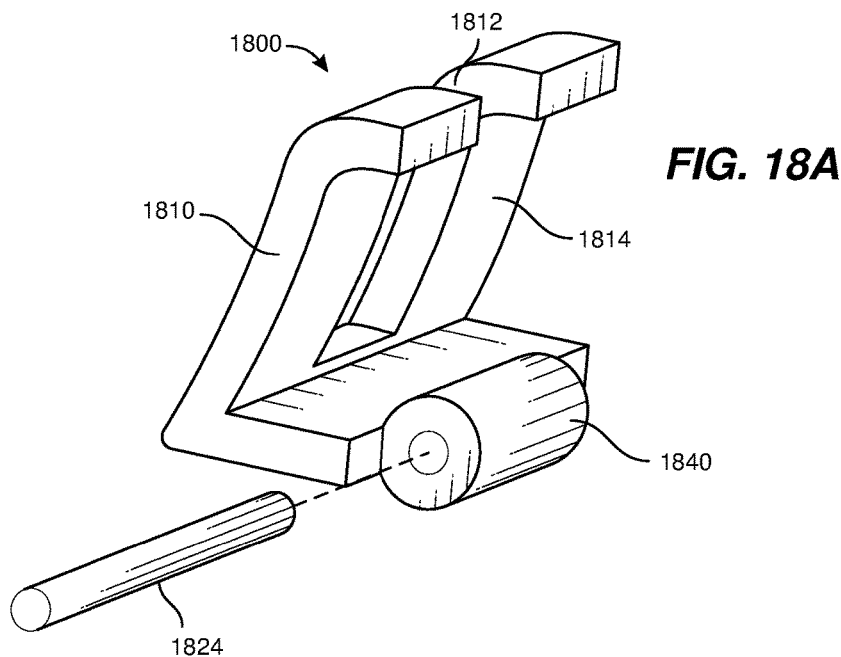
FIGS. 18A-18C show further details of an example actuation guide and an example actuator, according to some embodiments.
Figure 18B:
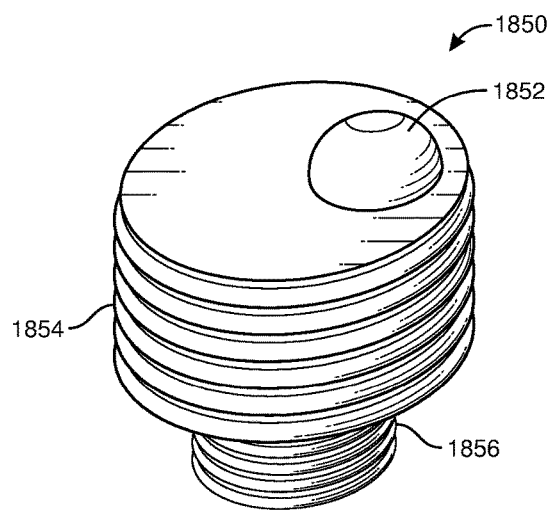
Figure 18C:
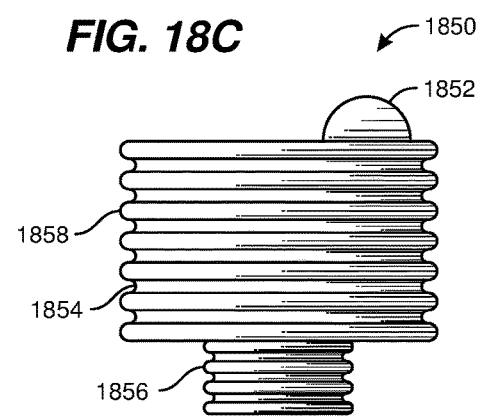

FIGS. 18A-18C illustrate further details relating to various example configurations. FIG. 18A shows a portion of an example support structure 1800. In some examples, a support structure 1800 may include a generally U-shaped bracket 1810 having a slot 1812 configured to engage with a membrane attachment (not shown in this figure). The support structure 1800 may have a surface 1814 shaped to provide a guide path that approximates a zero-force trajectory for a membrane attachment (e.g., as a portion of a membrane attachment moves along the slot 1812). Pin 1824 may provide a hinge-like coupling between the hinge attachment portion 1840 of the support structure 1800 and, for example, the base of the support structure assembly (not shown in this figure).

In a non-round lens, a zero-force guide path may be a function of one or more of the distance of the membrane attachment from the optical center of the lens, the eye-shape configuration (e.g., including fluid volume conservation effects), and/or one or more properties of the peripheral structure (e.g., number of membrane attachments, wire or other peripheral structure dimension, such as diameter, and the like) and curvature.

FIGS. 18B and 18C show views of an example actuator 1850, which in some examples may be configured to act on a support structure such as that shown in FIG. 18A. FIG. 18B shows actuator 1850 may include optional ball contact 1852, piezoelectric layers 1854, and electrodes 1858. Electrodes 1858 and piezoelectric layers 1854 may alternate in an interleaved structure, where actuation by individual piezoelectric layers may be cumulative within the device. The optional ball contact 1852 may be used to apply force from the actuator on a component of the support structure, such as a U-bracket guide. Other contact configurations may be used. Ball contact 1852 may include a relatively hard material, such as a ceramic, glass, or a metal such as steel. FIGS. 18B and 18C (a side view) show that the lower portion of the actuator 1856 may provide (e.g., through a reduced diameter or other lateral dimension) an actuator locator dimensioned to engage with another portion of the device, such as a hole feature.

In some examples, an actuator may be located on an actuator support that may be provided by (or attached to), for example, a portion of a support structure assembly, such as the base, the lens substrate, or the frame. The actuator may engage with a hole feature, for example, as discussed above.

Other components associated with a linear actuator, such as electrical connections and wires, control units, and power supplies, may be included in some examples but are omitted from this figure for illustrative clarity. In some examples, other actuators may be used, such as one or more of electromechanical, hydraulic, electroactive polymer, or other suitable actuator configurations.

In some examples, an actuator may be configured to move a support structure along a direction towards or away from the center of the lens; for example, along a radial direction. In some examples, an actuator may be configured to move a support structure towards or away from the substrate. In some examples, a support structure may describe a motion including a pivoting or hinged motion, and/or a translational motion relative to another device component (e.g., a substrate, actuator support, frame, or the like). Rotational and/or translational motion of the support structure (or a component thereof, such as an actuation guide, such as a guide post) may induce motion of the membrane attachment relative to, for example, the support structure and/or the substrate, and a change in at least one optical property of the lens.

Figure 19A:
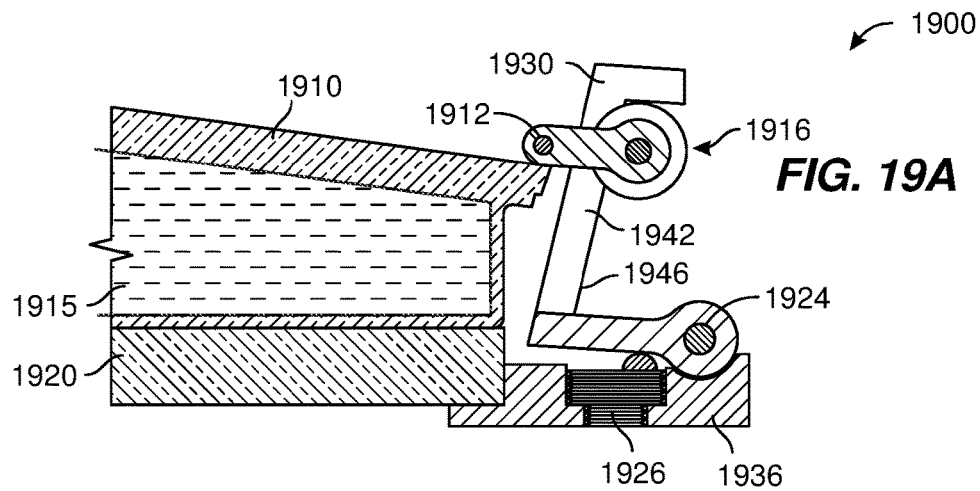
FIGS. 19A-19C show a sectional view of part of an example fluid lens configuration, including an actuator, and an actuation guide that may be configured to provide a zero-force trajectory, according to some embodiments.
Figure 19B:
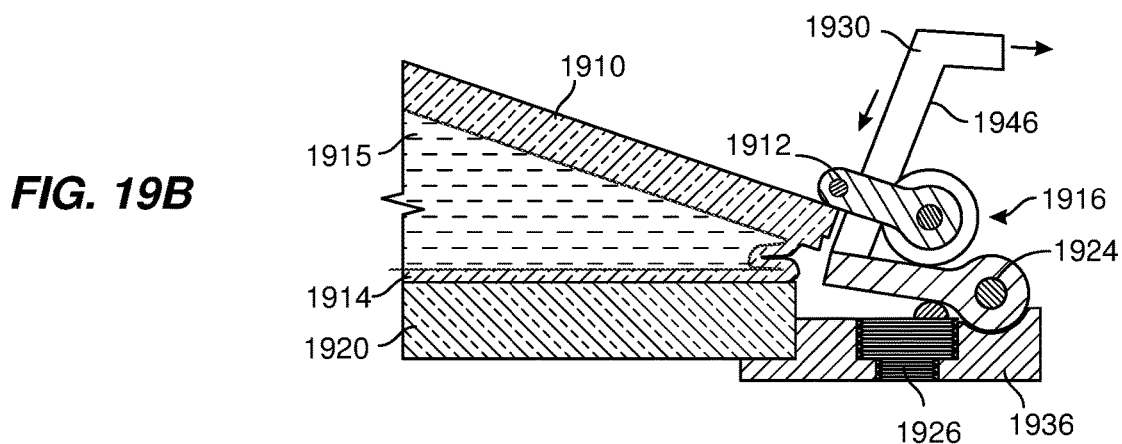
Figure 19C:
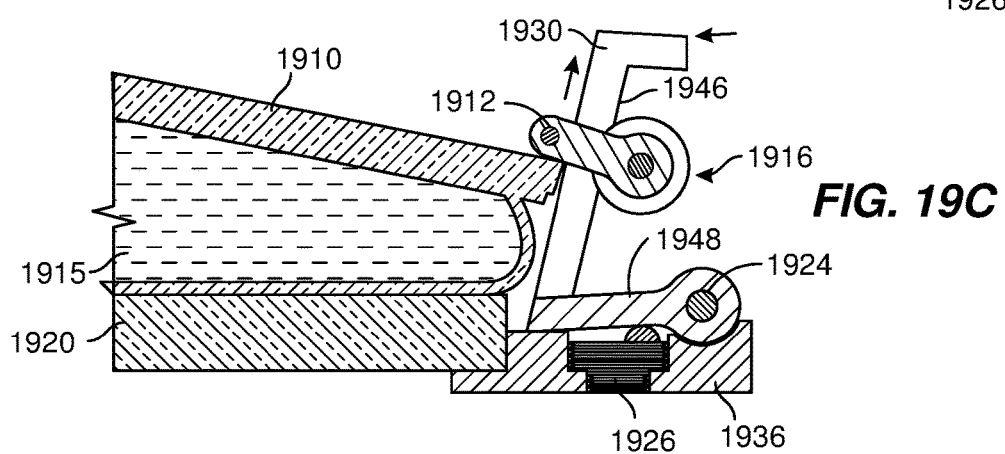

FIGS. 19A-19C show section views of a portion of example lens 1900 showing example lens operation. The lens 1900 may include membrane 1910, peripheral structure 1912, edge seal 1914, (that may include a collapsible side wall, and may be part of a fluid lens enclosure such as a bag), fluid 1915, membrane attachment 1916, substrate 1920, actuator 1926, and base 2036. The support structure 1930 may include a guide post 1942 pivotally attached to substrate 1936 by hinge 1924. Linear actuator 1926 may be anchored to an actuator support, which in this example may be provided by the substrate 1936. In some examples, an actuator may be attached to, or otherwise connected to, the substrate or a base of a support structure assembly. The peripheral structure 1912, such as a polymer-coated wire, may be bonded to the top of the membrane 1910, or other configuration used. For example, the peripheral structure may include a polymer-coated wire that may be bonded to portions of the membrane between the membrane attachments.

FIG. 19A show actuator 1926 in an intermediate position. The guide surface 1946 of support structure 1930, in combination with the angle adjustment, may approximate a zero force guide path for the membrane attachment 1916, which may maintain its position by friction.

FIG. 19B shows actuator 1926 at its greatest extent (e.g., away from the base, or, e.g., substrate), and membrane attachment 1916 may roll or otherwise move down guide surface 1946 of the support structure, as illustrated by the arrow directed along guide surface 1946 towards substrate 1920.

FIG. 19C shows actuator 1926 at its minimum extent, and the membrane attachment 1916 may roll up guide surface 1946 of support structure 1930. The figure also shows that the support structure includes a pivot arm 1948 connecting hinge or pivot connection 1924 and the actuation guide portion of the support structure, in this example guide post 1942 (e.g., as shown in FIG. 19A).

Figure 20:
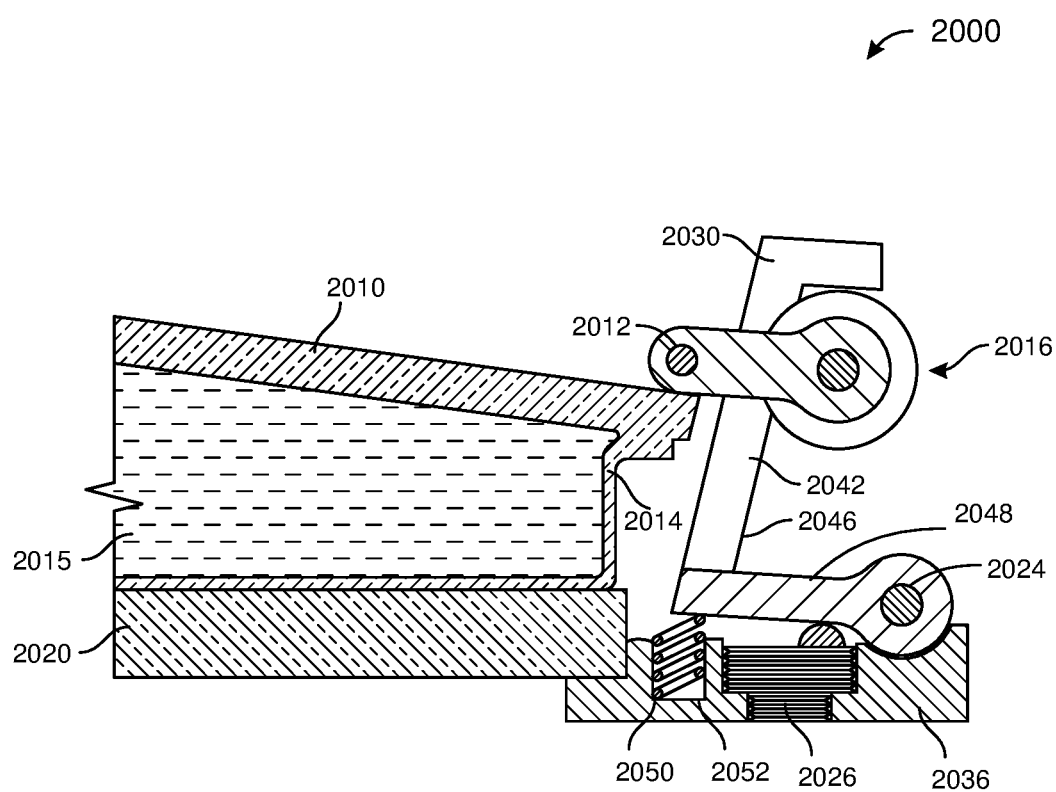
FIG. 20 shows a section view of part of an example fluid lens configuration, including an actuator and an actuation guide that may configured to provide a zero-force trajectory, including a spring that may be configured to reduce the force on the actuator, according to some embodiments.

FIG. 20 illustrates an example configuration of a portion of fluid lens 2000, which may be similar to that shown in FIG. 19A. The lens 2000 includes membrane 2010, peripheral structure 2012, fluid 2015, membrane attachment 2016, substrate 2020, actuator 2026, support structure 2030, and base 2036. The actuator 2026 may be a linear actuator. In addition, the fluid lens 2000 may include a spring 2050, such as a coil spring, configured to reduce the force requirements of actuator 2026. Spring 2050 may be dimensioned fit in the hole feature 2052 in the base 2036 (which may be the base of a support structure assembly). The support structure 2030 may include an actuation guide in the form of a guide post 2042, and the support structure may be pivotally attached to base 2036 by hinge 2024. A pivot arm 2048 may connect the hinge or pivot connection 2024 to the actuation guide, in this example, the guide post 2042. The guide post 2042 has surface 2046, which may be a guide surface that helps define the guide path for the membrane attachment. In some examples, the actuator and the spring force may both act on the pivot arm as illustrated. However, other actuator and/or spring positions may be used.

In some examples, a fluid lens may include a spring configured to act on a support structure to counteract a component of the elastic tension acting on the support structure from the membrane attachment. This approach may be used to reduce the actuation force required for a given focus adjustment of the lens. The surface of the guide post, along with the hinged or pivoted motion of a support structure or component thereof, may define the guide path for a membrane attachment. in some examples, on or both of the actuator and/or the spring force may act on the pivot arm connecting the guide post to a hinge or pivot connection to the substrate or base of the fluid lens.

Example approaches to device fabrication are now described.

FIGS. 21A-21G show example approaches to manufacturing a device including a membrane assembly having a guide wire, using simplified schematic representations. These examples may apply to the fabrication of various devices including a fluid lens, such as a head-mounted device including a fluid lens. The example approaches are shown using very simplified schematics, and some components may be omitted for illustrative clarity.

FIG. 21A shows a membrane 2110 (e.g., a sheet or film material) that may be biaxially stretched and held in a carrier ring 2112. The rectangle 2114 represents use of a tool, in a simplified manner. FIG. 21B shows a guide wire assembly 2120, which may include a guide wire 2122, and optional membrane attachments (not shown, which may function as actuator coupling assemblies). The guide wire assembly 2120 may be held in a tool 2124, for example, to provide datum orientation and to support any elastic tension. FIG. 21C shows presentation of the guide wire assembly 2120 to the membrane 2110 held within the carrier ring 2112.

FIG. 21D shows that guide wire assembly 2120 may be ultrasonically welded to stretched membrane 2110 in the carrier ring 2112, for example, using ultrasonic source 2140. FIG. 21E shows that membrane material outside of the guide wire assembly 2120 may be removed by, for example, being trimmed with a laser 2150. The membrane tension may be supported, at least in part, by the guide wire, and the guide wire may be supported by support structures, as discussed elsewhere in this disclosure. For example, tension in the guide wire may be supported by the mechanical interaction of membrane attachments and support structures (not shown), which may be provided by a substrate assembly.

Figure 21H:
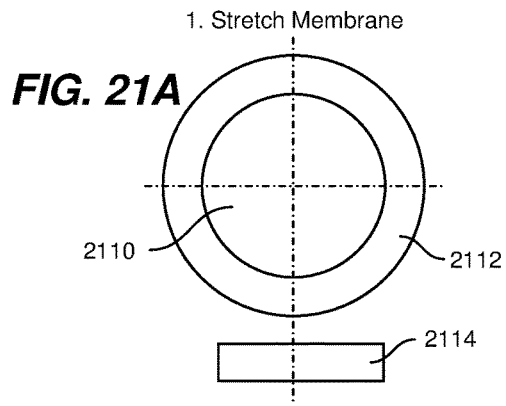
Figure 21H:
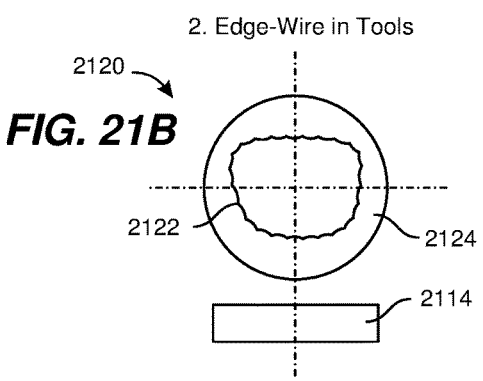
Figure 21H:
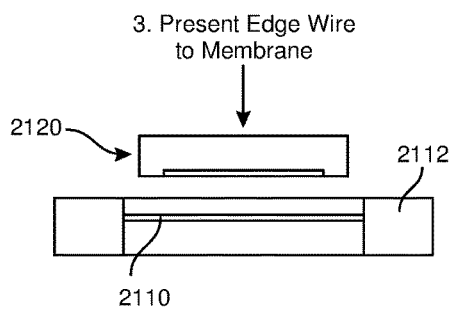
Figure 21H:
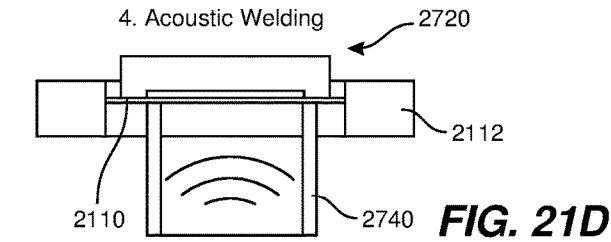
Figure 21H:
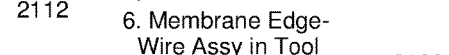
Figure 21H:
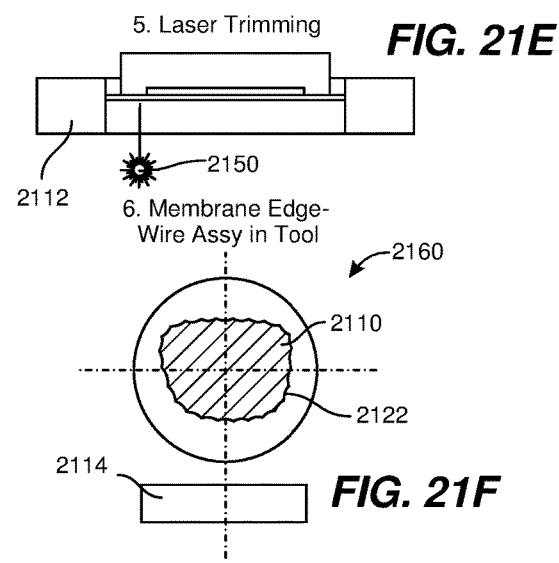
Figure 21H:
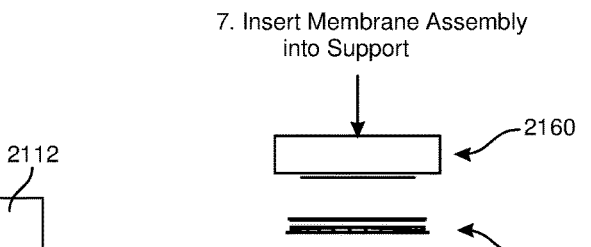
Figure 21H:
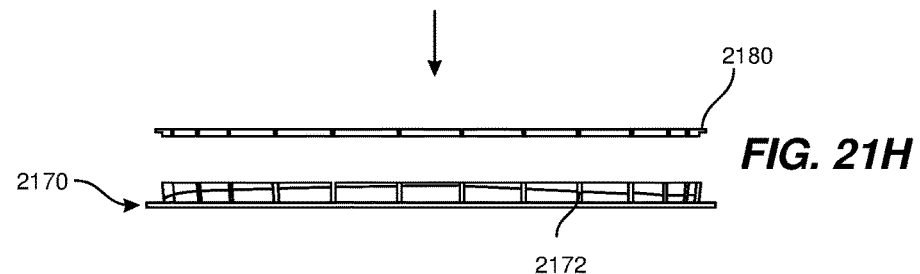

FIG. 21F shows the support tool 2114 holding the membrane assembly 2160, including a membrane 2110 and a guide wire 2122. The tool may also be used to hold the support structures and any other desired components. The membrane assembly 2160 may include a combination of a membrane, guide wire, and optionally the membrane attachments, and any other suitable components. FIG. 21G illustrates the insertion of the membrane assembly 2160 into a substrate assembly 2170, which in this example may be referred to as a colander assembly. A substrate assembly may include a substrate and one or more support structures attached to the substrate. In some examples, membrane attachments (or other suitable actuation support structures) may be located within slots (e.g., shown at 2172 in FIG. 21H), and the membrane tension may be supported by membrane attachments interacting with respective guide surfaces, for example, provided by corresponding support structures. FIG. 21H shows that a retaining cover 2180 may be fitted into the substrate assembly 2170 to increase the stiffness of the structure and/or to provide some other function, for example, as a chassis for one or more actuators. The retaining cover may have a generally ring-shaped form, or other suitable shape. The retaining cover may also be used to hide the periphery of the fluid lens, for example, where scalloping of a peripheral structure may occur.

Figure 22A:
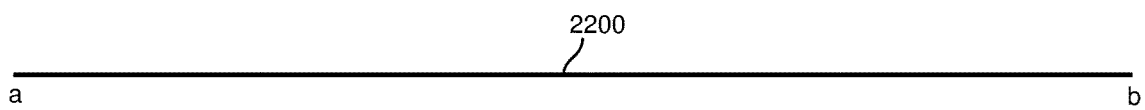
FIGS. 22A-22E show a schematic of an example manufacturing process for a membrane assembly.

FIGS. 22A-22E show further details of an example manufacturing process for fabricating a membrane assembly. FIG. 22A shows a wire 2200 having ends labeled "a" and "b", suitable for supporting the membrane tension. In some examples, a wire may include a high strength and low creep material, such as a high strength steel, and may have a thickness or diameter in the range of between approximately 0.05 mm to approximately 0.3 mm. The wire 2200 may be capable of holding a constant tension in the range of approximately 1N to approximately 10N without failing or lengthening significantly. These, and other numerical ranges described herein, are representative and not limiting.

Figure 22B:
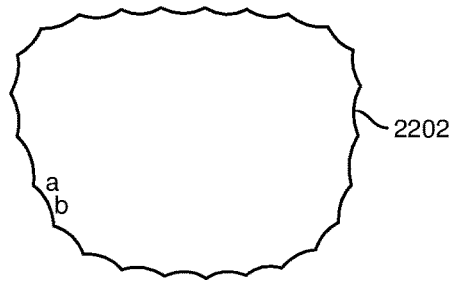

FIG. 22B shows that the wire 2200 may be formed (e.g., bent or otherwise shaped) into the shape of a guide wire 2202, such as the shape of a guide wire used in a membrane assembly. In some examples, a guide wire may be fabricated in a similar shape by stamping the wire from a sheet. The ends "a" and "b" may be substantially adjacent.

Figure 22C:
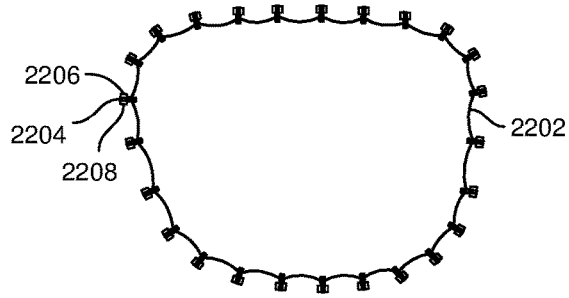

FIG. 22C shows that membrane attachments 2204 (some or all of that may function as an actuator coupling) may be threaded onto (or otherwise attached to or associated with) guide wire 2202. A membrane attachment 2204 may include a pair of rollers, 2206 and 2208. Membrane attachments may be held at their respective desired locations by a mechanical fixture (not shown). The combination of a guide wire and membrane attachments may be referred to as a guide wire assembly. A guide wire assembly may be attached to a substrate assembly, as described further below.

Figure 22D:
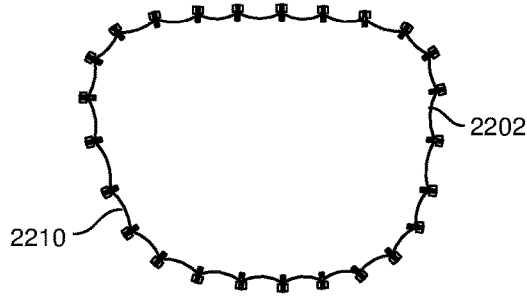

FIG. 22D shows that the open ends of the wire 2202 (that may be held adjacent each other) may be closed by any suitable approach, such as one or more of welding, soldering, a sleeve crimp, or some other approach, such as forming a join 2210 in the guide wire 2202.

Figure 22E:
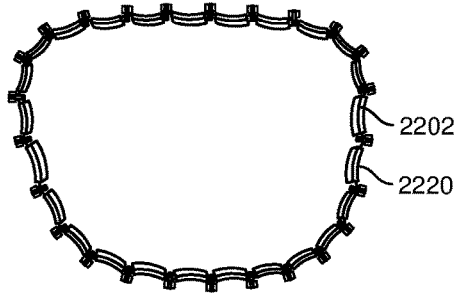

FIG. 22E shows that thermoplastic sleeves 2220 may be applied to interstitial portions of the guide wire 2202. The interstitial portions of the guide wire may be portions of the guide wire located between membrane attachments. Scalloping of the periphery of the membrane may occur within the interstitial portions of the guide wire. In some examples, a thermoplastic sleeve may be applied to some or all of the peripheral structure.

Figure 23A:
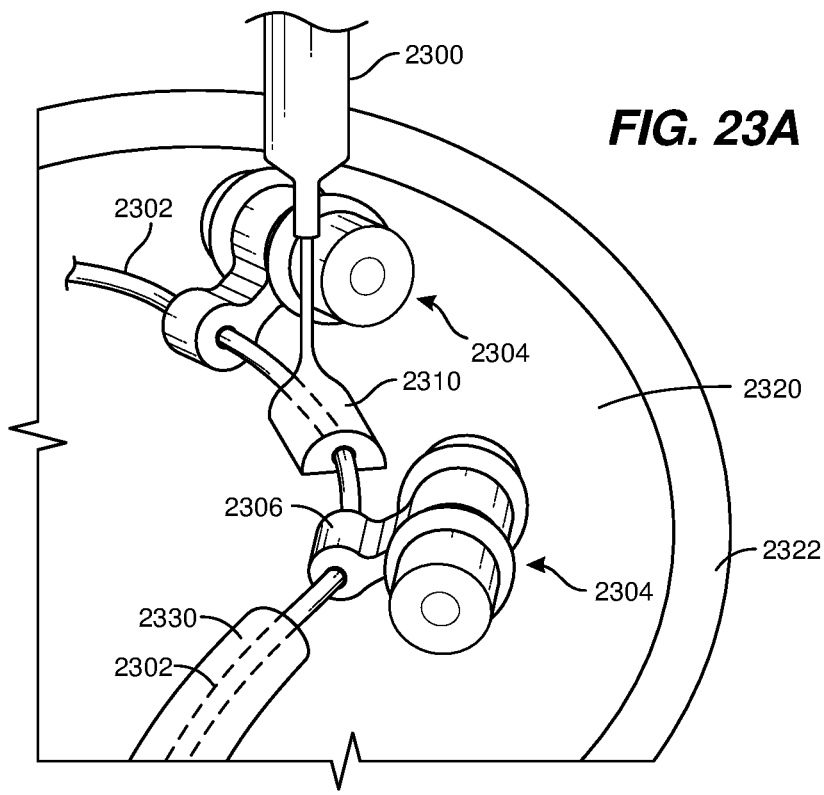
FIGS. 23A-23B show an example method of applying a thermoplastic sleeve to a peripheral wire of a membrane assembly.
Figure 23B:
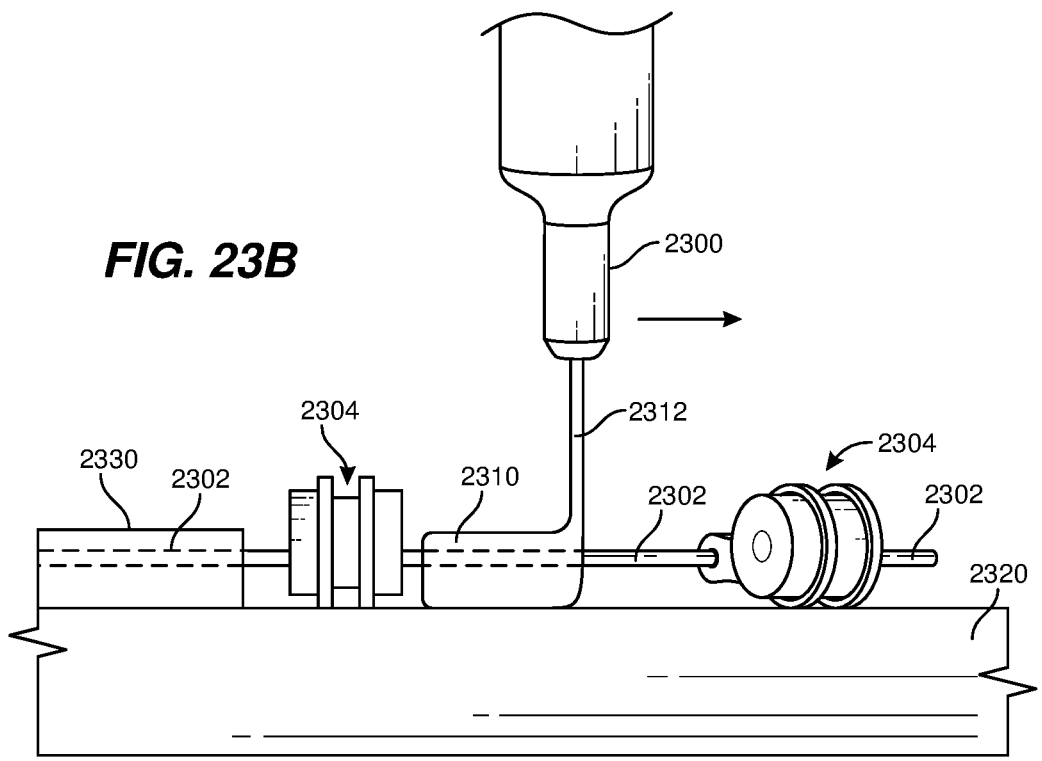

FIGS. 23A-23B show example approaches to forming thermoplastic sleeves 2310 on an example guide wire 2302. FIG. 23A shows the guide wire 2302 and membrane attachments (that may also provide actuator couplings) shown generally as elements 2304 on a support layer 2320 (optionally supported by substrate support 2322), which may include a non-stick material such as a fluoropolymer (e.g., polytetrafluoroethylene, PTFE) and may function similarly to a release liner. The support layer 2320 may include PTFE or any other suitable material. Hot-melt gun 2300 may drop a bead of molten thermoplastic polymer onto the guide wire 2302 to form a sleeve 2310. The sleeve 2310 may extend along the guide wire 2302 and may end short of the membrane attachments 2304. In other examples, the sleeve may extend over a portion of the membrane attachment, and, in some examples, may form a single continuous sleeve around the membrane periphery. The sleeve 2310 may include a thermoplastic polymer (such as a thermoplastic polyurethane), may be sufficiently flexible and strong (e.g., to allow adjustment of the membrane without cracking of the sleeve), and may be suitable for ultrasonic welding. FIG. 23A also shows a portion of a second sleeve 2330. The hot melt gun may be moved relative to the guide wire, as indicated by the horizontal arrow, to form a polymer sleeve on the guide wire.

FIG. 23B shows a side view of an arrangement similar to that shown in FIG. 23A, with similar element numbering, showing the bead of molten thermoplastic polymer 2312 deposited from the hot-melt gun 2300 and forming a sleeve 2310 on the guide wire 2302. Other elements are as described in relation to FIG. 23A. FIG. 23B shows a second sleeve 2330 formed on another portion of the wire 2302.

Figure 24:
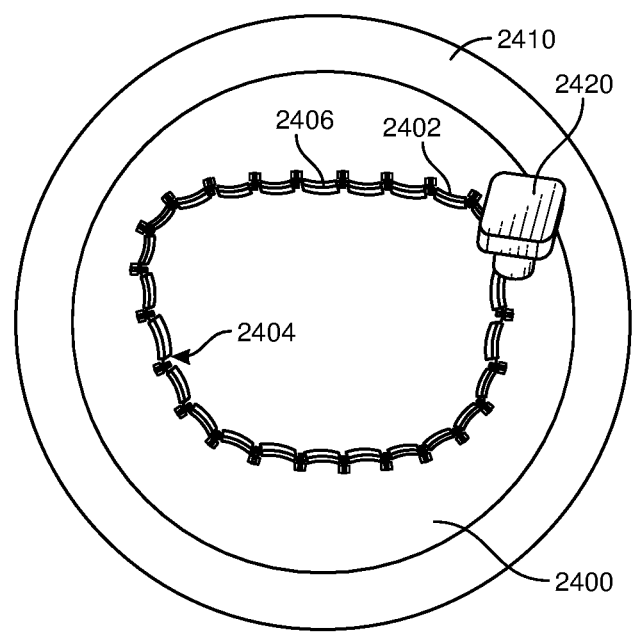
FIG. 24 shows an example method of fabricating a membrane assembly including a peripheral wire formed directly onto the membrane.

FIG. 24 shows a further method of fabricating a guide wire assembly by forming the guide wire directly onto a membrane 2400. FIG. 24 shows a guide wire 2402 and membrane attachments 2404 (that may be similar to those shown in FIG. 22D) placed onto a stretched membrane 2400, which may be held in a mechanical fixture, such as the carrier ring 2410. Molten thermoplastic may be applied to the guide wire 2402 by hot-melt gun 2420 to form the sleeve 2406. The guide wire 2402 and membrane attachments 2404 may be held in place by a support jig (not shown). Sufficient adhesion between the sleeve (e.g., sleeve 2406) and membrane 2400 may be achieved by direct contact. For example, a molten thermoplastic used to form the sleeve may contact and adhere to a thermoplastic elastomeric membrane. In some examples, ultrasonic welding may be used to improve adhesion of the sleeve to the membrane. The sleeve may be a continuous sleeve or include separate portions such as sleeve 2406. The sleeve may be formed using a process similar to that discussed above in relation to FIGS. 23A and 23B, or any other suitable approach.

The examples described herein may include direct (that may also be referred to as directional or "DC" type) movement of the guide. In some examples, the angular movement may be in the range of approximately 2 degrees to approximately 10 degrees, such as approximately 5 degrees, for example, to overcome friction.

In some examples, a lens may be adjusted using vibrational actuation. Vibrational actuation may include an oscillatory component, and may also include a "direct" component as described above. Example methods include using an actuator to vibrate at least a portion of the support structure (such as an actuation guide, such as a guide post). In some examples, the oscillatory component of the vibrational actuation may be at a frequency approximately equal to the resonant frequency of a corresponding mechanical element. In some examples, the actuation coupling structure may be effectively "bounced" on the guide, and a lower direct component of angular movement may be used to move coupler. In some examples, vibrational motion or other oscillatory actuation of the control point may be used to reduce static friction (stiction) effects in the actuation of the control point.

An example method of actuating a fluid lens includes adjusting a position of a membrane attachment along a guide path determined, at least in part, by a support structure attached to a substrate. Adjusting the position of the membrane attachment may include modifying an angle between the support structure and the substrate, so that the membrane attachment moves along the guide path. In some examples, the support structure includes an actuation guide, such a guide post, and the actuator is configured to modify the orientation of the actuation guide relative to the substrate.

FIG. 25 shows an example method 2500 of adjusting an optical property of a fluid lens. The method may include: adjusting an orientation of a support structure or a component thereof, such as an actuation guide (step 2510), for example, by adjusting an angle of an actuation guide relative to a one or more of the substrate, frame, actuator support, optic axis of the lens, or base of the support structure; moving a membrane attachment along the support structure or component thereof (e.g., along the actuation guide, such as along a guide post as the guide post changes orientation) (step 2520); and thereby adjusting the optical property of the fluid lens by modifying the profile of the membrane (step 2530).

FIG. 26 shows an example method 2600 of fabricating a fluid lens. The method may include attaching a plurality of membrane attachments to a membrane (step 2610). In some examples, the membrane attachments may be attached to a peripheral structure, for example, of a membrane assembly including a membrane surrounded by a guide wire. The method may further include engaging each membrane attachment with a respective support structure (step 2620), and mechanically coupling an actuator to the support structure (step 2630). The actuator may be configured to adjust the orientation of the support structure or a component thereof (such as an actuation guide) relative to a substrate (or other lens component or other direction) by, for example, adjusting the orientation of the support structure relative to a frame element, or relative to an optic axis.

In some examples, a fluid lens (such as a liquid lens) may be adjusted by moving each support point of an elastic membrane along a guide path, which may be determined so that the elastic deformation energy of the membrane is unchanged by the adjustment. This allows greatly reduced actuation power and a faster response. In some examples, the guide path may be provided by an actuation guide, such as an element including a post or slot. The actuation guide may be moved during lens actuation to further define the guide path. For example, the guide path may be designed so that the actuation force is normal to the membrane elastic strain force. For rapid actuations, the membrane motion may lag the desired actuation, for example, due to viscous effects. The ideal path may depend on the speed and direction of the actuation desired, and so the guide path may be adjusted dynamically using an actuator to adjust the support element position. For example, a high-force, low-stroke piezoelectric element may be used to adjust the actuation guide. In some examples, a typical angular adjustment may be around 8 degrees for an actuation time of 30-50 ms, though this is not limiting. Examples may include various mechanical configurations, including the use of a peripheral wire. In some examples, the actuation guide may be straight, and pushed in towards the center as the support point moves towards the substrate, to provide a desired curved guide path.

An advantage of the approximately zero actuation force requirement described herein is that a lens may be actuated into a particular configuration (such as a particular optical power) and the membrane may then tend to remain in the particular configuration, which may be neutrally stable. This may greatly reduce power requirements, as no force is needed to hold the lens in any particular configuration.

In some examples, a fluid lens may include a relatively rigid substrate and a flexible polymer membrane. The membrane may be attached to a support structure at support points around the membrane periphery. A flexible edge seal may be used to enclose the fluid. The lens power can be adjusted by moving the location of support points along guide trajectories, for example, using one more actuators. Guide paths (that may correspond to allowed trajectories of support points) may be determined that maintain a constant elastic deformation energy of the membrane as the support point location is moved along the guide path.

Guide devices may be attached to (or formed as part of) the substrate. Sources of elastic energy include hoop stress (tension in azimuth) and line strain, and elastic energy may be exchanged between these as the membrane is adjusted. These zero-work guide trajectories may greatly reduce or eliminate the energy required for lens adjustment. The force direction used to adjust the support point location may be normal to the elastic force on the support structure from the membrane. There are great possible advantages to this approach, including much reduced actuator size and power requirements, and a faster lens response (e.g., that may be between 30 ms and 50 ms), that may be restricted only by viscous and friction effects.

Applications of the principles described herein include any lens applications, such as ophthalmic lenses, optics, and other liquid lens applications. In the analysis used to determine the guide path, the fluid may be assumed to be incompressible, so that the fluid volume does not change. A zero-work guide path may be readily determined for a circular lens. The analysis for non-circular lenses may be slightly different, and in some cases the work required for adjustment may be reduced but not entirely eliminated. An example simplified approach determines a guide trajectory for which there is no elastic force component in the guide direction, so that the force direction used to adjust the support point location is normal to the elastic force on the support structure from the membrane.

In some examples, a liquid lens may be adjusted by moving each control point (that may also be referred to as support points) of an elastic membrane along a guide path, which may be determined so that the elastic deformation energy of the membrane is unchanged by the adjustment. This may allow for greatly reduced actuation power and a faster response. An example approach uses an edge wire, for example, a steel wire with an optional thermoplastic polyurethane (TPU) coating, along the perimeter of the membrane. As the perimeter is reduced, the control points move along the guide path towards the substrate. Other examples may include a clevis fastener or one or more rollers, for example, using jewel (e.g., sapphire) wheels, optional surface treatments to reduce friction, and flanges to guide the control points along the guide path, such as a guide slot. The number of control points may be selected based on various factors, for example, the degree of "scalloping" (curved edges) between control points. The scalloped regions may be hidden by eyeglass frames. In some examples, an additional spring (or foam) element may be used to correct the position of the wire with respect to the substrate. Numerical modeling with 20 control points demonstrate good optical performance, though other numbers of control points may be used, for example, 5-30, such as 10-30. Fabrication may attach the wire to the membrane using acoustic welding, followed by laser trimming.

Example applications include a device having a deformable element such as a membrane (where the deformable element may be in elastic tension), a substrate, a fluid at least partially enclosed between the membrane and the substrate, and a support structure configured to provide a guide path for an edge portion of the deformable element. The guide path may be configured such that adjustment of the device changes a profile of the deformable element without changing an elastic strain energy within the deformable element. The guide path may be configured such that adjustment of the device changes a profile of the deformable element by applying an actuation force normal to an elastic strain force in the deformable element.

In some examples, one or more optical parameters of a fluid lens may be determined at least in part by a physical profile of a membrane. In some examples, a fluid lens may be configured so that one or more optical parameters of the lens may be adjusted without changing the elastic strain energy in the membrane. In some examples, one or more optical parameters of the lens may be adjusted using an adjustment force, for example, a force applied by an actuator, that is normal to a direction of an elastic strain force in the membrane. In some examples, a guide path may be configured so that the adjustment force is always at least approximately normal to the elastic strain force during adjustment of the fluid lens. For example, the angle between the adjustment force and the elastic strain force may be within 5 degrees of normal, for example, within 3 degrees of normal.

As detailed above, the embodiments described herein include apparatuses, systems, and methods related to fluid lenses. In some examples, the term "fluid lens" may include adjustable fluid-filled lenses, such as adjustable liquid-filed lenses.

In some examples, a fluid lens may include a membrane, a substrate, such as a rigid substrate having a substrate surface, and a fluid located within an enclosure formed at least in part by the membrane and the substrate. The membrane may be an elastic membrane having a membrane profile. The fluid lens may have an optical property that is adjustable by adjusting the membrane profile, for example, by modifying a curvature of the membrane profile. A fluid lens may further include a support structure configured to retain the membrane under tension and allow adjustment of the optical property of the fluid lens by adjusting the membrane profile.

In some examples, a fluid lens includes a substrate (such as a planar substrate, that may be generally rigid), a membrane, that may provide a curved or planar surface, an edge seal, and a support structure. A fluid lens may be a circular lens or non-circular lens. The edge seal may extend around the periphery of a fluid-filled volume and retain (in cooperation with the substrate and the membrane) the fluid within an enclosed fluid volume. The fluid may be enclosed by the substrate and membrane in cooperation with the edge seal. The support structure may provide a guide surface, and may include a guide slot or any other suitable guide structure. An example support structure may include an element that extends around the periphery (or within a peripheral region) of the substrate and attach the membrane to the substrate. The support structure may provide a guide path, such as a guide surface along which a control point (e.g., provided by a membrane attachment located within an edge portion of the membrane) may slide. The support structure may include at least one actuator, and the fluid lens may include one or more actuators that may be located around the periphery of the fluid lens. The at least one actuator may exert a controllable force on the membrane through at least one control point, and may be used to adjust the curvature of the membrane surface and hence the optical properties of the lens (such as focal length, astigmatism correction, cylindricity, parabolic or freeform surface profiles, pincushion distortion, barrel distortion, or any other relevant optical parameter).

In some examples, an ophthalmic application of a fluid lens includes a lens frame, an elastic membrane, a substrate, a lens fluid (that may be at least partially enclosed between the elastic membrane and the substrate), an edge seal, and at least one support structure. The substrate may include a generally planar, rigid layer, and may be generally optically transparent. Adjustment of the device configuration and forces applied to the membrane may achieve a planar-convex fluid lens, in which the membrane tends to curve away from the substrate within a central portion. Example lenses may also be configured in planar-concave configurations, in which the membrane tends to curve towards the substrate in a central portion. In some examples, an adjustable fluid-filled lens includes a membrane having a line tension, a peripheral structure (such as a guide wire or support ring) extending around the membrane periphery, a substrate, and an edge seal. The membrane line tension may be supported by the peripheral structure. This may be augmented by a static restraint located at one or more points on the peripheral structure.

In some examples, a peripheral structure may generally surround the membrane of a fluid lens, and the fluid may be enclosed by the combination of the substrate, the membrane, and the edge seal. A rigid peripheral structure, such as a rigid support ring, may limit adjustments available to the control points of the membrane. In some examples, a deformable or flexible peripheral structure may be used, such as a peripheral structure including a guide wire or a flexible ring. In some examples, a flexible ring may be relatively rigid in a plane orthogonal to the optic axis. In some examples, a flexible ring may be generally circular, or have a non-circular shape, such as an oval or rounded quadrilateral shape generally associated with eyewear lenses.

In some examples, a device includes a membrane, a support structure configured to provide a guide path for an edge portion of the membrane, a membrane attachment (which mechanically connects the membrane to the support structure and allows a control point of the membrane to move freely along the guide path), a substrate, and an edge seal. In some examples, the support structure may be generally rigid and attached to the substrate, and/or to a frame.

In some examples, a fluid lens (that may also be termed a "fluid-filled lens") includes a fluid, a substrate, and a membrane, with the substrate and the membrane at least partially enclosing the fluid. The fluid within a fluid lens may be referred to as a "lens fluid" or as a "fluid" for conciseness. The lens fluid may include a liquid, such as an oil, such as a silicone oil, such as a phenylated silicone oil.

In some examples, a lens fluid may be (or include) a transparent fluid. In this context, a transparent fluid may have little or substantially no visually perceptible visible wavelength absorption over an operational wavelength range. However, fluid lenses may also be used in the UV and the IR spectrum, and in some examples the fluid used may be generally non-absorbing in the wavelength range of the desired application and may not be transparent over some or all of the visible wavelength range. In some examples, the membrane may be transparent, for example, optically clear at visible wavelengths.

In some examples, a lens fluid may include an oil, such as an optical oil. In some examples, a lens fluid may include one or more of a silicone, a thiol, or a cyano compound. The fluid may include a silicone based fluid, that may sometimes be referred to as a silicone oil. Example lens fluids include aromatic silicones, such as phenylated siloxanes, for example, pentaphenyl trimethyl trisiloxane.

In some examples, a fluid lens includes, for example, a membrane at least partially enclosing a fluid. A fluid may be, or include, one or more of the following: a gas, gel, liquid, suspension, emulsion, vesicle, micelle, colloid, liquid crystal, or any other suitable flowable or otherwise deformable phase.

In some examples, a lens fluid may have a visually perceptible color or absorption, for example, for eye protection use or improvement in visual acuity. In some examples, the lens fluid may have a UV absorbing dye and/or a blue absorbing dye, and the fluid lens may have a slightly yellowish tint. In some examples, a lens fluid may include a dye selected to absorb specific wavelengths, for example, laser wavelengths in the example of laser goggles. In some examples, a device including a fluid lens may be configured as sunglasses, and the lens fluid may include an optical absorber and/or photochromic material. In some examples, a fluid lens may include a separate layer, such as a light absorption layer configured to reduce the light intensity passed to the eye, or protect the eye against specific wavelengths or wavelength bands.

In some examples, an example fluid lens may include a membrane. A membrane may include a thin polymer film, that may have a thickness much less (e.g., more than an order of magnitude less) than the lens radius or other lateral extent of the lens. The membrane may provide a deformable optical surface of an adjustable fluid-filled lens.

A fluid lens may include a deformable element such as a polymer membrane, or any other suitable deformable element. A polymer membrane may include an elastomer polymer, and may be an elastic membrane. Membrane thicknesses may be in the range of 10 microns to 1 mm, for example, between 100 microns and 500 microns. The membrane may be optically clear.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a coating may also modify the elastic properties of a membrane in such a way that gravity sag is reduced or substantially eliminated.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a membrane coating may modify the elastic properties of a membrane in such a way that gravity sag is reduced or substantially eliminated. In some examples, a membrane may have a tension sufficient to keep gravity sag to within a desired limit. For example, a membrane may have a tension in the range 100 N/m to 500 N/m, for instance within the range 200 N/m to 300 N/m.

In some examples, a membrane and/or a substrate may be subject to a surface treatment, such as a coating, that may be provided before or after fluid lens assembly. In some examples, a polymer may be applied to the membrane, such as a polymer coating, for example, a fluoropolymer coating. A fluoropolymer coating may include one or more fluoropolymers, such as polytetrafluoroethylene, or its analogs, blends, or derivatives.

In some examples, a fluid lens may include a substrate. The substrate may provide one exterior surface of an adjustable fluid-filled lens, for example, opposite the surface provided by the membrane, and may include a rigid layer or a rigid lens.

In some examples, the substrate may be relatively rigid, and may exhibit no visually perceptible deformation due to, for example, adjusting the internal pressure of the fluid and/or tension on the membrane. In some examples, the substrate may be a generally transparent planar sheet. The substrate may include one more substrate layers, and a substrate layer may include a polymer, glass, optical film, or the like. Example glasses include silicate glasses, such as borosilicate glasses. In some examples, one or both surfaces of a substrate may be planar, spherical, cylindrical, spherocylindrical, convex, concave, parabolic, or have a freeform surface curvature. One or both surfaces of a substrate may approximate a prescription of a user, and adjustment of the membrane profile may be used to provide an improved prescription, for example, for reading, distance viewing, or any other desired use. In some examples, the substrate may have no significant optical power, for example, by having parallel planar surfaces.

Membrane deformation may be used to adjust an optical parameter, such as a focal length, around a center value determined by relatively fixed surface curvature(s) of a substrate or other optical element, for example, of one or both surfaces of a substrate.

In some examples, the substrate may include an elastomer, and may in some examples have an adjustable profile (that may have a smaller range of adjustments than provided by the membrane), and in some examples the substrate may be omitted and the fluid enclosed by a pair of membranes, or any other suitable flexible enclosure configuration. An example lens may include a pair of membranes at least partially enclosing the lens fluid, and a rigid substrate may be omitted. In some examples, a substrate (e.g., a hard substrate) may be omitted from an example device, and the angle of an adjustable actuation guide (e.g., of a support structure) may be determined relative to a reference plane, such as a plane through the center of the lens and at least one edge portion of the lens, or a plane perpendicular to the optic axis of the lens. In some example, an adjustable angle of an actuation guide may be determined relative to another element of the device or portion thereof, such as a frame or portion thereof. In some examples, a first angle between the actuation guide and the substrate (if the device includes a substrate) may decrease, as a second angle between the actuation guide and the optic axis increases. If a device does not include a substrate, an angle between the actuation guide and the optic axis of the lens may be adjusted by the actuator.

In some examples, a fluid lens may include an edge seal, that may include, for example, a deformable component configured to retain the fluid in the lens. The edge seal may connect an edge portion of the membrane to an edge portion of the substrate, and may include a thin flexible polymer film. In some examples, the fluid may be enclosed in a flexible bag, that may provide the edge seal, membrane, and in some examples, a substrate coating. An edge seal may include a flexible polymer film.

In some examples, a fluid lens includes one or more actuators. The one or more actuators may be used to modify the elastic tension of a membrane, and may hence modify an optical parameter of a fluid lens including the membrane. The membrane may be connected to a substrate around the periphery of the membrane, for example, using a connection assembly. The connection assembly may include at least one of an actuator, a post, a wire, or any other suitable connection hardware. In some examples, one or more actuators are used to adjust the curvature of the membrane, and hence the optical properties of the fluid lens.

In some examples, a device including a fluid lens may include a one or more fluid lenses supported by a frame, such as ophthalmic glasses, goggles, visor, or the like. Example fluid lenses may be shaped and sized for use in glasses (e.g., prescription spectacles) or head-mounted displays such as virtual reality devices or augmented reality devices. Example lenses may be the primary viewing lenses of such devices.

Applications of the concepts described herein include fluid lenses and devices that may include one or more fluid lenses, such as ophthalmic devices (e.g., glasses), augmented reality devices, virtual reality devices, and the like. Fluid lenses may be incorporated into eyewear, such as wearable optical devices like eyeglasses, an augmented reality or virtual reality headset, and/or other wearable optical device. Example devices may exhibit reduced thickness, reduced weight, improved field-of-view (e.g., wide angle) optics (e.g., for a given weight), and/or improved aesthetics. In some examples, a device may include at least one lens shaped and/or sized for use in glasses, heads-up displays, augmented reality devices, virtual reality devices, and the like. In some examples, a fluid lens may be a primary viewing lens for the device, for example, a lens through which light from the environment passes before reaching the eye of a user. In some examples, a fluid lens may have a diameter or other analogous dimension (e.g., width or height of a non-circular lens) that is between 20 mm and 80 mm.

In some examples, a substrate may include a coating. In some examples, an interior and/or exterior surface of a substrate and/or membrane may have a coating, such as a polymer coating. In some examples, an exterior surface of a substrate may have a scratch-resistant coating and/or an antireflection coating. In some examples, an interior surface may correspond to an interior surface of an enclosure holding the lens fluid, such as a surface of a membrane or substrate adjacent or substantially adjacent to the lens fluid.

In some examples, a device includes a fluid lens, where the fluid lens includes a membrane having a peripheral portion, a guide wire arranged around the peripheral portion of the membrane, a membrane attachment attached to the guide wire, a substrate, a fluid located within an enclosure formed at least in part by the membrane and the substrate, and a support structure attached to the substrate. An adjustment of a focal length of the fluid lens may include a movement of the membrane attachment. The support structure may engage with the membrane attachment and allow the movement of the membrane attachment. In some examples, the movement of the membrane attachment does not appreciably change an elastic energy of the membrane.

In some examples, a method of fabricating a device may include one or more of the following aspects. A membrane may be stretched in one or more directions, and may be held in a carrier ring (such as a flexible ring) or other suitable peripheral structure. A flexible ring may have a circular periphery, or, in some examples, may have a non-circular periphery, such as a peripheral shape similar to that of a lens used in spectacles. A guide wire assembly, which may include a guide wire and at least one membrane attachment, may be held in a tool, for example, to provide orientation and support elastic tension. The guide wire assembly may then be attached to the membrane. In some examples, a guide wire assembly may be ultrasonically welded to the membrane. Membrane material outside of the guide wire assembly may be removed by laser trimming. In the membrane assembly, the membrane tension may be, at least in part, supported by the guide wire, and the guide wire may be supported by support structures that may be attached to a substrate (or frame, or other suitable structure) of the lens. Tension in the guide wire may be supported by the mechanical interaction between membrane attachments and support structures. An example membrane assembly may include a membrane, guide wire, optionally one or more membrane attachments, and any other suitable components. The membrane assembly may be inserted into a substrate assembly, that may include a substrate, support structures, and any other suitable components (e.g., a frame, sensors, filters, coatings, and the like). The substrate assembly may include the lens substrate, and one or more support structures that may be rigidly attached to the substrate. The membrane attachments may be configured to engage with a corresponding support structure. For example, membrane attachments may be located in slots, or engage with posts or other suitable support structures. The membrane tension may be supported by membrane attachments interacting with corresponding guide surfaces, that may be provided by respective support structures. A retaining cover may be fitted into the substrate assembly to increase the stiffness of the structure and/or to provide some other function, for example, a chassis configured to support one or more actuators. An actuator may be configured to provide an urging force to a membrane attachment, and/or may be configured to modify the location of the membrane attachment along the guide path. The retaining cover may have a generally ring-shaped form, or other suitable shape.

In some examples, a method of fabricating a fluid lens includes bonding a guide wire assembly, including a guide wire and a plurality of membrane attachments, to a pre-stretched elastic membrane. The guide wire assembly may then be attached to a substrate assembly including a substrate and a plurality of support structures. The support structures may engage with the membrane attachments to retain an elastic tension in the membrane. The method may further include enclosing a fluid within an enclosure formed at least in part by the substrate and the membrane, to form an adjustable fluid lens. An edge seal may be used to help retain the fluid. A thermoplastic polymer sleeve may be formed on portions of the guide wire located between the membrane attachments. The membrane may be pre-stretched by a mechanical fixture, and the mechanical fixture may be removed after attaching the guide wire assembly to the substrate assembly.

In some examples, an adjustable fluid lens (such as an adjustable liquid lens) may be adjusted by moving at least one control point of an elastic membrane along a guide path, that may include changing the orientation of an actuation guide, such as a guide post or slotted element, relative to the substrate, frame, or other component of the device. Control points for a membrane may be provided by at least one membrane attachment. The guide path may be configured so that the elastic deformation energy of the membrane is approximately unchanged by the movement of the membrane attachment. This approach may greatly reduce actuation force and/or device power requirements, and may provide faster response related to adjustment of an optical property of the fluid lens. In some examples, a device includes a guide wire (that may sometimes be referred to as an edge wire) located around a periphery of the membrane. A guide wire may include a metal wire, such as a steel wire, optionally having a thermoplastic polyurethane (TPU) coating. As the membrane attachments move along a respective guide path towards the substrate, the perimeter dimension of the membrane may be reduced, in some examples as the curvature of the membrane profile increases. In some examples, a membrane attachment may include a clevis fastener and/or one or more rollers, for example, using jewel (e.g., synthetic sapphire) wheels, optional surface treatments to reduce friction, and optional flanges to guide the membrane attachments along slots or another guide structure. The number of actuation points may be selected based on various factors, for example, the degree of "scalloping" (curved edges) between membrane attachments. The scalloped regions may be hidden by eyeglass frames. In some examples, an additional spring (or foam) element may be used to reduce the reduce the tendency of the wire to be pulled up (e.g., away from) the substrate. Numerical modeling with 20 attachment points showed good optical performance, though other numbers of attachment points may be used, for example, 8-30, such as 20-30. Fabrication may include attachment of the guide wire to the membrane using acoustic welding, optionally followed by laser trimming. In some examples, a method of operating an adjustable fluid lens, including a membrane, membrane attachments, and support structures configured to engage with a corresponding membrane attachment, may include moving at least one membrane attachment along a guide path determined by the corresponding support structure. In this context, a membrane attachment may physically interact with corresponding support structure, for example, extending through and/or around the corresponding support structure. Applications include ophthalmic devices, optical device, and other applications of liquid lenses.

EXAMPLE EMBODIMENTS

Example 1. A device may include a fluid lens, where the fluid lens includes: a membrane assembly including a membrane and a membrane attachment; a substrate; a fluid located within an enclosure formed at least in part by the membrane and the substrate; a support structure, attached to the substrate, including an actuation guide; and an actuator, mechanically coupled to the actuation guide and configured to change an orientation of the actuation guide relative to the substrate, where: the actuation guide engages with the membrane attachment and enables movement of the membrane attachment; and the movement of the membrane attachment in response to the change in the orientation of the actuation guide adjusts a focal length of the fluid lens.

Example 2. The device of example 1, where the membrane assembly includes a peripheral structure disposed around a peripheral portion of the membrane, the peripheral structure includes a guide wire or a flexible ring, and the membrane attachment is attached to the peripheral structure.

Example 3. The device of any of examples 1-2, where the membrane attachment follows a guide path as the actuator changes the orientation of the actuation guide relative to the substrate.

Example 4. The device of any of examples 1-3, where the membrane is an elastic membrane under tension, the membrane has an elastic energy, and the elastic energy of the membrane is substantially independent of a location of the membrane attachment on the guide path.

Example 5. The device of any of examples 1-4, where the actuation guide includes a guide post, and the actuator is mechanically coupled to the guide post to adjust the orientation of the guide post relative to the substrate.

Example 6. The device of any of examples 1-5, where actuation guide includes a guide post, the guide post is a straight guide post, and the membrane attachment follows a curved guide path as the orientation of the guide post relative to the substrate is changed by the actuator.

Example 7. The device of any of examples 1-6, where the actuation guide is hingedly attached to the substrate.

Example 8. The device of any of examples 1-7, further including a spring located between the actuation guide and the substrate.

Example 9. The device of any of examples 1-8, where the actuator is a piezoelectric actuator.

Example 10. The device of any of examples 1-9, where the actuator is located between an actuator support and the actuation guide, and the actuator support is rigidly attached to the substrate.

Example 11. The device of any of examples 1-10, where: the membrane attachment includes a roller configured to engage with the actuation guide; and the roller moves along a surface of the actuation guide as the orientation of the actuation guide relative to the substrate is changed by the actuator.

Example 12. The device of any of examples 1-11, where the membrane attachment includes a roller, and the roller includes an axle and at least one roller wheel, and the roller has a generally circular periphery.

Example 13. The device of any of examples 11-12, where the roller includes a cam.

Example 14. The device of any of examples 1-13, where the support structure includes a slot, and a portion of the membrane attachment extends through the slot and engages with a surface of the support structure.

Example 15. the device of any of examples 1-14, where the actuation guide moves through an angular range of between approximately 5 degrees and approximately 20 degrees as the fluid lens is adjusted through a focal length range of the fluid lens.

Example 16. The device of any of examples 1-15, where the device includes a plurality of support structures including the support structure and a plurality of membrane attachments including the membrane attachment, and each support structure of the plurality of support structures is configured to engage with a respective membrane attachment of the plurality of membrane attachments.

Example 17. The device of any of examples 1-16, where the fluid lens is sized for use with a human eye, and the fluid lens has a diameter, width, or analogous dimension between approximately 20 mm and approximately 80 mm, the substrate is an optically transparent substrate; the membrane is an optically transparent membrane; and the fluid includes an optically transparent liquid.

Example 18. The device of any of examples 1-17, where the device is a head-mounted device, and the head-mounted device includes at least one of an ophthalmic device configured to be used as eyewear, an augmented reality device, or a virtual reality device.

Example 19. A method may include: attaching a plurality of membrane attachments to a membrane of a fluid lens; engaging each membrane attachment of the plurality of membrane attachments with an actuation guide of a respective support structure; mechanically coupling each actuation guide to an actuator; and adjusting the orientation of each actuation guide relative to an optic axis of the fluid lens to adjust a focal length of the fluid lens.

Example 20. The method of example 19, where an elastic energy within the membrane is substantially unchanged as the focal length of the lens is adjusted.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of that may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (e.g., augmented-reality system 2700 in FIG. 27) or that visually immerses a user in an artificial reality (e.g., virtual-reality system 2800 in FIG. 28). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 27, augmented-reality system 2700 may include an eyewear device 2702 with a frame 2710 configured to hold a left display device 2715(A) and a right display device 2715(B) in front of a user's eyes. Display devices 2715(A) and 2715(B) may act together or independently to present an image or series of images to a user. While augmented-reality system 2700 includes two displays, embodiments of this disclosure may be implemented in augmented-reality systems with a single NED or more than two NEDs.

In some embodiments, augmented-reality system 2700 may include one or more sensors, such as sensor 2740. Sensor 2740 may generate measurement signals in response to motion of augmented-reality system 2700 and may be located on substantially any portion of frame 2710. Sensor 2740 may represent a position sensor, an inertial measurement unit (IMU), a depth camera assembly, a structured light emitter and/or detector, or any combination thereof. In some embodiments, augmented-reality system 2700 may or may not include sensor 2740 or may include more than one sensor. In embodiments in which sensor 2740 includes an IMU, the IMU may generate calibration data based on measurement signals from sensor 2740. Examples of sensor 2740 may include, without limitation, accelerometers, gyroscopes, magnetometers, other suitable types of sensors that detect motion, sensors used for error correction of the IMU, or some combination thereof.

Augmented-reality system 2700 may also include a microphone array with a plurality of acoustic transducers 2720(A)-2720(J), referred to collectively as acoustic transducers 2720. Acoustic transducers 2720 may be transducers that detect air pressure variations induced by sound waves. Each acoustic transducer 2720 may be configured to detect sound and convert the detected sound into an electronic format (e.g., an analog or digital format). The microphone array in FIG. 2 may include, for example, ten acoustic transducers: 2720(A) and 2720(B), that may be designed to be placed inside a corresponding ear of the user, acoustic transducers 2720(C), 2720(D), 2720(E), 2720(F), 2720(G), and 2720(H), that may be positioned at various locations on frame 2710, and/or acoustic transducers 2720(1) and 2720 (J), that may be positioned on a corresponding neckband 2705.

In some embodiments, one or more of acoustic transducers 2720(A)-(F) may be used as output transducers (e.g., speakers). For example, acoustic transducers 2720(A) and/or 2720(B) may be earbuds or any other suitable type of headphone or speaker.

The configuration of acoustic transducers 2720 of the microphone array may vary. While augmented-reality system 2700 is shown in FIG. 27 as having ten acoustic transducers 2720, the number of acoustic transducers 2720 may be greater or less than ten. In some embodiments, using higher numbers of acoustic transducers 2720 may increase the amount of audio information collected and/or the sensitivity and accuracy of the audio information. In contrast, using a lower number of acoustic transducers 2720 may decrease the computing power required by an associated controller 2750 to process the collected audio information. In addition, the position of each acoustic transducer 2720 of the microphone array may vary. For example, the position of an acoustic transducer 2720 may include a defined position on the user, a defined coordinate on frame 2710, an orientation associated with each acoustic transducer 2720, or some combination thereof.

Acoustic transducers 2720(A) and 2720(B) may be positioned on different parts of the user's ear, such as behind the pinna, behind the tragus, and/or within the auricle or fossa. Or, there may be additional acoustic transducers 2720 on or surrounding the ear in addition to acoustic transducers 2720 inside the ear canal. Having an acoustic transducer 2720 positioned next to an ear canal of a user may enable the microphone array to collect information on how sounds arrive at the ear canal. By positioning at least two of acoustic transducers 2720 on either side of a user's head (e.g., as binaural microphones), augmented-reality system 2700 may simulate binaural hearing and capture a 3D stereo sound field around about a user's head. In some embodiments, acoustic transducers 2720(A) and 2720(B) may be connected to augmented-reality system 2700 via a wired connection 2730, and in other embodiments acoustic transducers 2720(A) and 2720(B) may be connected to augmented-reality system 2700 via a wireless connection (e.g., a Bluetooth connection). In still other embodiments, acoustic transducers 2720(A) and 2720(B) may not be used at all in conjunction with augmented-reality system 2700.

Acoustic transducers 2720 on frame 2710 may be positioned along the length of the temples, across the bridge, above or below display devices 2715(A) and 2715(B), or some combination thereof. Acoustic transducers 2720 may be oriented such that the microphone array is able to detect sounds in a wide range of directions surrounding the user wearing the augmented-reality system 2700. In some embodiments, an optimization process may be performed during manufacturing of augmented-reality system 2700 to determine relative positioning of each acoustic transducer 2720 in the microphone array.

In some examples, augmented-reality system 2700 may include or be connected to an external device (e.g., a paired device), such as neckband 2705. Neckband 2705 generally represents any type or form of paired device. Thus, the following discussion of neckband 2705 may also apply to various other paired devices, such as charging cases, smart watches, smart phones, wrist bands, other wearable devices, hand-held controllers, tablet computers, laptop computers, other external compute devices, etc.

As shown, neckband 2705 may be coupled to eyewear device 2702 via one or more connectors. The connectors may be wired or wireless and may include electrical and/or non-electrical (e.g., structural) components. In some cases, eyewear device 2702 and neckband 2705 may operate independently without any wired or wireless connection between them. While FIG. 27 illustrates the components of eyewear device 2702 and neckband 2705 in example locations on eyewear device 2702 and neckband 2705, the components may be located elsewhere and/or distributed differently on eyewear device 2702 and/or neckband 2705. In some embodiments, the components of eyewear device 2702 and neckband 2705 may be located on one or more additional peripheral devices paired with eyewear device 2702, neckband 2705, or some combination thereof.

Pairing external devices, such as neckband 2705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2700 may be provided by a paired device or shared between a paired device and an eyewear device, thus reducing the weight, heat profile, and form factor of the eyewear device overall while still retaining desired functionality. For example, neckband 2705 may allow components that would otherwise be included on an eyewear device to be included in neckband 2705 since users may tolerate a heavier weight load on their shoulders than they would tolerate on their heads. Neckband 2705 may also have a larger surface area over which to diffuse and disperse heat to the ambient environment. Thus, neckband 2705 may allow for greater battery and computation capacity than might otherwise have been possible on a stand-alone eyewear device. Since weight carried in neckband 2705 may be less invasive to a user than weight carried in eyewear device 2702, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 2705 may be communicatively coupled with eyewear device 2702 and/or to other devices. These other devices may provide certain functions (e.g., tracking, localizing, depth mapping, processing, storage, etc.) to augmented-reality system 2700. In the embodiment of FIG. 27, neckband 2705 may include two acoustic transducers (e.g., 2720(1) and 2720(J)) that are part of the microphone array (or potentially form their own microphone subarray). Neckband 2705 may also include a controller 2725 and a power source 2735.

Acoustic transducers 2720(1) and 2720(J) of neckband 2705 may be configured to detect sound and convert the detected sound into an electronic format (analog or digital). In the embodiment of FIG. 27, acoustic transducers 2720(1) and 2720(J) may be positioned on neckband 2705, thereby increasing the distance between the neckband acoustic transducers 2720(1) and 2720(J) and other acoustic transducers 2720 positioned on eyewear device 2702. In some cases, increasing the distance between acoustic transducers 2720 of the microphone array may improve the accuracy of beamforming performed via the microphone array. For example, if a sound is detected by acoustic transducers 2720(C) and 2720(D) and the distance between acoustic transducers 2720(C) and 2720(D) is greater than, for example, the distance between acoustic transducers 2720(D) and 2720(E), the determined source location of the detected sound may be more accurate than if the sound had been detected by acoustic transducers 2720(D) and 2720(E).

Controller 2725 of neckband 2705 may process information generated by the sensors on neckband 2705 and/or augmented-reality system 2700. For example, controller 2725 may process information from the microphone array that describes sounds detected by the microphone array. For each detected sound, controller 2725 may perform a direction-of-arrival (DOA) estimation to estimate a direction from which the detected sound arrived at the microphone array. As the microphone array detects sounds, controller 2725 may populate an audio data set with the information. In embodiments in which augmented-reality system 2700 includes an inertial measurement unit, controller 2725 may compute all inertial and spatial calculations from the IMU located on eyewear device 2702. A connector may convey information between augmented-reality system 2700 and neckband 2705 and between augmented-reality system 2700 and controller 2725. The information may be in the form of optical data, electrical data, wireless data, or any other transmittable data form. Moving the processing of information generated by augmented-reality system 2700 to neckband 2705 may reduce weight and heat in eyewear device 2702, making it more comfortable to the user.

Power source 2735 in neckband 2705 may provide power to eyewear device 2702 and/or to neckband 2705. Power source 2735 may include, without limitation, lithium ion batteries, lithium-polymer batteries, primary lithium batteries, alkaline batteries, or any other form of power storage. In some cases, power source 2735 may be a wired power source. Including power source 2735 on neckband 2705 instead of on eyewear device 2702 may help better distribute the weight and heat generated by power source 2735.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 2800 in FIG. 28, that mostly or completely covers a user's field of view. Virtual-reality system 2800 may include a front rigid body 2802 and a band 2804 shaped to fit around a user's head. Virtual-reality system 2800 may also include output audio transducers 2806(A) and 2806(B). Furthermore, while not shown in FIG. 28, front rigid body 2802 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 2700 and/or virtual-reality system 2800 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial reality systems may include a single display screen for both eyes or may provide a display screen for each eye, that may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay light (to, e.g., the viewer's eyes). These optical subsystems may be used in a non-pupil-forming architecture (such as a single lens configuration that directly collimates light but may result in so-called pincushion distortion) and/or a pupil-forming architecture (such as a multi-lens configuration that may produce barrel distortion to nullify pincushion distortion).

In addition to or instead of using display screens, some artificial reality systems may include one or more projection systems. For example, display devices in augmented-reality system 2700 and/or virtual-reality system 2800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

Artificial reality systems may also include various types of computer vision components and subsystems. For example, augmented-reality system 2700 and/or virtual-reality system 2800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. For example, elements 2806(A), and 2806(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some examples, artificial reality systems may include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The present disclosure may anticipate or include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps.

In some examples, a system according to the present disclosure may include at least one physical processor and physical memory including computer-executable instructions that, when executed by the physical processor, cause the physical processor to perform an operation, such as at least one of adjusting the optical properties of a fluid lens (e.g., by energizing an actuator), displaying an augmented reality or virtual reality image, providing haptic feedback using one or more transducers, or any other appropriate operation.

In some examples, a non-transitory computer-readable medium according to the present disclosure may include one or more computer-executable instructions that, when executed by at least one processor of a computing device, cause the computing device to perform an operation, such as at least one of adjusting the optical properties of a fluid lens (e.g., by energizing an actuator), displaying an augmented reality or virtual reality image, providing haptic feedback using one or more transducers, or any other appropriate operation.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. An example function may include at least one of adjusting the focal length of an adjustable lens, actuating an actuator, modifying an optical absorption of an optical element, modifying a membrane profile of an adjustable fluid lens, providing augmented reality or virtual reality image elements, or other function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Features from any of the embodiments described herein may be used in combination with one another in accordance with the general principles described herein. These and other embodiments, features, and advantages may be more fully understood upon reading the following detailed description in conjunction with the accompanying drawings and claims.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

What is claimed is:

1. A device comprising a fluid lens, wherein the fluid lens comprises:
    a membrane assembly comprising a membrane and a membrane attachment;
    a substrate;
    a fluid located within an enclosure formed at least in part by the membrane and the substrate;
    a support structure, attached to the substrate, comprising an actuation guide that comprises a guide post; and
    an actuator, mechanically coupled to the actuation guide and configured to change an orientation of the guide post relative to the substrate, wherein:
        the actuation guide engages with the membrane attachment and enables a movement of the membrane attachment along the guide post;
        the movement of the membrane attachment along the guide post in response to a change in the orientation of the guide post adjusts a focal length of the fluid lens; and
        the actuator is configured to urge the guide post towards a normal or parallel orientation of a direction of elongation of the guide post relative to the substrate.

2. The device of claim 1, wherein:
    the membrane assembly comprises a peripheral structure disposed around a peripheral portion of the membrane;
    the peripheral structure comprises a guide wire or a flexible ring; and
    the membrane attachment is attached to the peripheral structure.

3. The device of claim 1, wherein the membrane attachment follows a guide path as the actuator changes the orientation of the actuation guide relative to the substrate.

4. The device of claim 3, wherein:
    the membrane is an elastic membrane under tension;
    the membrane has an elastic energy; and
    the elastic energy of the membrane is substantially independent of a location of the membrane attachment on the guide path.

5. The device of claim 1, wherein the guide post is a straight guide post, and the membrane attachment follows a curved guide path as the orientation of the guide post relative to the substrate is changed by the actuator.

6. The device of claim 1, wherein the actuation guide is hingedly attached to the substrate.

7. The device of claim 1, further comprising a spring located between the actuation guide and the substrate.

8. The device of claim 1, wherein the actuator is a piezoelectric actuator.

9. The device of claim 1, wherein the actuator is located between an actuator support and the actuation guide, and the actuator support is rigidly attached to the substrate.

10. The device of claim 1, wherein:
the membrane attachment comprises a roller configured to engage with the actuation guide; and
the roller moves along a surface of the actuation guide as the orientation of the actuation guide relative to the substrate is changed by the actuator.

11. The device of claim 10, wherein the roller comprises an axle and at least one roller wheel and the roller has a generally circular periphery.

12. The device of claim 10, wherein the roller comprises a cam.

13. The device of claim 1, wherein the support structure comprises a slot, and a portion of the membrane attachment extends through the slot and engages with a surface of the support structure.

14. The device of claim 1, wherein the actuation guide moves through an angular range of between approximately 5 degrees and approximately 20 degrees as the fluid lens is adjusted through a focal length range of the fluid lens.

15. The device of claim 1, wherein:
the device comprises a plurality of support structures including the support structure, and a plurality of membrane attachments including the membrane attachment; and
each support structure of the plurality of support structures is configured to engage with a respective membrane attachment of the plurality of membrane attachments.

16. The device of claim 1, wherein:
the fluid lens is sized for use with a human eye; the fluid lens has a diameter, width, or analogous dimension between approximately 20 mm and approximately 80 mm;
the substrate is an optically transparent substrate; the membrane is an optically transparent membrane; and
the fluid comprises an optically transparent liquid.

17. The device of claim 1, wherein the device is a head-mounted device, and the head-mounted device comprises at least one of an ophthalmic device configured to be used as eyewear, an augmented reality device, or a virtual reality device.

18. A method, comprising:
attaching a plurality of membrane attachments to a membrane of a fluid lens;
engaging each membrane attachment of the plurality of membrane attachments with an actuation guide of a respective support structure;
mechanically coupling each actuation guide to an actuator; and
adjusting an orientation of each actuation guide relative to an optic axis of the fluid lens to adjust a focal length of the fluid lens, wherein
each actuation guide comprises a guide post, is supported by a substrate, and is configured to enable a movement of one of the plurality of membrane attachments along the guide post;
the movement of the one of the plurality of membrane attachment along the guide post in response to a change in an orientation of the guide post adjusts the focal length of the fluid lens; and
the actuator is configured to urge the guide post towards a normal orientation or a parallel orientation of a direction of elongation of the guide post relative to the substrate.

19. The method of claim 18, wherein an elastic energy within the membrane is substantially unchanged as the focal length of the fluid lens is adjusted.

* * * * *